(12) United States Patent
Takabayashi et al.

(10) Patent No.: US 8,606,539 B2
(45) Date of Patent: Dec. 10, 2013

(54) ROAD CONFIGURATION ESTIMATION APPARATUS, COMPUTER PROGRAM, AND ROAD CONFIGURATION ESTIMATION METHOD

(75) Inventors: Yuki Takabayashi, Tokyo (JP); Takashi Matsuzaki, Tokyo (JP); Hiroshi Kameda, Tokyo (JP); Yasushi Obata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 168 days.

(21) Appl. No.: 13/020,286

(22) Filed: Feb. 3, 2011

(65) Prior Publication Data

US 2011/0295548 A1 Dec. 1, 2011

(30) Foreign Application Priority Data

May 26, 2010 (JP) ................. 2010-120472
Oct. 5, 2010 (JP) ................. 2010-225807

(51) Int. Cl.
*G06F 15/00* (2006.01)
*G01P 3/00* (2006.01)

(52) U.S. Cl.
USPC ........... 702/142; 702/150; 340/436; 340/903; 340/435; 340/901; 180/169; 342/70

(58) Field of Classification Search
USPC ....................................................... 702/142
See application file for complete search history.

(56) References Cited

U.S. PATENT DOCUMENTS 5,751,211 A * 5/1998 Shirai et al. .................... 340/435
5,930,739 A 7/1999 Constancis 6,198,426 B1 * 3/2001 Tamatsu et al. ................. 342/70
6,300,865 B1 * 10/2001 Fechner et al. ............... 340/436
6,470,272 B2 * 10/2002 Cong et al. .................... 701/301

(Continued)

FOREIGN PATENT DOCUMENTS

CN  101320089 A  12/2008
JP  6-148319  5/1994

(Continued)

OTHER PUBLICATIONS

Office Action issued Jul. 25, 2013, in co-pending U.S. Appl. No. 13/020,411.

(Continued)

*Primary Examiner* — Tung S Lau
*Assistant Examiner* — Stephanie Chang
(74) *Attorney, Agent, or Firm* — Oblon, Spivak, McClelland, Maier & Neustadt, L.L.P.

(57) ABSTRACT

A radar (peripheral object observation device) repeatedly observes a relative position of an object relative to the moving object, which is located in the vicinity of a moving object. A stationary object identification unit (stationary object determination unit) determines whether or not the object the relative positions of which have been observed by the radar is still. A road approximate curve temporary computation unit (object correlation unit) determines a plurality of the relative positions of an identical object observed by the radar from among the relative positions observed by the radar. A road approximate curve main computation unit (approximate curve computation unit) computes an approximate curve that approximates the configuration of a road on which the moving object is located, based on a result of the determination by the stationary object identification unit and a result of the determination by the road approximate curve computation unit.

15 Claims, 53 Drawing Sheets

(56) References Cited

U.S. PATENT DOCUMENTS

| | | | |
|---|---|---|---|
| 7,034,742 B2* | 4/2006 | Cong et al. | 342/70 |
| 2001/0020201 A1* | 9/2001 | Shirai et al. | 701/1 |
| 2001/0025211 A1 | 9/2001 | Shirai et al. | |
| 2001/0037165 A1 | 11/2001 | Shirai et al. | |
| 2001/0053955 A1* | 12/2001 | Shirai et al. | 701/200 |
| 2002/0019697 A1* | 2/2002 | Cong et al. | 701/207 |
| 2002/0165650 A1 | 11/2002 | Michi et al. | |
| 2004/0024498 A1 | 2/2004 | Okamura et al. | |
| 2005/0228580 A1 | 10/2005 | Winner et al. | |
| 2010/0017128 A1* | 1/2010 | Zeng | 701/301 |
| 2011/0044507 A1* | 2/2011 | Strauss et al. | 382/103 |
| 2011/0295549 A1* | 12/2011 | Takabayashi et al. | 702/142 |
| 2012/0078498 A1* | 3/2012 | Iwasaki et al. | 701/300 |
| 2013/0052614 A1* | 2/2013 | Mollicone et al. | 434/65 |

FOREIGN PATENT DOCUMENTS

| | | |
|---|---|---|
| JP | 9-49875 | 2/1997 |
| JP | 2001-250197 | 9/2001 |
| JP | 2001-283391 | 10/2001 |
| JP | 2001-328451 | 11/2001 |
| JP | 2007-66047 | 3/2007 |
| JP | 2007-333385 | 12/2007 |
| WO | WO 2007/017476 A1 | 2/2007 |
| WO | WO 2009/103692 A1 | 8/2009 |

OTHER PUBLICATIONS

Office Action issued on Mar. 12, 2013 in the corresponding Chinese Patent Application No. 201110124885.2 (with English Translation).

Office Action dated Jan. 10, 2013 in co-pending U.S. Appl. No. 13/020,411.

Combined Chinese Office Action and Search Report Issued Nov. 30, 2012 in Patent Application No. 201110126438.0 (with English translation of relevant portions and English translation of Categories of Cited Documents).

Extended European Search Report issued Aug. 19, 2011, in European Patent Application No. 11002690.3.

Extended European Search Report issued Oct. 7, 2011, in European Patent Application No. 11002691.1.

Christian Lundquist, et al., "Tracking Stationary Extended Objects for Road Mapping using Radar Measurements", Intelligent Vehicles Symposium, 2009, IEEE, Piscataway, NJ., USA, XP-031489875, Jun. 3, 2009, pp. 405-410.

* cited by examiner

CHANGE OPPOSITE TO DIRECTION OF CURVE

CHANGE TO STRAIGHT LINE AT CURVE EXIT

ROAD CONFIGURATION ESTIMATION APPARATUS, COMPUTER PROGRAM, AND ROAD CONFIGURATION ESTIMATION METHOD

TECHNICAL FIELD

The present invention relates to a road configuration estimation apparatus that estimates a configuration of a road on which a moving object is located.

BACKGROUND ART

There is provided a device that estimates a configuration of a road, based on a result of observation by a camera or radar that monitors a running direction of a moving object. While a stationary object such as a delineator or a guardrail is present at a road edge, no stationary object is present on the roadway of the road. For this reason, when the position of the stationary object is known, the configuration of the road may be estimated.

RELATED ART DOCUMENTS

[Patent Document 1] JP Patent Application Publication JP-2001-250197A
[Patent Document 2] JP Patent Application Publication JP-2007-66047A

SUMMARY OF INVENTION

An observation device such as radar may observe an object that is not actually present due to an influence of noise, a multipath, or the like. Further, a moving object such as a preceding vehicle may be present on a road. Thus, it is necessary to make distinction between a stationary object and the moving object. When accuracy of distinction is low, the moving object may be erroneously determined to be the stationary object.

The present invention has been made to solve the above-mentioned problem, for example. An object of the invention is to preclude influences of erroneous detection and erroneous determination, thereby enhancing reliability of an approximate curve that approximates a road configuration.

A road configuration estimation apparatus of the present invention includes:
a relative position acquisition unit, a stationary object determination unit, an object correlation unit, and an approximate curve computation unit; wherein
the relative position acquisition unit obtains a result of an observation by a peripheral object observation device, the peripheral object observation device repeatedly observing a relative position of an object relative to a moving object, the object being located in the vicinity of the moving object;
the stationary object determination unit determines whether or not the object the relative position of which have been observed by the peripheral object observation device is still, based on the result of the observation obtained by the relative position acquisition unit;
the object correlation unit determines a plurality of the relative positions of an identical object observed by the peripheral object observation device from among the relative positions observed by the peripheral object observation device, based on the result of the observation obtained by the relative position acquisition unit; and
the approximate curve computation unit computes an approximate curve that approximates a configuration of a road on which the moving object is located, based on a result of the determination by the stationary object determination unit and a result of the determination by the object correlation unit.

ADVANTAGEOUS EFFECTS OF THE INVENTION

According to the road configuration estimation apparatus of the present invention, the approximate curve is computed based on a result of the determination by the stationary object determination unit and a result of the determination by the object correlation unit. Thus, influences of erroneous detection and erroneous determination may be precluded, and reliability of the computed approximate curve may be thereby enhanced.

DESCRIPTION OF EMBODIMENTS

Figure 1:
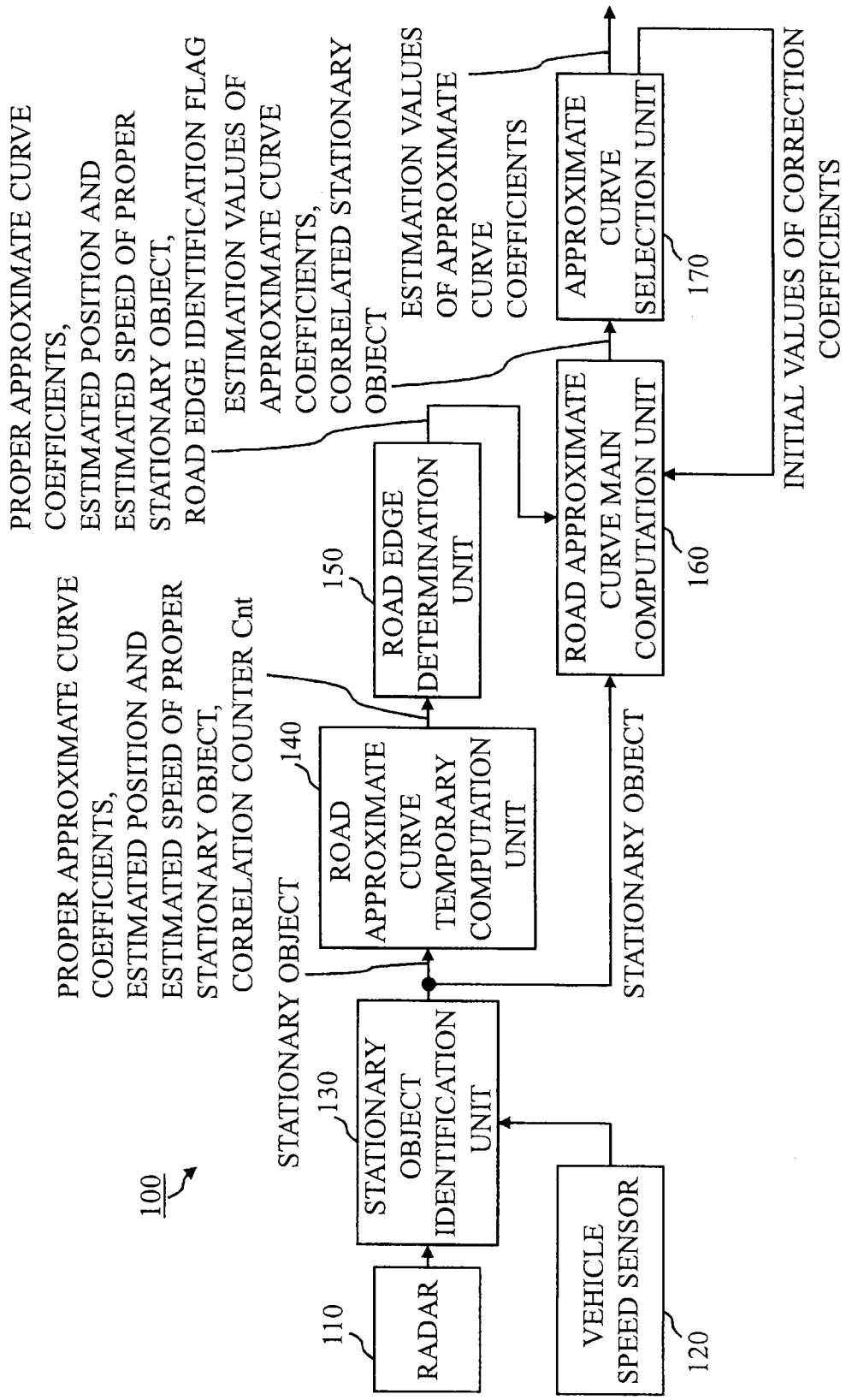
FIG. 1 is a block diagram showing a configuration of a road configuration recognition apparatus 100 in a first embodiment.

When monitoring the ahead of a vehicle, a road configuration recognition apparatus (road configuration estimation apparatus) recognizes a road configuration ahead of the vehicle, using a radar device mounted on the vehicle.

A vehicle front monitoring device is mounted on a vehicle, radiates a transmitted wave such as an optical wave or a milliwave ahead of the vehicle at a predetermined angle, and receives a reflected wave of the transmitted wave. The vehicle front monitoring device thereby recognizes another vehicle running ahead of the vehicle or an obstacle ahead of the vehicle. The vehicle front monitoring device needs to select the preceding vehicle that is running on a same lane as the vehicle from among detected objects. In order to select the preceding vehicle that is running far ahead of the vehicle in this case, it is necessary to accurately recognize the configuration of a road on which the vehicle is running.

As a method of recognizing the configuration of the road, there is provided a method in which the curvature of the road is computed by a steering angle sensor or a yaw rate sensor. However, the curvature of the road obtained by this method is the one close to the running position of the vehicle. Thus, when the vehicle is running on a straight line portion of the road and the preceding vehicle is running on a curved portion of the road that is curved ahead of the vehicle in a far distance, accurate selection of the preceding vehicle running on the same lane cannot be made. Further, the selection tends to be influenced by steering wobble or a side wind. For that reason, the configuration of the road is recognized, using a stationary object at an edge of the road.

The configuration of the road may be regarded as a circle with a radius R, and by connecting the current position of the stationary object and an intercept of an X axis (axis in a lateral direction with respect to the running direction of the vehicle) predicted based on the position and the speed of the stationary object, the configuration of the road is recognized, for example. However, an unwanted signal caused by a multipath wave may be observed as a stationary object in an actual road running environment. This may cause erroneous recognition of the configuration of the road. Further, an observation error may be produced at the position of a stationary object detected by radar. Thus, accuracy of the recognized road configuration deteriorates due to the observation error.

As another method of recognizing the configuration of the road, configurations of the road on the right and left sides are regarded to be the same, and the road configurations are recognized by estimating coefficients of an approximate curve that approximates the road configuration by a least square method, using observation values of a plurality of stationary objects obtained at each time, for example. This method, however, is based on the premise that the configurations of the road on the right and left sides are the same. Thus, the road configuration cannot be accurately estimated when the configurations on the right and left side of the road are different as at a fork in the road. When time-series data of the approximate curve coefficients are supplied to a tracking filter to smooth the coefficients, it is difficult of define an observation error of each coefficient. Thus, the coefficients cannot be accurately determined.

According to a road configuration estimation apparatus that will be described below, proper stationary objects that are continuous in a temporal direction are extracted from among stationary objects including an unwanted signal. Then, by computing approximate curve coefficients, a road configuration may be stably estimated even in an environment including the unwanted signal. Further, by directly supplying positions of all stationary objects to the tracking filter where the approximate curve coefficients are set as initial values and by estimating approximate curve coefficients, accuracy of estimating the approximate curve coefficients is further improved.

First Embodiment

A first embodiment will be described, using FIGS. 1 to 13.

FIG. 1 is a block diagram showing a configuration of a road configuration recognition apparatus 100 in this embodiment.

The road configuration recognition apparatus 100 includes radar 110, a vehicle speed sensor 120, a stationary object identification unit 130, a road approximate curve temporary computation unit 140, a road edge determination unit 150, a road approximate curve main computation unit 160, and an approximate curve selection unit 170.

The radar 110 (peripheral object observation device) radiates a radar wave within a predetermined angle range ahead of a vehicle, and receives a radar wave reflected from an object, thereby detecting the position and relative speed of the object.

The vehicle speed sensor 120 (moving speed observation device) detects the speed of the vehicle.

The stationary object identification unit (stationary object determination unit) 130 identifies whether or not the object detected by the radar 110 is a stationary object, based on the relative speed of the object detected by the radar 110 and the speed of the vehicle detected by the vehicle speed sensor 120. The stationary object identification unit 130 outputs the position of the stationary object and the like.

The road approximate curve temporary computation unit (initial value computation unit) 140 extracts proper stationary objects that are correlated in a temporal direction by a tracking filter from among a plurality of stationary objects identified as stationary objects, and estimates coefficients of a proper approximate curve using time-series data of the proper stationary objects. The road approximate curve temporary computation unit 140 outputs the coefficients of the proper approximate curve, the estimated position and estimated speed of the proper stationary object, a correlation count Cnt, and the like.

The road edge determination unit 150 sorts the proper approximate curve into a corresponding road edge based on an intercept of the proper approximate curve in an X (axle) direction. The road edge determination unit 150 outputs the coefficients of the proper approximate curve, the estimated position and estimated speed of the proper stationary object, a road edge identification flag, and the like.

The road approximate curve main computation unit (approximate curve computation unit) 160 receives all stationary objects identified as the stationary objects by the stationary object identification unit 130, and updates (estimates) the coefficients of the approximate curve, using the tracking filter. The tracking filter uses, as initial values, the coefficients of the proper appropriate curve for the proper stationary object, which has been sorted into the corresponding road edge by the road edge determination unit 150. The road approximate curve main computation unit 160 outputs the estimation values of approximate curve coefficients, the position of the correlated stationary object, and the like.

The approximate curve selection unit 170 computes estimation values of approximate curve coefficients that are finally used for preceding vehicle determination, using the approximate curve of each road edge computed by the road approximate curve main computation unit 160 and a stationary object correlated with the approximate curve. The approximate curve selection unit 170 outputs the estimation values of the approximate curve coefficients, initial values of correction coefficients, and the like.

Next, operation will be described.

Figure 2:
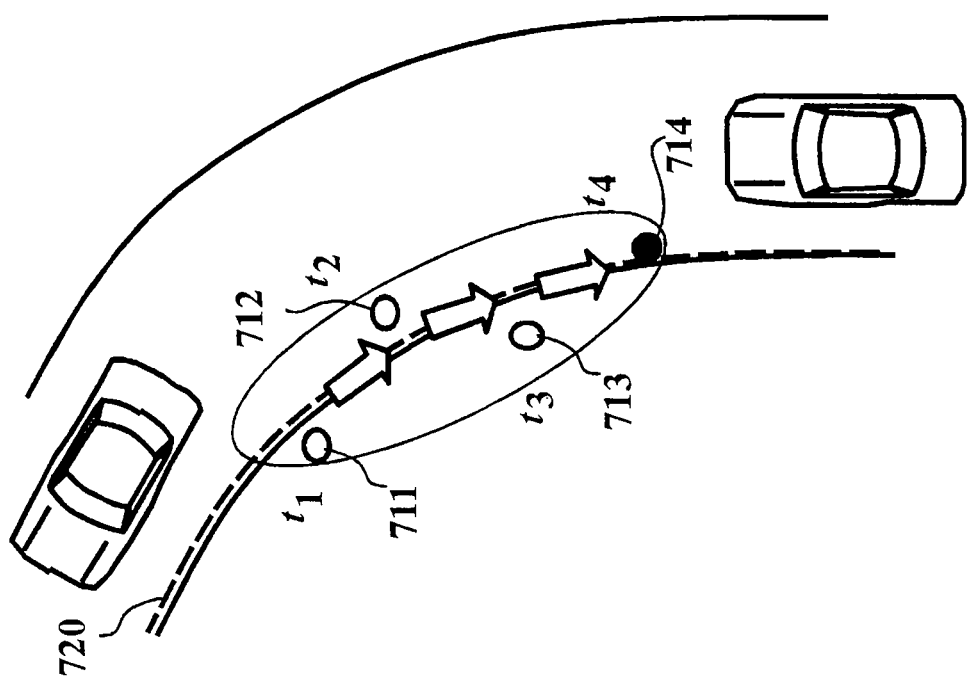
FIG. 2 is a diagram for explaining a tracking process of stationary objects in the first embodiment.

FIG. 2 is a diagram for explaining a tracking process of stationary objects in this embodiment.

The road approximate curve temporary computation unit 140 extracts proper stationary objects that may be correlated in the temporal direction from a plurality of stationary objects by the tracking filter (known filter such as a Kalman filter or an $\alpha$-$\beta$(-$\gamma$) filter) as shown in FIG. 2. FIG. 2 shows stationary objects 711 to 714 that are continuously correlated in the temporal direction from times $t_1$ to $t_4$. Increase of correlated data improves accuracy of approximating a road. However, it makes time longer for recognizing the road. That is a tradeoff. Accordingly, the road approximate curve temporary computation unit 140 estimates an approximate curve 720 of the road using the proper stationary objects 711 to 714 correlated a predetermined number of times Cn. As a method of estimating the approximate curve 720, a known technique such as a least square method or a Hough transform may be used. The approximate curve 720 may be a quadratic, cubic or higher order curve, a circle, a clothoid curve, or the like.

Figure 3:
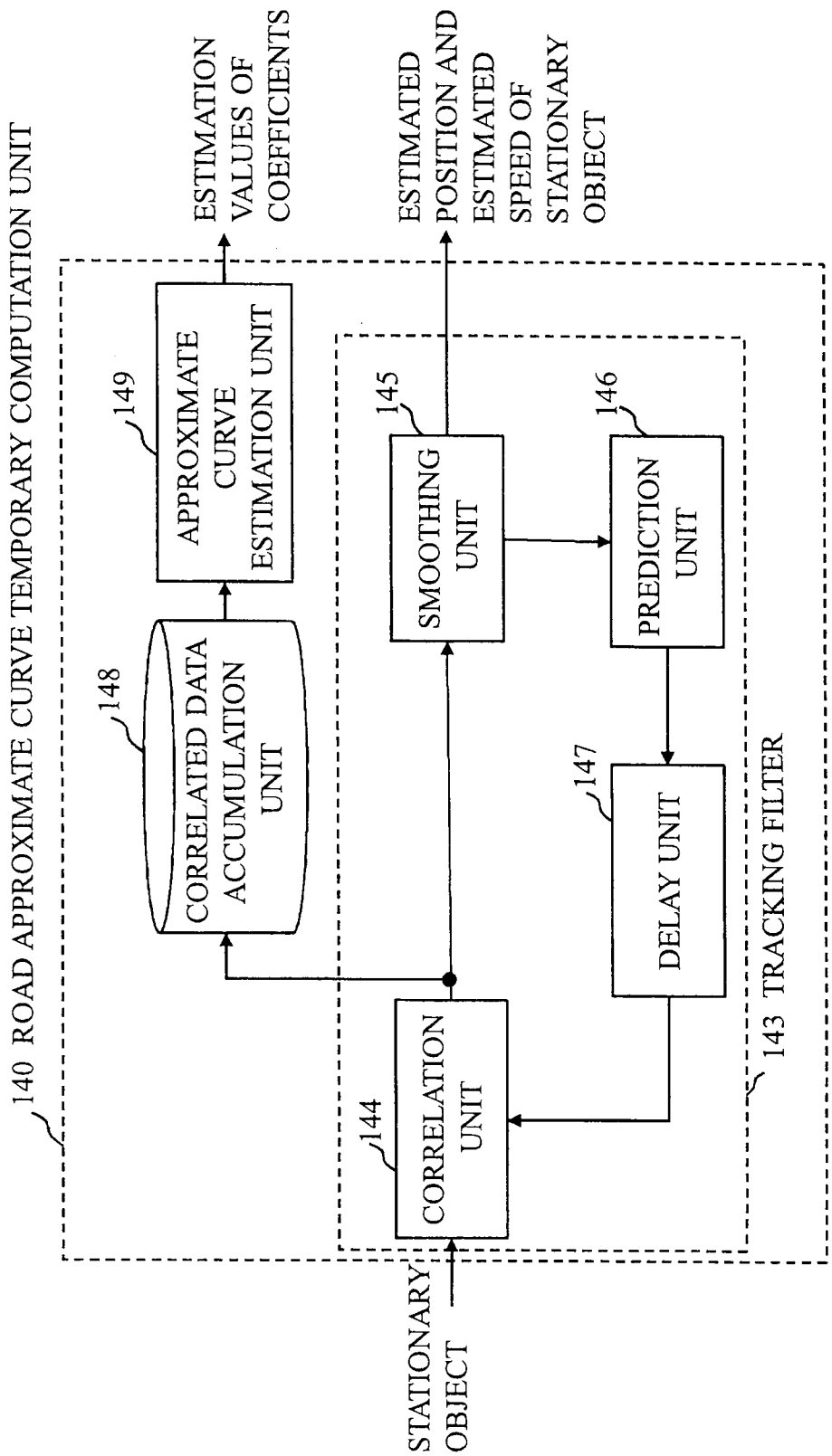
FIG. 3 is a block diagram showing an example (collective process) of a road approximate curve temporary computation unit 140 in the first embodiment.

FIG. 3 is a block diagram showing an example (a collective process) of the road approximate curve temporary computation unit 140 in this embodiment.

The road approximate curve temporary computation unit 140 includes a tracking filter 143, a correlated data accumulation unit 148, and an approximate curve estimation unit 149, for example. The tracking filter 143 includes a correlation unit 144, a smoothing unit 145, a prediction unit 146, and a delay unit 147.

The correlation unit 144 of the road approximate curve temporary computation unit 140 takes correlation among stationary objects.

The smoothing unit 145 of the road approximate curve temporary computation unit 140 smoothes positions and speeds of correlated stationary objects, thereby estimating the position and the speed of a stationary object.

The approximate curve estimation unit 149 of the road approximate curve temporary computation unit 140 accumulates time-series data of a certain stationary object, and estimates coefficients that define an approximate curve using the least square method, based on the time-series data.

Figure 4:
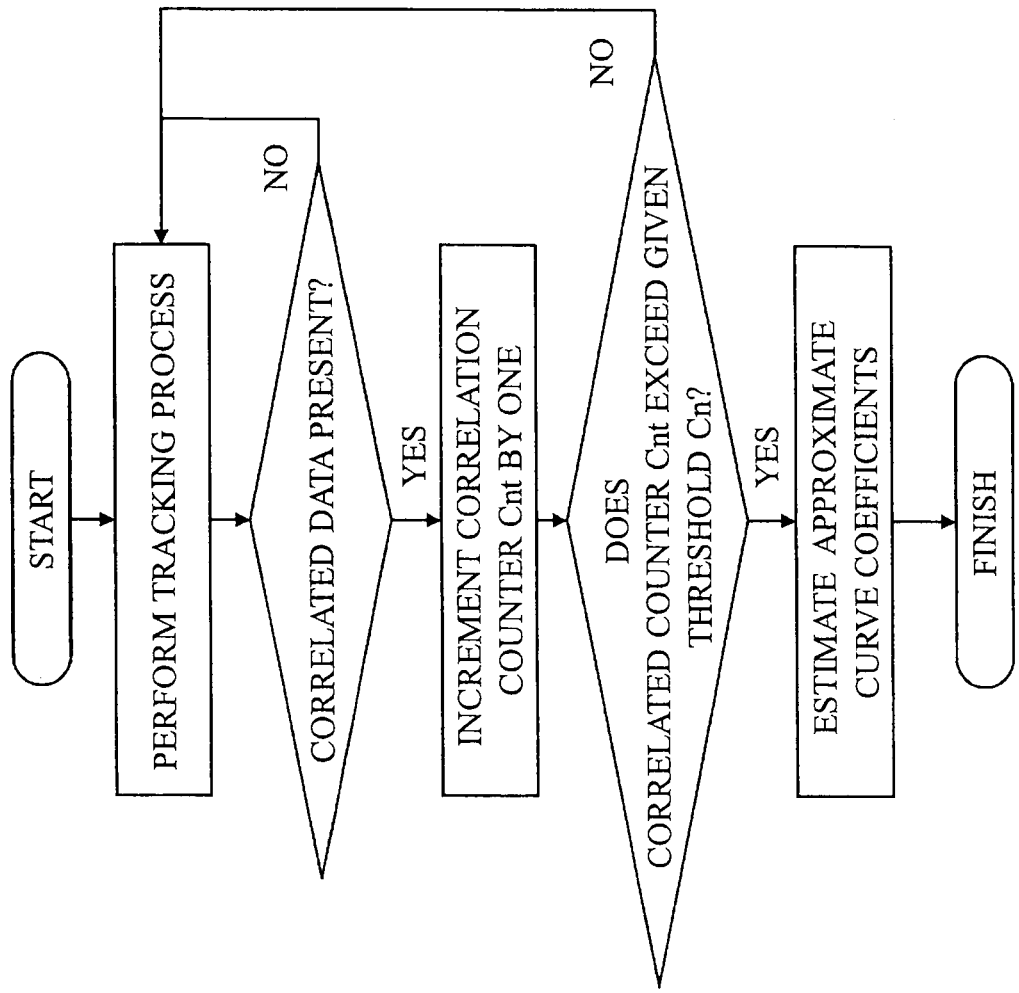
FIG. 4 is a process flow diagram of the road approximate curve temporary computation unit 140 in the first embodiment.

FIG. 4 is a process flow diagram of the road approximate curve temporary computation unit 140 in this embodiment.

The road approximate curve temporary computation unit 140 performs process shown in this flow. When the tracking filter extracts a correlated stationary object, the road approximate curve temporary computation unit 140 increments a correlation counter Cnt by one. Then, when it exceeds a threshold Cn, the road approximate curve temporary computation unit 140 estimates coefficients of a proper approximate curve using positions of stored proper stationary objects.

The road approximate curve temporary computation unit 140 may be configured to estimate proper approximate curve coefficients using accumulated positions of a stationary object when a distance from a moving object to the stationary object is closer to a predetermined threshold value, irrespective of the value of the correlation counter Cnt. Alternatively, the road approximate curve temporary computation unit 140 may be configured to estimate proper approximate curve coefficients using accumulated positions of the stationary object when at least one of the two conditions is satisfied: one of the conditions is that the value of the correlation count Cnt exceeds the threshold Cn, and the other is that the distance from the moving object to the stationary object is closer to the threshold value.

Figure 5:
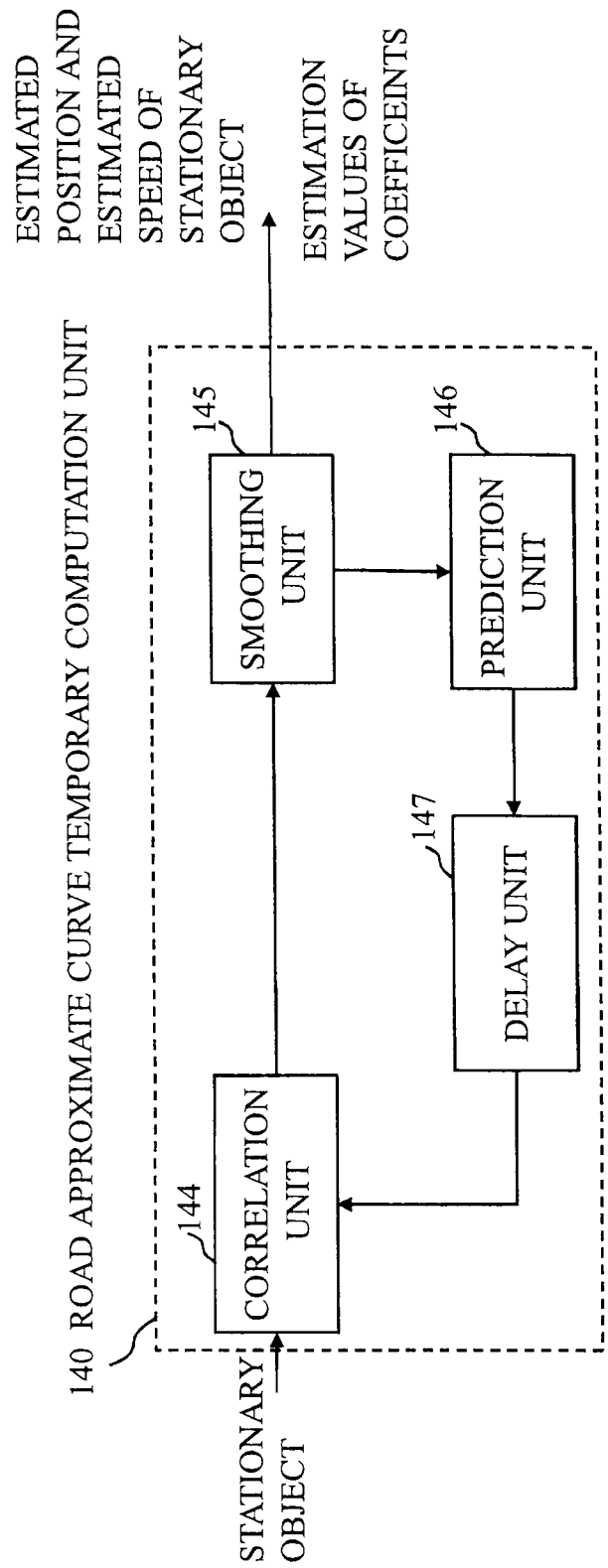
FIG. 5 is a block diagram showing another example (sequential process) of the road approximate curve temporary computation unit 140 in the first embodiment.

FIG. 5 is a block diagram showing another example (sequential process) of the road approximate curve temporary computation unit 140 in this embodiment.

The road approximate curve temporary computation unit 140 includes the correlation unit 144, the smoothing unit 145, the prediction unit 146, and the delay unit 147, for example.

The road approximate curve temporary computation unit 140 simultaneously estimates coefficients of an approximate curve, the position and speed of a stationary object, using a sequential process by an extended Kalman filter.

Coefficients of a proper approximate curve may be estimated by the sequential process as shown in FIG. 5. Thus, the size of a memory that stores data may be reduced.

In the following description, it is assumed that the approximate curve is a quadratic curve, for convenience of the description. An observation model of the extended Kalman filter is defined by Equations (2) to (5), with the approximate curve defined as the quadratic curve having an inclination $\underline{a}$ and an X-intercept $\underline{b}$ as in Equation (1).

[Expression 11]

$$x = ay^2 + b \quad (1)$$

$$z_{ok} = h(X_k) + v_k \quad (2)$$

$$X_k = [x \; y \; \dot{x} \; \dot{y} \; a \; b]^T \quad (3)$$

$$z_{ok} = [x_{ok} \; y_{ok}]^T \quad (4)$$

$$h(X_k) = \begin{bmatrix} ay^2 + b \\ y \end{bmatrix} \quad (5)$$

where x, y denote the position of a stationary object in a relative coordinate system in which radar of the vehicle is set to the origin, a vehicle axle direction is set to an X axis, and a running direction is set to a Y axis. A state vector $X_k$ is formed of x and y, the position of the stationary object, x dot (x with a dot above, same as below) and y dot, the speed of the stationary object, and a and b, the coefficients of the quadratic curve. $z_{ok}$ denotes the observed position of the stationary object, $h(X_k)$ denotes the real position of the stationary object, $v_k$ denotes an observation noise vector. Then, the estimation value of the state vector $X_k$ is updated at each time. Accordingly, the coefficients $\underline{a}$ and $\underline{b}$ of the proper approximate curve can be computed.

The road approximate curve temporary computation unit 140 outputs the estimated position and the estimated speed of the proper stationary object at a most recent time and the coefficients of the proper approximate curve (and the correlation counter Cnt) to the road edge determination unit 150.

Figure 6:
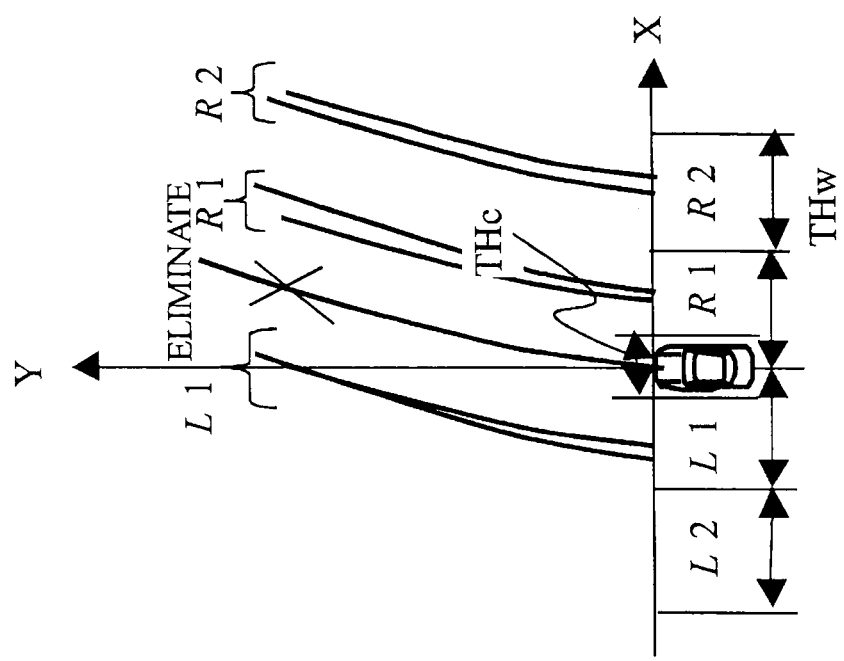
FIG. 6 is an explanatory diagram of road edge determination by a road edge determination unit 150 in the first embodiment.

FIG. 6 is an explanatory diagram of road edge determination by the road edge determination unit 150 in this embodiment.

The road edge determination unit 150 sorts an approximate curve into a corresponding road edge based on a lane width and an intercept in the X direction (vehicle axle direction) of the approximate curve computed from a proper stationary object. The road edge determination unit 150 receives the coefficients of the proper approximate curve and sorts the proper approximate curve to a corresponding road edge, using the position intersecting between the approximate curve and the X axis (that is, X-intercept b). In the road edge sorting method, the width of the vehicle is first considered. When the X-intercept b of the approximate curve falls within range from the position of the vehicle (origin) to a threshold $TH_c$, the road edge determination unit 150 eliminates the approximate curve. Then, the road edge sorting is performed in consideration of a lane width $TH_w$, as shown in FIG. 6:

[Expression 12]

$$TH_c < b < TH_w \quad (6)$$

$$TH_w \le b < TH_w \times 2 \quad (7)$$

The coefficient b of an approximate curve sorted into a road edge R1 in FIG. 6, for example, satisfies Relational Expression (6). The coefficient b of an approximate curve sorted into a road edge R2 satisfies Relational Expression (7). When the coefficient b satisfies Relational Expression (6), the road edge identification flag is set to R1. When the coefficient b satisfies Relational Expression (7), the road edge identification flag is set to R2. The road edge determination unit 150 outputs the estimated position and the estimated speed of the proper stationary object, the coefficients of the proper approximate curve, and the road edge identification flag for the proper approximate curve to the road approximate curve main computation unit 160.

[Expression 13]

$$STATUS(i) = [x \dot{x} y \dot{y} ab Cnt \text{flag} R] \quad (8)$$

With respect to an i-th proper stationary object, for example, the road edge determination unit 150 outputs x and y, the estimated position of the proper stationary object, x dot and y dot, the estimated speed of the proper stationary object, a and b, the coefficients of the proper approximate (quadratic) curve, Cnt, a correlation counter, and flagR, a road edge identification flag at a most recent time to the road approximate curve main computation unit 160, as shown in Equation (8).

Figure 7:
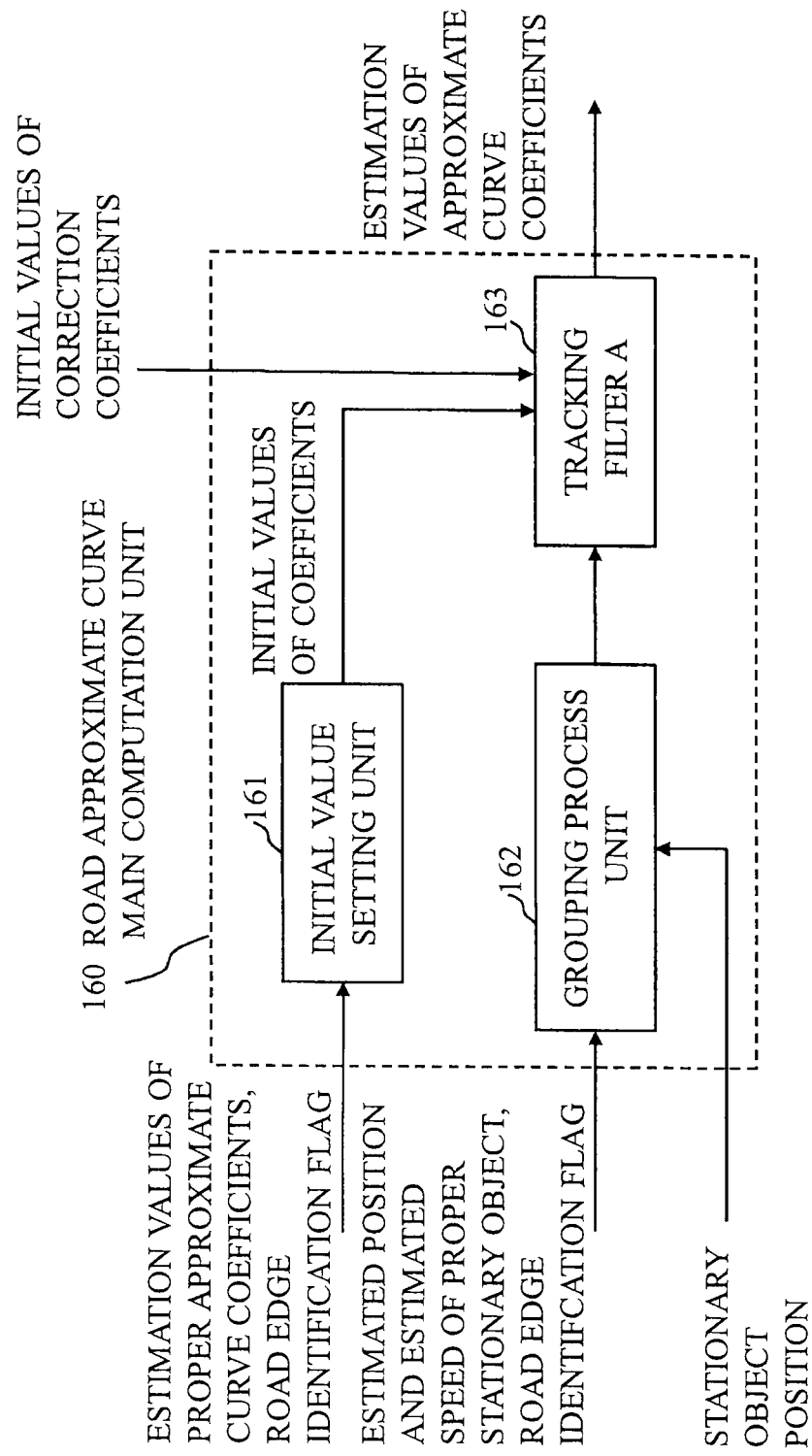
FIG. 7 is a block diagram of a road approximate curve main computation unit 160 in the first embodiment.

FIG. 7 is a block diagram of the road approximate curve main computation unit 160 in this embodiment.

The road approximate curve main computation unit 160 includes an initial value setting unit 161, a grouping process unit 162, and a tracking filter A163, for example.

The road approximate curve main computation unit 160 sets coefficients of the proper approximate curve of the proper stationary object having the highest number of times of correlations in the temporal direction among the proper stationary objects sorted into the same road edge, as initial values of the tracking filter. The initial value setting unit 161 of the road approximate curve main computation unit 160 receives the coefficients of the proper approximate curve and the road edge identification flag for the proper approximate curve. When the road edge identification flag for each proper stationary object shows that a plurality of proper stationary objects are present at the identical road edge, the initial value setting unit 161 sets average values of the coefficients of the proper approximate curves as the initial values of the tracking filter that will be described later. Alternatively, the initial value setting unit 161 may set the coefficients of the proper approximate curve estimated from the stationary object having a largest value of the correlation counter Cnt, as the initial values.

The road approximate curve main computation unit 160 performs grouping of stationary objects located in a predetermined threshold range in the vicinity of each proper stationary object, based on the road edge identification flag for each proper stationary object and the estimated position of each proper stationary object. Then, the road approximate curve main computation unit 160 sorts the stationary objects that have been regarded to belong to a same group into a corresponding road edge. To take an example, the grouping process unit 162 of the road approximate curve main computation unit 160 performs grouping of the stationary objects located in the predetermined threshold range in the vicinity of each proper stationary object, based on the road edge identification flag for each proper stationary object and the estimated position and estimated speed of each proper stationary object that have been output from the road edge determination unit 150. Then, the grouping process unit 162 sorts the stationary objects that have been regarded to belong to the same group into the corresponding road edge.

Figure 8:
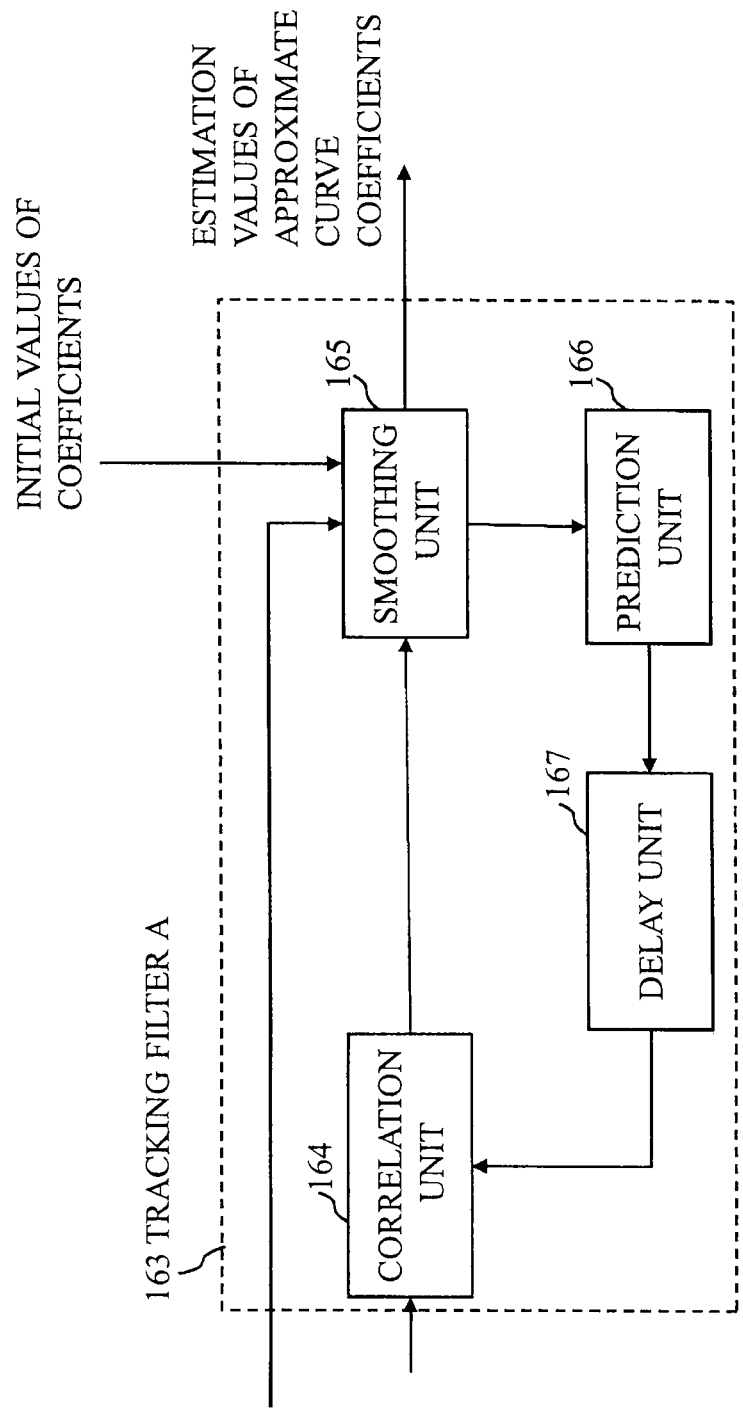
FIG. 8 is a block diagram of a tracking filter A163 of the road approximate curve main computation unit 160 in the first embodiment.

FIG. 8 is a block diagram of the tracking filter A163 of the road approximate curve main computation unit 160 in this embodiment.

The tracking filter A163 includes a correlation unit 164, a smoothing unit 165, a prediction unit 166, and a delay unit 167, for example.

The road approximate curve main computation unit 160 receives all stationary objects, extracts one of the stationary objects that is correlated with a corresponding road edge according to a correlation process by the tracking filter. Then, the road approximate curve main computation unit 160 computes approximate curve coefficients for the corresponding road edge, using the correlated stationary object and the tracking filter. The road approximate curve main computation unit 160 directly supplies to the tracking filter which estimates the approximate curve coefficients for the corresponding road edge one of all the stationary objects that has already been sorted into a corresponding road edge, without executing the correlation process by the tracking filter. As shown in FIG. 8, the tracking filter A163 of the road approximate curve main computation unit 160 directly supplies the stationary object that has already been sorted into a corresponding one of road edges to the smoothing unit 165, thereby updating estimation values of approximate curve coefficients for the corresponding road edge, for example. The stationary object that has not been sorted into the corresponding road edge is correlated with the approximate curve by the correlation unit 164. With respect to the stationary object that has been correlated with a certain road edge, estimation values of approximate curve coefficients for the certain road edge are updated.

The coefficients a and b are updated, using the Kalman filter based on an observation model defined by the following Equations (9) to (11), for example:

[Expression 14]

$$x_{ok} = HX_k + v_{x,k} \qquad (9)$$

$$X_k = [\,a\ \ b\,]^T \qquad (10)$$

$$H = [\,y_{ok}^2\ \ 1\,] \qquad (11)$$

$$X_{k+1} = FX_k + w_{x,k}$$

$$F = \begin{bmatrix} 1 & 0 \\ 0 & 1 \end{bmatrix}$$

where a state vector $X_k$ is formed of the coefficients a and b of the quadratic curve. $x_{ok}$ denotes the observed position of the stationary object in the X direction, H denotes an observation matrix, $v_{x,k}$ denotes an observation noise vector, F denotes a state transition matrix, $w_{x,k}$ denotes a process noise vector. An α–β filter, having a light operation load, may be used as the tracking filter.

To the state vector $X_k$, a dot and b dot, which are respectively change rates of the coefficients a and b, may be added.

$$X_k = [\,a\ \ b\ \ \dot{a}\ \ \dot{b}\,]^T \qquad \text{[Expression 15]}$$

$$H = [\,y_{ok}^2\ \ 1\ \ 0\ \ 0\,]$$

$$F = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix}$$

The road approximate curve main computation unit 160 sets the average values of the coefficients of the proper approximate curves sorted into the identical road edge as the initial values of the tracking filter. Initial values of coefficients output from the initial value setting unit 161 are used as the initial values of the approximate curve coefficients for the road edge, for example. A stationary object used for estimation of the coefficients of an approximate curve of each road edge is referred to as a correlated stationary object. Estimation values of the coefficients of the approximate curve for each road edge and the correlated stationary object are output to the approximate curve selection unit 170.

Figure 9:
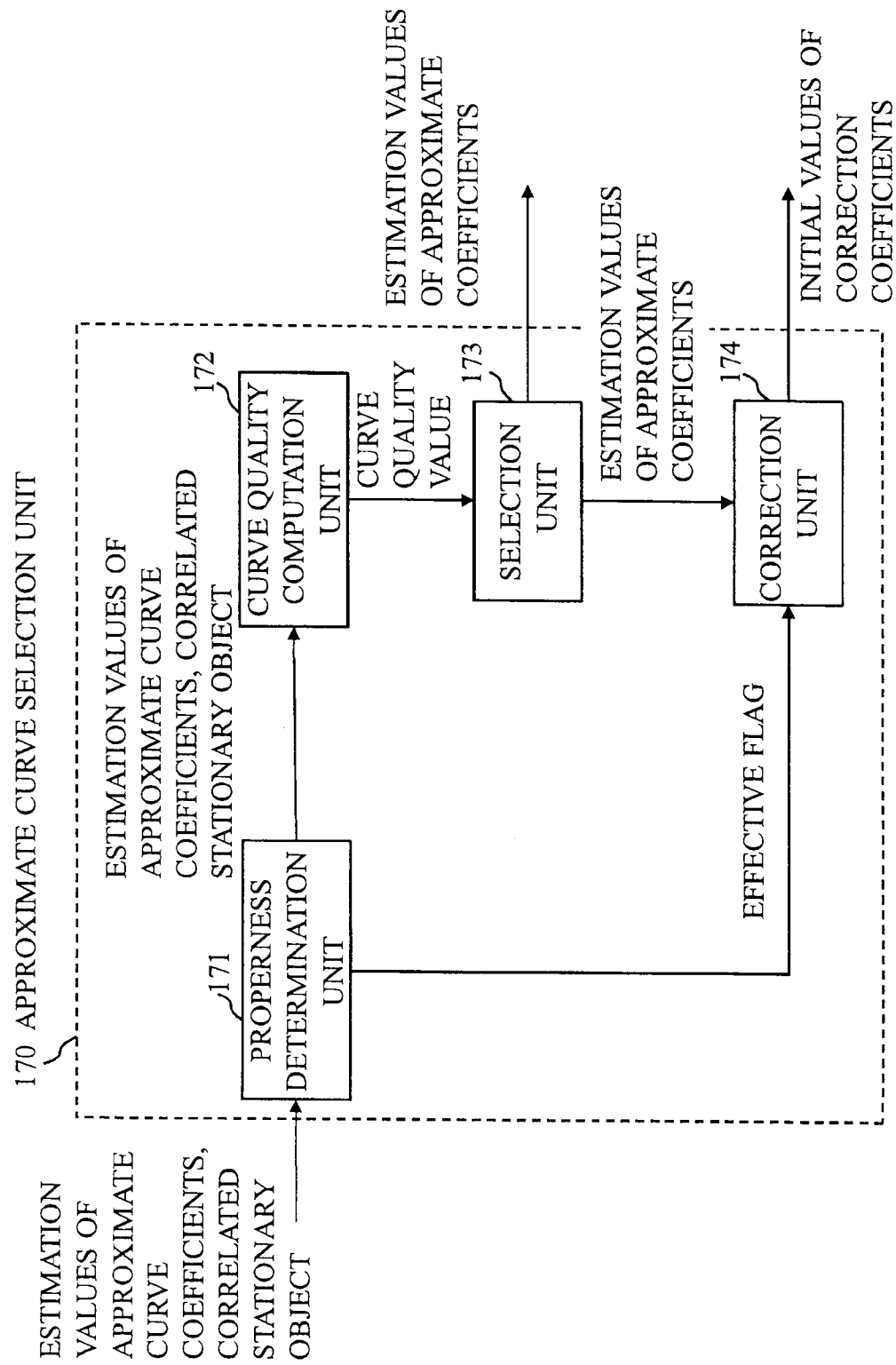
FIG. 9 is a block diagram of an approximate curve selection unit 170 in the first embodiment.

FIG. 9 is a block diagram of the approximate curve selection unit 170 in this embodiment.

The approximate curve selection unit 170 includes a properness determination unit 171, a curve quality computation unit 172, a selection unit 173, and a correction unit 174.

The properness determination unit 171 (reliability level computation unit) of the approximate curve selection unit 170 sets an effective flag to 1 for estimation values of approximate curve coefficients that satisfy all of the following three conditions, and sets the effective flag to 0 for estimation values of approximate curve coefficients that do not satisfy at least one of the following three conditions.

Condition (1): A maximum value $y_o^{max}$ distance in a y direction of a correlated stationary object is equal to or more than a threshold $y_{max}$.

Condition (2): A distance distribution $y_o^{div}$ in the y direction of the correlated stationary object is equal to or more than a threshold $y_{div}$.

Condition (3): The number of correlated stationary objects M is equal to or more than a predetermined value $M_{min}$.

The minimum value of the distance in the y direction of the correlated stationary object is denoted as $y_o^{min}$, and the maximum value of the distance in the y direction of the correlated stationary object is denoted as $y_o^{max}$. The distance distribution $y_o^{div}$ is defined by the following Equation (12):

[Expression 16]

$$y_o^{div} = y_o^{max} - y_o^{min} \quad (12)$$

The properness determination unit 171 outputs the estimation values of the approximate curve coefficients having the effective flag of one and the correlated stationary object used for estimation of the approximate curve coefficients to the curve quality computation unit 172, and outputs all the estimation values of the approximate curve coefficients and the effective flags for all the estimation values to the correction unit 174.

Figure 10:
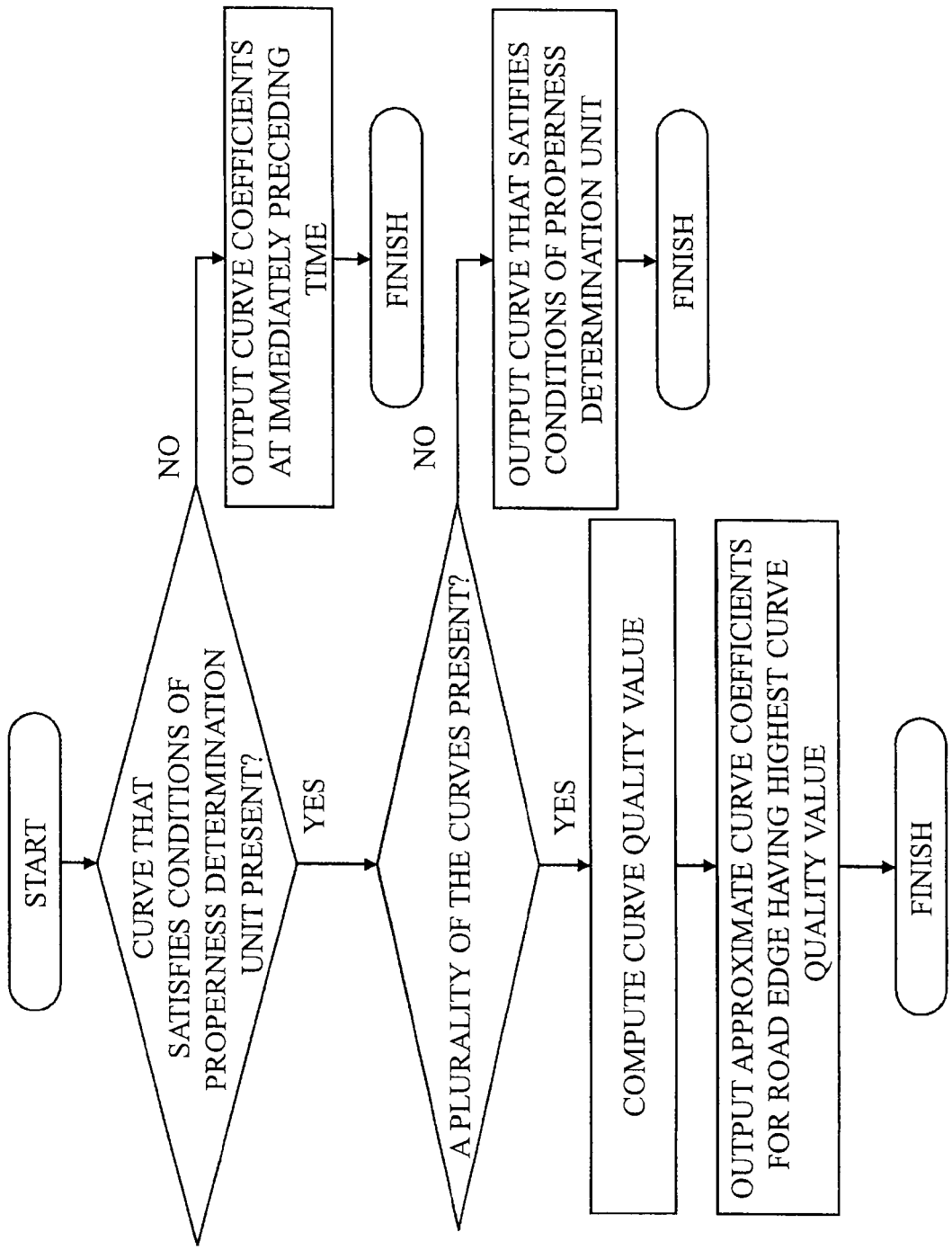
FIG. 10 is a flowchart for selecting an approximate curve by the approximate curve selection unit 170 in the first embodiment.

FIG. 10 is a flowchart for selecting an approximate curve by the approximate curve selection unit 170 in this embodiment.

The approximate curve selection unit 170 determines properness using the distance of each stationary object that is correlated with the approximate curve of a road edge in the vehicle running direction (Y direction) and the number of correlated stationary objects, and outputs only coefficients of the approximate curve that is proper. When no proper approximate curve is present, the approximate curve selection unit 170 outputs approximate curve coefficients at an immediately preceding time.

The curve quality computation unit (reliability level computation unit) 172 of the approximate curve selection unit 170 computes curve quality values, which will be described later, when there are a plurality of road edges each for which the effective flag is set to one. Then, the curve quality computation unit 172 outputs approximate curve coefficients for a road edge having a highest curve quality value.

Figure 11:
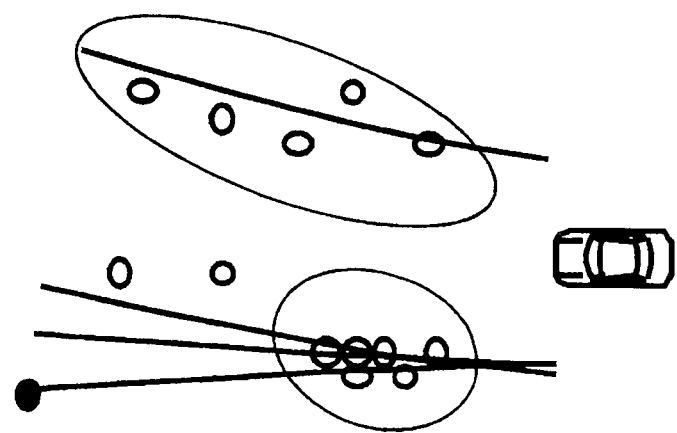
FIG. 11 is a diagram for explaining a difference between correlated stationary objects located at respective road edges.

FIG. 11 is a diagram for explaining a difference between correlated stationary objects located at respective road edges.

Estimation values of coefficients are not stable, for a curve where a lot of stationary objects are correlated but the correlated stationary objects are localized as shown in FIG. 11. On contrast therewith, on a curve having stable coefficient estimation values, correlated stationary objects are evenly distributed in the Y direction.

Figure 12:
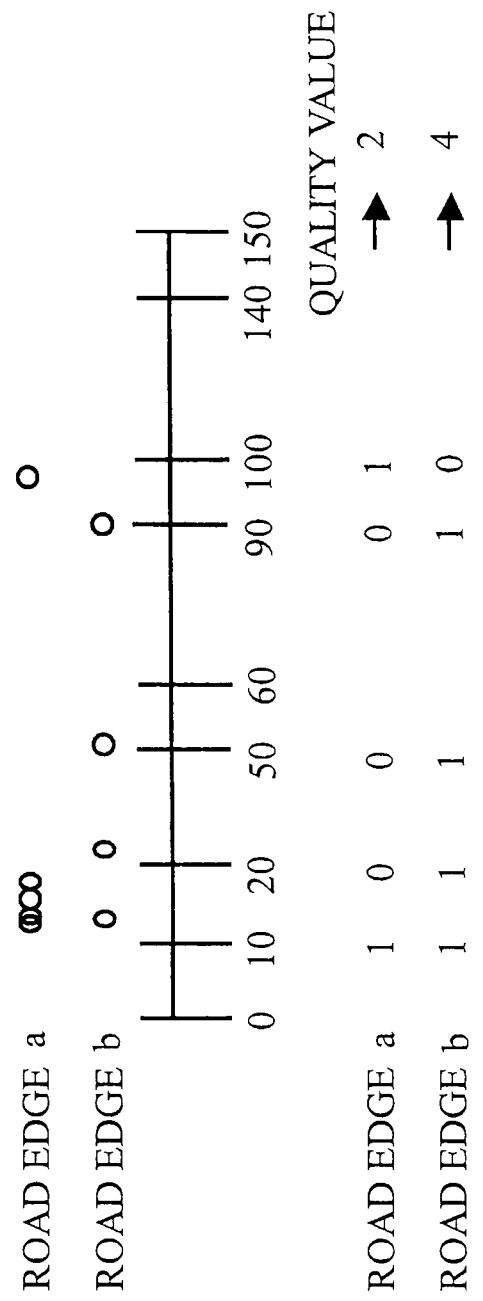
FIG. 12 is a diagram for explaining an example of a curve quality value computation method by a curve quality computation unit 172 in the first embodiment.

FIG. 12 is a diagram for explaining an example of a curve quality value computation method by the curve quality computation unit 172 in this embodiment.

The number of correlated stationary objects at a road edge A is larger than that at a road edge B. However, the correlated stationary objects at the road edge A are localized in a region in the vicinity of 10 m point. On contrast therewith, the correlated stationary objects at the road edge B are evenly distributed in a wide range of 10 m, 20 m, 50 m, and 90 m points. For this reason, estimation values of approximate curve coefficients for the road edge B are more stable and reliable than those for the road edge A.

Taking advantage of a feature that more evenly stationary objects are distributed at a road edge in the Y direction, more stable estimation values of approximate curve coefficients for the road edge are obtained, the curve quality computation unit 172 is configured to compute a curve quality value, in view of stationary object distribution in the Y direction.

The approximate curve selection unit 170 performs clustering of stationary objects using the distance in the vehicle running direction (Y direction) of each stationary object correlated with the approximate curve of a road edge. The number of clusters is regarded as a curve quality value. Then, the approximate curve selection unit 170 outputs the inclination of the approximate curve or the road curvature of the road edge having a high curve quality value. Specifically, the curve quality computation unit 172 divides a distance in the Y direction at certain intervals of (10 m, for example), and brings together stationary objects located in the range of each divided distance as one cluster. When there are four correlated stationary objects and the Y-direction distances of the four correlated stationary objects are respectively 8 m, 12 m, 18 m, and 22 m, for example, these correlated stationary objects are allocate to two clusters of 10 m and 20 m. When the y-direction distances of the stationary objects are respectively 8 m, 18 m, and 32 m, the stationary objects are allocated to three clusters of 10 m, 20 m, and 30 m. Then, the curve quality computation unit 172 counts the number of clusters for each road edge, and computes a curve quality value by summation for a certain period (L samples). The curve quality value is computed by the following Equation (13):

[Expression 17]

$$CQ = \sum_{k=K-L+1}^{K} \sum_{j=1}^{N_c} M_k(j) \quad (13)$$

$$M(j) = \begin{cases} 1 & \text{(when an observation value exists in the cluster)} \\ 0 & \text{(when no observation value exists in the cluster)} \end{cases} \quad (14)$$

where $N_c$ indicates the number of clusters, $M_k(j)$ indicates a flag in a cluster j computed at a certain time $t_k$. As shown in Equation (14), when there is a stationary object, the flag is set to 1, and when there is no stationary object, the flag is set to zero.

Figure 13:
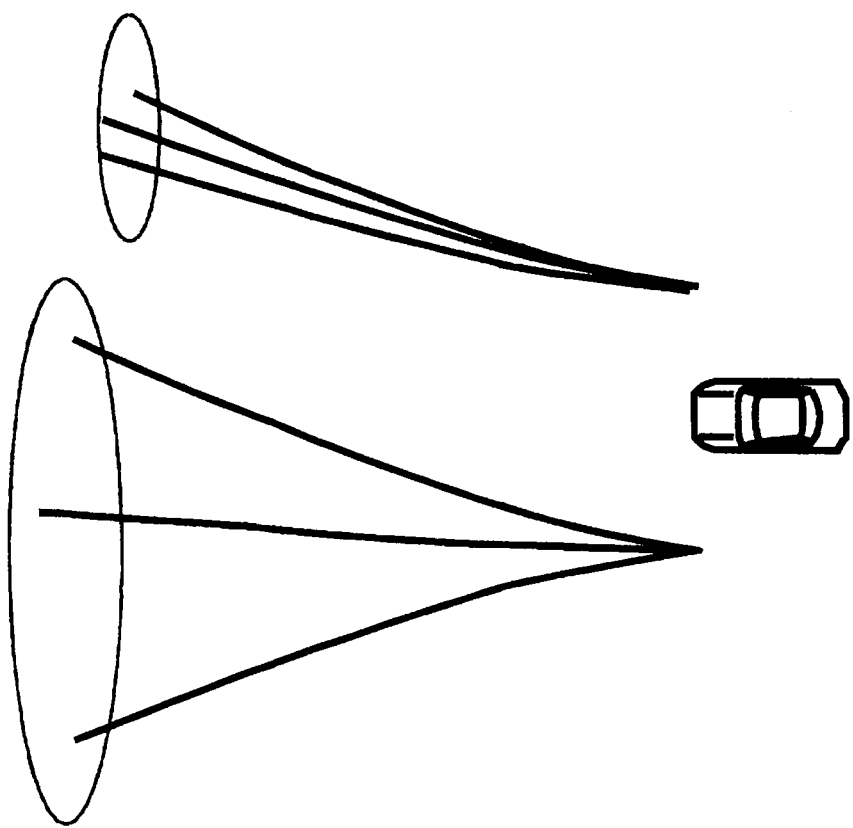
FIG. 13 is a diagram for explaining another example of the curve quality value computation method by the curve quality computation unit 172 in the first embodiment.

FIG. 13 is a diagram for explaining another example of the curve quality value computation method by the curve quality computation unit 172 in this embodiment.

The curve quality computation unit 172 may be configured to compute a curve quality value according to a temporal change in coefficients of an approximate curve or a value obtained by converting the coefficients to a road curvature. An actual road is designed in consideration of a driving operation of a vehicle. The actual road is designed in such a manner that when the vehicle enters a curve of the road, the curvature of the road gradually increases. For this reason, when the change rate of the road curvature is large as at a road edge on the left side of the page of FIG. 13, estimation values of approximate curve coefficients for the road edge may be regarded as not being stable. When the inclination of an approximate curve gradually changes as at a road edge on the right side of the page of FIG. 13, estimation values of approximate curve coefficients for the road edge may be regarded as being stable.

The approximate curve selection unit 170 sets the inverse of the variance of a temporal change in estimation values of the approximate curve coefficients or an estimation value of the road curvature for a road edge as the curve quality value, and outputs the inclination of the approximate curve or road curvature of the road edge having a high curve quality value. The curve quality computation unit 172 stores time-series data on the change rate of the road curvature, and computes the inverse of the variance of the change rate as the curve quality value.

The curve quality value computed by the curve quality computation unit 172 is output to the selection unit 173.

The selection unit 173 of the approximate curve selection unit 170 selects the estimation values of the approximate curve coefficients having a highest curve quality value, and outputs the coefficient values other than the X-intercept (that corresponds to the estimation value of a road width) to the correction unit 174. In the case of the quadratic curve given by Equation (1), the selection unit 173 outputs only the inclination a. The selection unit 173 may convert the inclination a to the curvature of the road and then may output the curvature of the road. Since the X-intercept b corresponds to the road width, the X-intercept b is not necessary when correction is made about a different road edge.

The approximate curve selection unit 170 initializes coefficients of an approximate curve that is not proper, using the coefficients of the approximate curve that is proper and has the highest curve quality value as initial values. To take an example, the correction unit 174 of the approximate curve selection unit 170 initializes estimation values of the coefficients of an approximate curve for a road edge having the effective flag of zero, using the estimation values of the coefficients of the approximate curve output from the selection unit 173 of the approximate curve selection unit 170 and the effective flags for all road edges supplied from the properness determination unit 171. For initialization of the estimation values of the coefficients of the approximate curve having the effective flag of zero, the coefficients of the approximate curve for the road edge having the highest curve quality value are used as the initial values. The correction unit outputs initial values of correction coefficients to the road approximate curve main computation unit 160.

As described above, by extracting proper stationary objects that are continuous in the temporal direction from among stationary objects including an unwanted signal and computing coefficients of an approximate curve for a road edge, a road configuration may be estimated even under an environment including the unwanted signal. Further, by directly supplying positions of all stationary objects to the tracking filter using the approximate curve coefficients as the initial values and estimating coefficients of an approximate curve, accuracy of estimation of the coefficients of the approximate curve may be further improved.

Second Embodiment

A second embodiment will be described using FIG. 14.

Same reference numerals are assigned to components common to those in the first embodiment, thereby omitting repeated description of the components.

Figure 14:
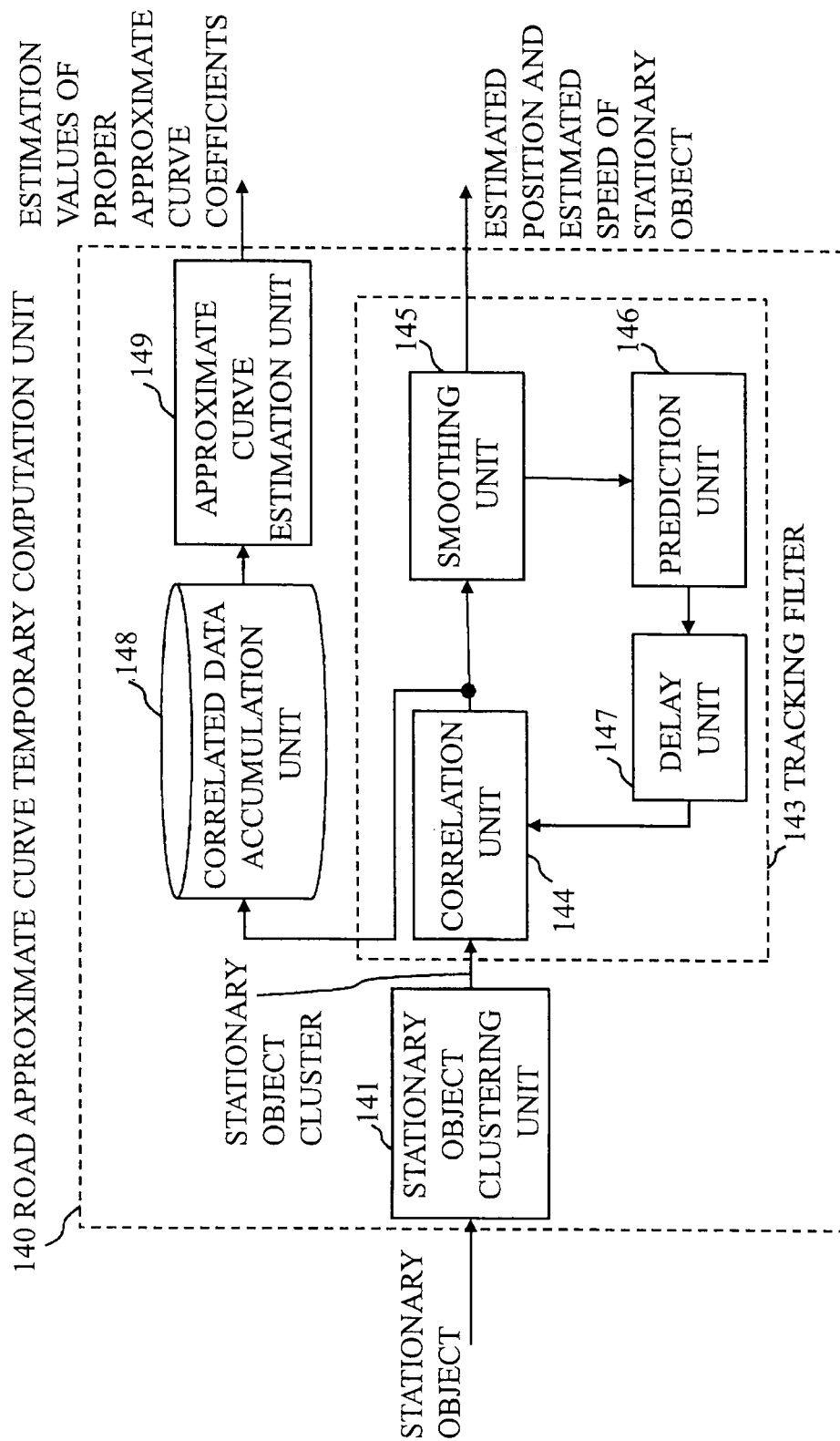
FIG. 14 is a block diagram showing a configuration of a road approximate curve temporary computation unit 140 in a second embodiment.

FIG. 14 is a block diagram showing a configuration of a road approximate curve temporary computation unit 140 in this embodiment.

The road approximate curve temporary computation unit 140 includes a stationary object clustering unit 141, in addition to the configuration described in the first embodiment.

The road approximate curve temporary computation unit 140 performs clustering of stationary objects, and tracks a cluster.

Next, operation will be described.

Under an actual road running environment, there is reflection from a stationary object such as a delineator, a guardrail or a wall. A plurality of reflection points are obtained from the stationary object having a large surface area such as the guardrail or the wall in particular. Thus, it may be difficult to track one reflection point. For that reason, by performing clustering of stationary objects in a preceding stage of the tracking filter 143 of the road approximate curve temporary computation unit 140, the plurality of reflection points obtained from the stationary object having the large surface area are clustered. Then, by tracking the cluster, correlation performance of the road approximate curve temporary computation unit 140 is enhanced.

Since the other processes are the same as those in the first embodiment, a description of the other processes will be omitted.

Third Embodiment

A third embodiment will be described using FIGS. 15 to 16.

The same reference numerals are assigned to components common to those in the first and second embodiments, thereby omitting repeated description of the components.

Figure 15:
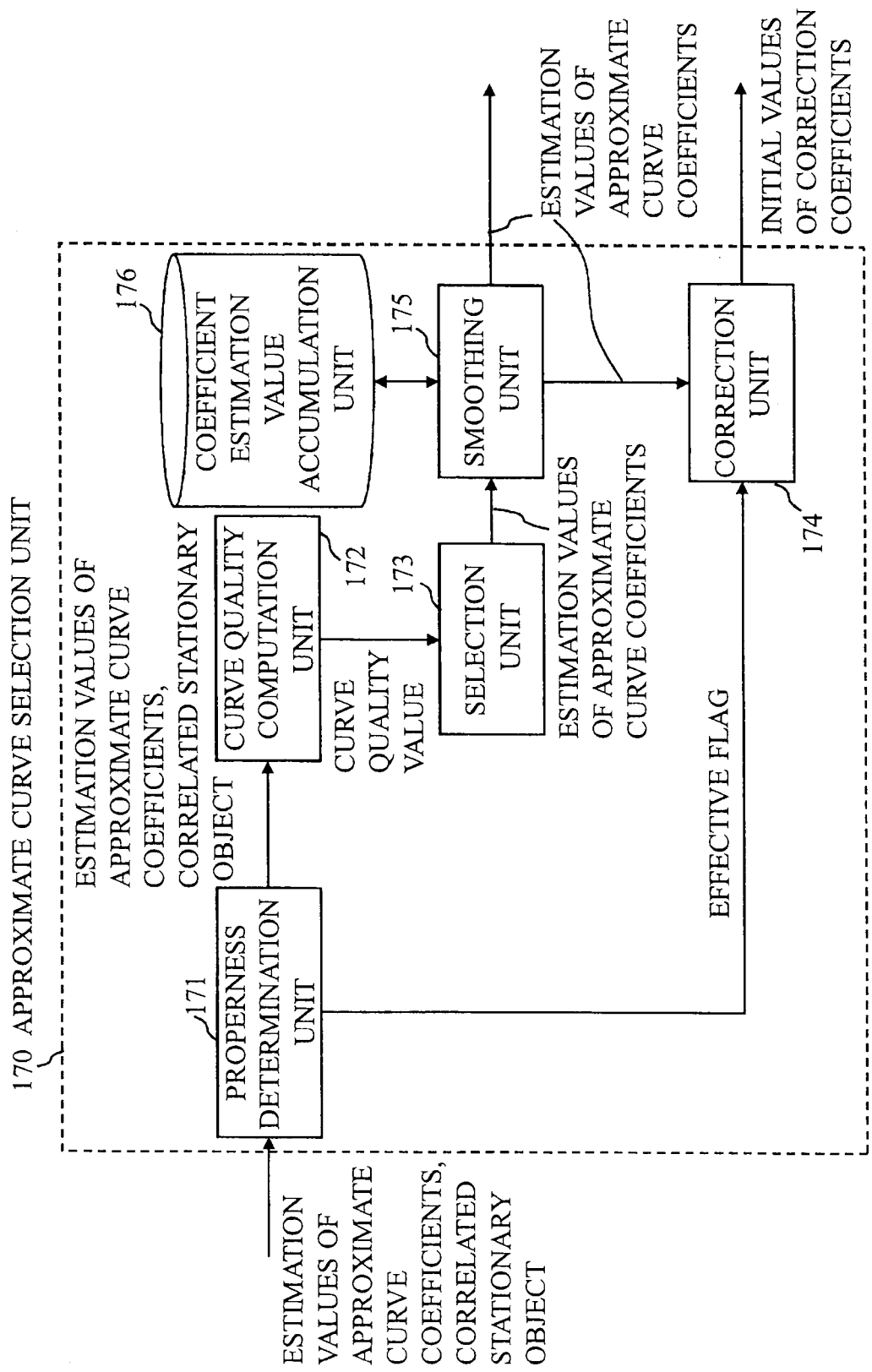
FIG. 15 is a block diagram showing a configuration of an approximate curve selection unit 170 in a third embodiment.

FIG. 15 is a block diagram showing a configuration of an approximate curve selection unit 170 in this embodiment.

The approximate curve selection unit 170 includes a smoothing unit 175 and a coefficient estimation value accumulation unit 176, in addition to the configuration described in the first embodiment.

The approximate curve selection unit 170 smoothes approximate curve coefficients using the inclination of an approximate curve at an immediately preceding time and the inclination of an approximate curve selected at a current time.

Next, operation will be described.

Figure 16:
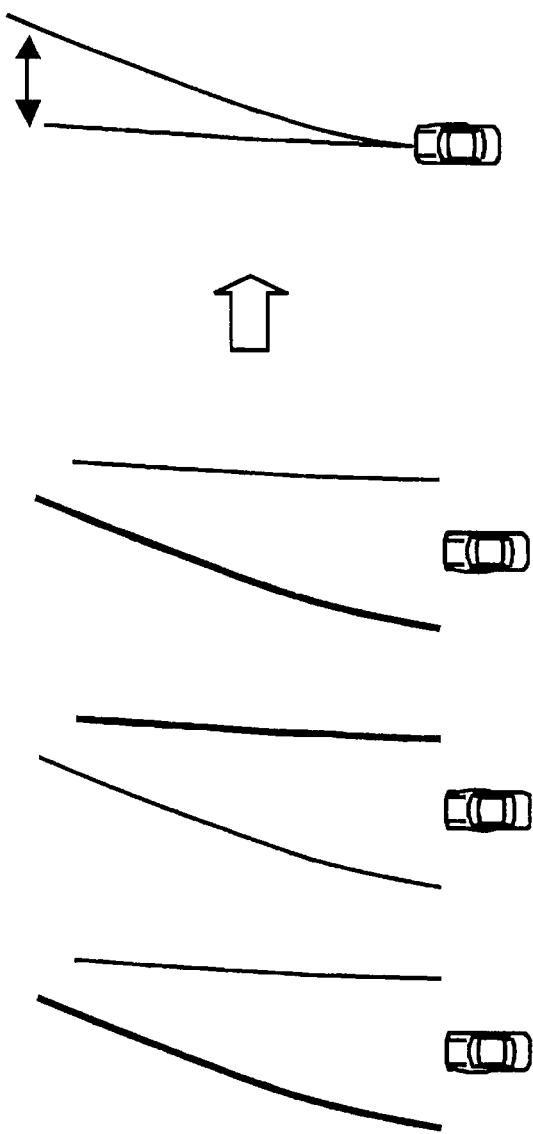
FIG. 16 is an explanatory diagram for explaining a problem encountered when an approximate curve is selected.

FIG. 16 is an explanatory diagram for explaining a problem encountered when an approximate curve is selected.

When the inclination of an approximate curve for a road edge on the right side and the inclination of an approximate curve for a road edge on the left side are greatly different and the approximate curves on the right and left sides are alternately selected, an abrupt variation occur will in the inclination of the approximate curve. The selection unit 173 of the approximate curve selection unit 170 selects coefficients of one of a plurality of approximate curves for a certain road edge at each time. Thus, when the value of a coefficient corresponding to the curvature of the road edge (the inclination a in Equation (1), for example) differs between the road edges, an abrupt variation in the inclination may occur in the temporal direction.

For that reason, the smoothing unit 175 and the coefficient estimation value accumulation unit 176 are newly provided for the selection unit 173 of the approximate curve selection unit 170. The smoothing unit 175 performs smoothing using the coefficients at the immediately preceding time so that the estimation values of the approximate curve coefficients do not abruptly vary. An known tracking filter is used for the smoothing.

Since the other processes are the same as those in the first or second embodiment, a description of the other processes will be omitted.

Fourth Embodiment

A fourth embodiment will be described using FIGS. 17 to 28.

The same reference numerals are assigned to components common to those in the first to third embodiments, thereby omitting repeated description of the components.

Figure 17:
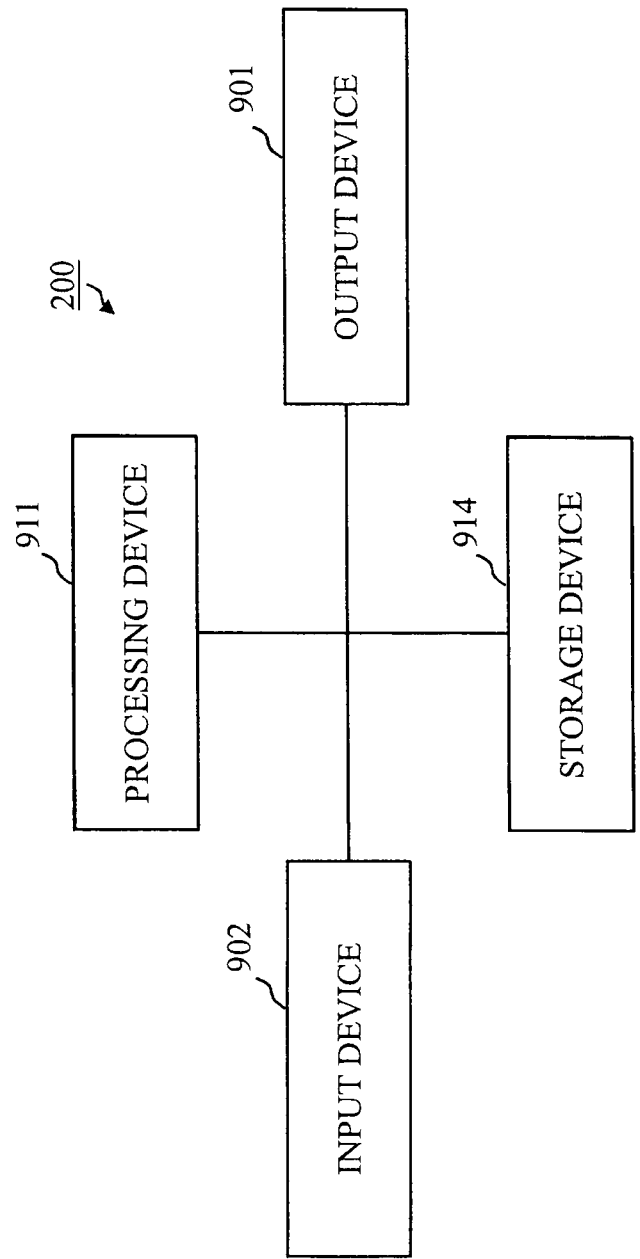
FIG. 17 is a hardware configuration diagram showing an example of a hardware configuration of a road configuration estimation apparatus 200 in a fourth embodiment.

FIG. 17 is a hardware configuration diagram showing an example of a hardware configuration of a road configuration estimation apparatus 200 in this embodiment.

The road configuration estimation apparatus 200 is a computer including a processing device 911, a storage device 914, an input device 902, and an output device 901, for example.

The processing device 911 processes data by executing a computer program, thereby controlling an entirety of the road configuration estimation apparatus 200.

The storage device 914 stores the computer program that is executed by the processing device 911 and data that is processed by the processing device 911. The storage device 914 may be a volatile memory, a non-volatile memory, a flash memory, a magnetic disk device, an optical disk device, or the like, for example.

The input device 902 receives a signal or information from outside the road configuration estimation apparatus 200 and converts the signal or information to data of a format capable of being processed by the processing device 911. The data obtained by the conversion by the input device 902 may be directly processed by the processing device 911, or may be temporarily stored by the storage device 914. The input device 902 may be an operation input device such as a keyboard or a mouse that receives an operation of a user, a conversion device such as an analog-to-digital conversion device that converts an analog signal to digital data, or an interface device such as a receiving device that receives the signal transmitted by a different device.

The output device 901 converts the data processed by the processing device 911 and/or the data stored by the storage device 914 to a form capable of being output to an outside of the road configuration estimation apparatus 200, for output. The output device 901 may be a device that converts data to a perceptible form to human senses and outputs it, such as a loudspeaker or a display device which displays an image. The output device 901 may be a device that converts data to an acceptable form to other devices and outputs it, such as a conversion device like a digital-to-analog conversion device that converts digital data to an analog signal, or an interface device like a transmitting device that transmits a signal to another device.

Each functional block of the road configuration estimation apparatus 200 is implemented by executing the computer program stored by the storage device 914 by the processing device 911. The functional block of the road configuration estimation apparatus 200 may not be necessarily configured to be implemented by the computer, but may be configured to be implemented by an electronic circuit such as a digital circuit or an analog circuit. The functional block may be configured to be implemented by a configuration such as a mechanical configuration other than the electrical configuration.

Similarly, each functional block of the road configuration recognition apparatus 100 described in the first to third embodiments may be configured to be implemented by the computer, or another configuration.

Figure 18:
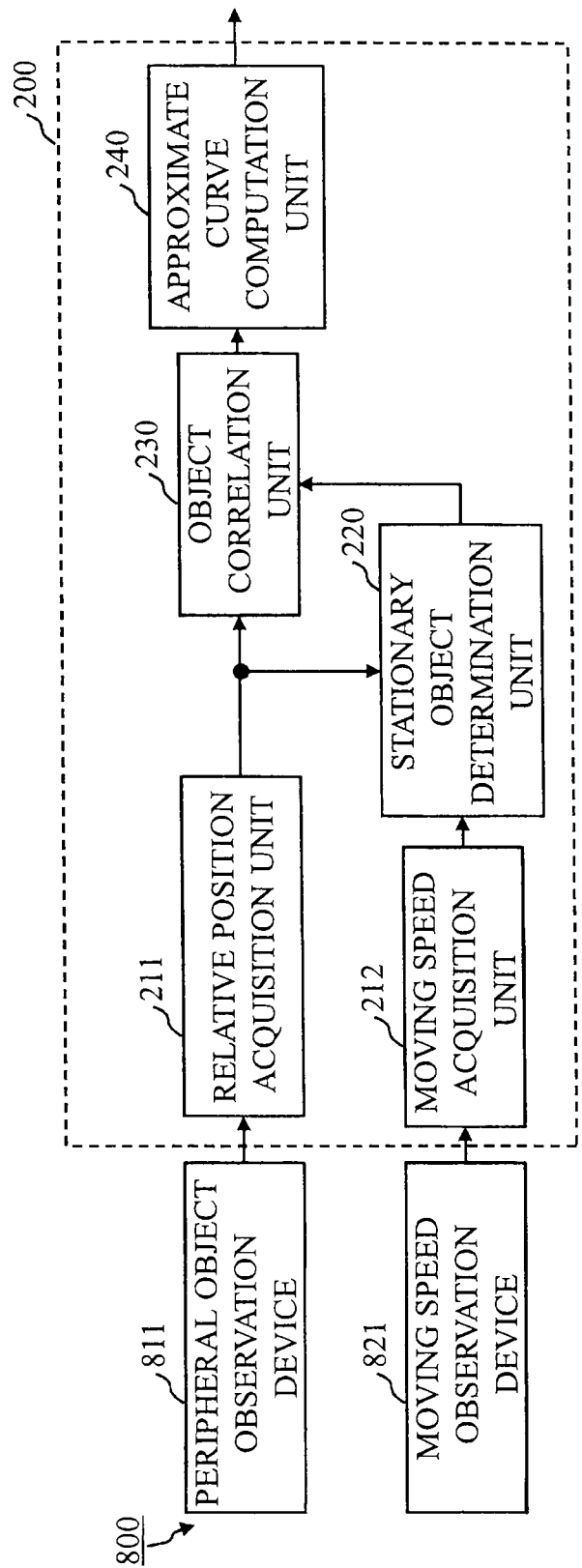
FIG. 18 is a block configuration diagram showing an example of functional blocks of the road configuration estimation apparatus 200 in the fourth embodiment.

FIG. 18 is a block diagram showing an example of the functional blocks of the road configuration estimation apparatus 200.

The road configuration estimation apparatus 200 is mounted on a moving object such as a vehicle. In addition to the road configuration estimation apparatus 200, a peripheral object observation device 811 and a moving speed observation device 821 are mounted on the moving object.

The peripheral object observation device 811 observes the position, the speed, and the like of an object that is present in the vicinity of the moving object. The peripheral object observation device 811 may be radar, for example. The peripheral object observation device 811 emits a radiation wave such as an electric wave or laser light, and detects a reflected wave that has impinged on and has been reflected from an object. The peripheral object observation device 811 thereby measures a propagation time and computes the distance to the object. The peripheral object observation device 811 scans a direction of emitting the radiation wave or a direction of receiving the reflected wave, thereby determining a direction in which the object is present. The period of time taken for scanning the radiation wave once by the peripheral object observation device 811 is 0.2 seconds, for example. Accordingly, when a relative positional relationship between the moving object and the object is not changed, the peripheral object observation device 811 repeatedly observes the identical object for each 0.2 seconds, for example. The peripheral object observation device 811 computes the relative position of the object relative to the moving object, based on the computed distance and the determined direction. Further, the peripheral object observation device 811 detects a wavelength deviation between the radiation wave and the reflected wave due to the Doppler effect, for example, thereby detecting the relative speed of the object relative to the moving object. The peripheral object observation device 811 outputs a signal indicating a result of the observation such as the relative position or the relative speed of the object.

The moving speed observation device 821 observes the moving speed of the moving object. The moving speed observation device 821 measures the number of rotations of a vehicle axle by a tachometer mounted on the vehicle axle, thereby computing the moving speed, for example. The moving speed observation device 821 counts the number of rotations of the axle for 0.1 seconds, for example. The moving speed observation device 821 multiplies the counted number of rotations by the circumferential length of a tire, thereby computing a distance in which the moving object has traveled in 0.1 seconds. The moving speed observation device 821 multiplies the computed distance by 10, thereby computing the speed of the moving object per second. In the case of this example, the moving speed observation device 821 repeatedly observes the moving speed of the moving object once for every 0.1 seconds. The moving speed observation device 821 outputs a signal indicating a result of the observation obtained by observation of the moving speed of the moving object.

The moving speed observation device 821 may be configured not to compute the moving speed of the moving object but to output a signal indicating the measured number of rotations of the vehicle axle without alteration. In that case, the moving speed acquisition unit 212, which will be described later, executes the above-mentioned computation to compute the moving speed of the moving object, in place of the moving speed observation device 821.

The road configuration estimation apparatus 200 estimates the configuration of a road on which the moving object is running, based on the results of the observations by the peripheral object observation device 811 and the moving speed observation device 821. The road configuration estimation apparatus 200 includes a relative position acquisition unit 211, a moving speed acquisition unit 212, a stationary object determination unit 220, an object correlation unit 230, and an approximate curve computation unit 240.

The relative position acquisition unit 211 receives the signal output by the peripheral object observation device 811 to obtain the result of the observation by the peripheral object observation device 811, using the input device 902.

Using the processing device 911, the relative position acquisition unit 211 determines a time at which the relative position acquisition unit 211 has received the signal output by the peripheral object observation device 811, thereby computing an observation time at which the peripheral object observation device 811 has observed the object. The relative position acquisition unit 211 may be configured to regard the time at which the relative position acquisition unit 211 has received the signal as the observation time. Alternatively, the relative position acquisition unit 211 may be configured to consider a delay time of the peripheral object observation device 811 and regard a time earlier than the time of reception of the signal just by the delay time as the observation time. The signal output by the peripheral object observation device 811 may include information indicating the observation time at which the peripheral object observation device 811 has observed the object. In that case, the relative position acquisition unit 211 obtains the observation time from the received signal, using the processing device 911.

The relative position acquisition unit 211 stores data indicating the observation time at which the peripheral object observation device 811 has observed the object and data indicating the relative position and the relative speed of the observed object. The data stored by the relative position acquisition unit 211 is referred to as "peripheral object observation data". Among the "peripheral object observation data", the data indicating the observation time is referred to as "object observation time data", data indicating the relative position of the object is referred to as "relative position observation value data", and data indicating the relative speed of the object is referred to as "relative speed observation value data".

The moving speed acquisition unit 212 receives the signal output by the moving speed observation device 821, and obtains the result of the observation by the moving speed observation device 821, using the input device 902. The moving speed acquisition unit 212 performs a process similar to that by the relative position acquisition unit 211 to obtain an observation time at which the moving speed observation device 821 has observed the moving speed of the moving object, using the processing device 911. The moving speed acquisition unit 212 stores data indicating the observation time at which the moving speed observation device 821 has observed the moving speed of the moving object and the observed moving speed of the moving object, using the storage device 914. The data stored by the moving speed acquisition unit 212 is referred to as "moving speed data". In the "moving speed data", data indicating the observation time is referred to as "moving speed observation time data", while data indicating the moving speed of the moving object is referred to as "moving speed observation value data".

The stationary object determination unit 220 determines whether or not the object observed by the peripheral object observation device 811 is still, using the processing device 911. The stationary object determination unit 220 stores data indicating a result of the determination, using the storage device 914. The data stored by the stationary object determination unit 220 is referred to as "still determination result data".

The stationary object determination unit 220 receives the peripheral object observation data stored by the relative position acquisition unit 211 and the moving speed data stored by the moving speed acquisition unit 212, using the processing device 911, for example. The stationary object determination unit 220 obtains the relative speed observation value data indicating the relative speed of the object observed by the peripheral object observation device 811 relative to the moving object from the received peripheral object observation data, using the processing device 911. The stationary object determination unit 220 obtains the moving speed observation value data indicating the moving speed of the moving object from the received moving speed data, using the processing device 911. The stationary object determination unit 220 determines whether or not the object observed by the peripheral object observation device 811 is still, based on the relative speed indicated by the relative speed observation value data and the moving speed indicated by the moving speed observation value data, using the processing device 911.

Figure 19:
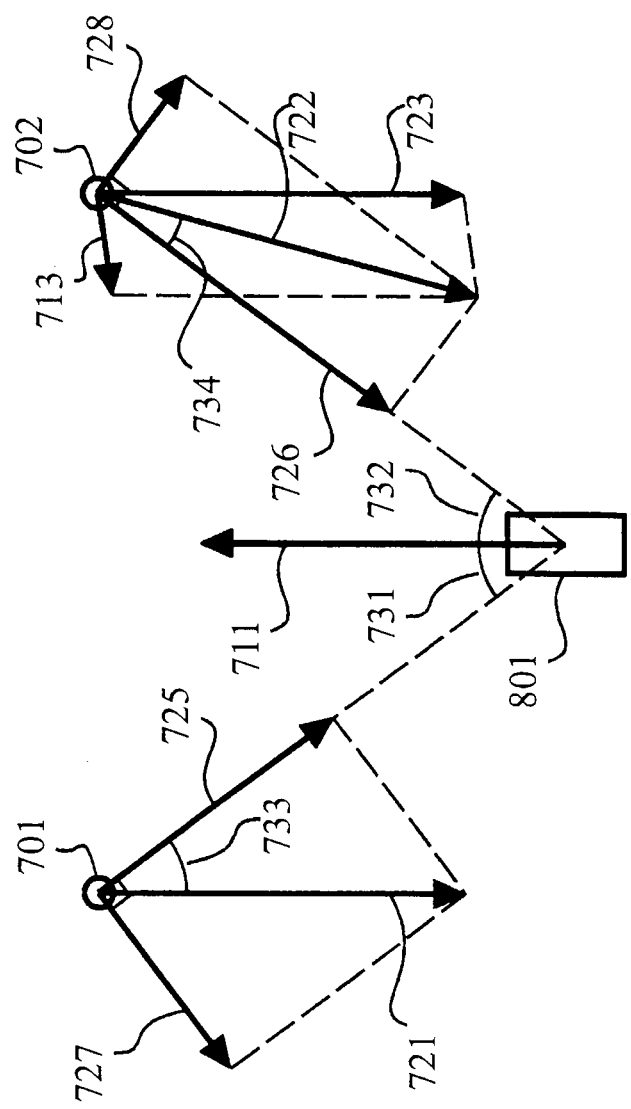
FIG. 19 is a diagram for explaining a relationship between a moving speed of a moving object 801 and respective relative speeds of objects 701 and 702 relative to the moving object 801.

FIG. 19 is a diagram for explaining a relationship between a moving speed of a moving object 801 and respective relative speeds of objects 701 and 702 relative to the moving object 801.

Arrows 711 and 713 respectively indicate the moving speed of the moving object 801 and the moving speed of the object 702. It is assumed that the object 701 is still. Arrows 721 and 722 respectively indicate the relative speeds of the objects 701 and 702 relative to the moving object 801.

Since the object 701 is still, the object 701 is seen to be moving in a direction just opposite to that of the moving speed of the moving object 801 at the same speed as the moving speed of the moving object 801, relative to the moving object 801. On contrast therewith, the object 702 is moving. Accordingly, the object 702 is seen to be moving at a speed obtained by combining an apparent speed (indicated by an arrow 723) caused by movement of the moving object 801 and the actual speed (indicated by the arrow 713) caused by movement of the object 702, relative to the moving object 801. Accordingly, the relative speed (apparent speed) of the object relative to the moving object can be expressed by the following equation.

$$v_r = v_t - v_s \quad \text{[Expression 18]}$$

where $v_r$ denotes a vector indicating the relative speed of the object relative to the moving object, $v_t$ denotes a vector indicating the moving speed of the object, and $v_s$ denotes a vector indicating the moving speed of the moving object.

The stationary object determination unit 220 adds the vector $v_r$ indicating the relative speed of the object relative to the moving object and the vector $v_s$ indicating the moving speed of the moving object, thereby computing the vector $v_t$ indicating the moving speed of the object, using the processing device 911. The stationary object determination unit 220 computes the absolute value of the computed vector $v_t$, using the processing device 911. The stationary object determination unit 220 compares the computed absolute value with a predetermined threshold value, using the processing device. The threshold value is set in advance in view of observation errors of the relative speed of the object relative to the moving object and of the moving speed of the moving object. When the absolute value of the vector $v_t$ is smaller than the threshold value, the stationary object determination unit 220 determines that the object is still, using the processing device 911.

When the relative speeds of the objects relative to the moving object are observed using the Doppler effect, the observed relative speeds are only components (indicated by arrows 725 and 726) of the apparent speeds (indicated by the arrows 721 and 722) of the objects in distance directions between the moving object and the objects. Components (indicated by arrows 727 and 728) in a direction of rotation around the moving object 801 are not observed. The observed relative speed can be expressed by the following equation.

$$v_d = |v_r| \cos \alpha \quad \text{[Expression 19]}$$

where $v_d$ denotes a real number indicating a component of the relative speed of the object relative to the moving object in the distance direction, and $\alpha$ denotes a real number indicating the angle between the direction of the relative speed of the object relative to the moving object and the direction of the moving object seen from the object.

Since the components (indicated by the arrows 727 and 728) of the relative speeds of the objects relative to the moving object in the direction of rotation around the moving object 801 are not observed, the angle α is unknown. However, the object 701 is still. Thus, the angle α (indicated by reference numeral 733) of the object 701 matches an angle 731 between the moving direction of the moving object 801 and a direction in which the object 701 is seen from the moving object 801. On contrast therewith, the object 702 is moving. Thus, the angle α (indicated by reference numeral 734) of the object 702 does not necessarily matches an angle 732 between the moving direction of the moving object 801 and a direction in which the object 702 is seen from the moving object 801.

The stationary object determination unit 220 computes the cosine of the angle between the moving direction of the moving object and a direction in which the object is seen from the moving object, using the processing device 911, for example. The stationary object determination unit 220 computes the product between the absolute value of the vector $v_s$ indicating the moving speed of the moving object and the computed cosine, using the processing device 911. The stationary object determination unit 220 computes a difference by subtracting the real number $v_d$ indicating the component of the relative speed of the object relative to the moving object in the distance direction from the computed product, using the processing device 911. The stationary object determination unit 220 compares the computed difference with a predetermined threshold value, using the processing device 911. The threshold value is set in advance in view of observation errors of the relative speed of the object relative to the moving object and of the moving speed of the moving object. When the difference is smaller than the threshold value, the stationary object determination unit 220 determines that the object is still, using the processing device 911.

Figure 20:
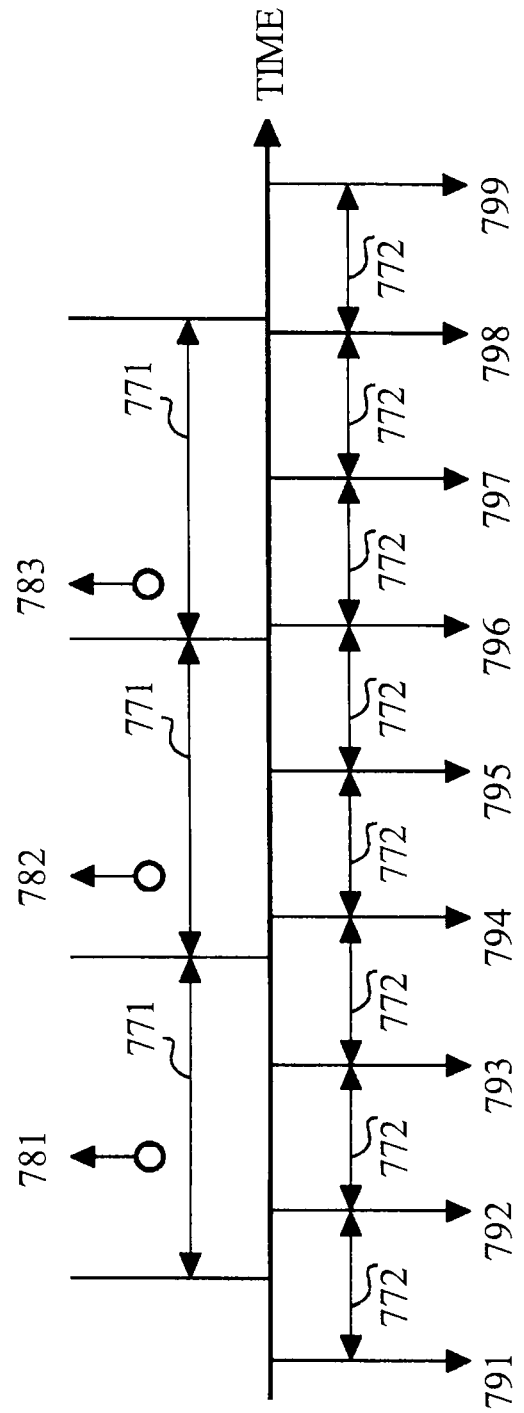
FIG. 20 is a diagram for explaining a relationship between observation times 781 to 783 of the relative speed of an object relative to a moving object and observation times 791 to 799 of the moving speed of the moving object.

FIG. 20 is a diagram for explaining a relationship between times 781 to 783 at which the relative speed of the object relative to the moving object has been observed and times 791 to 799 at which the moving speed of the moving object has been observed.

As described above, an observation cycle 771 in which the peripheral object observation device 811 observes the relative position and the relative speed of the object relative to the moving object and an observation cycle 772 in which the moving speed observation device 821 observes the moving speed of the moving object are different. The observation times 781 to 783 at which the peripheral object observation device 811 observes the relative position and relative speed of the object relative to the moving object are the times of scanning a direction of presence of the object. Thus, when the direction of presence of the object is changed, a timing in one observation cycle is changed. Accordingly, the observation times 781 to 783 are irregular. On contrast therewith, intervals between the observation times 791 to 799 at which the moving speed observation device 821 observes the moving speed of the moving object are constant, and each interval is equal to the observation cycle 772.

Accordingly, the observation times 781 to 783 at which the relative speed of the object relative to the moving object is observed are hardly likely to coincide with the observation times 791 to 799 at which the moving speed of the moving object is observed. However, the relative speed of the object relative to the moving object and the moving speed of the moving object, which are used for determination by the stationary object determination unit 220 as to whether the object is still or not, need to be observed at a same time.

When the moving speed of the moving object is observed by counting the number of rotations of the vehicle axle, the observed moving speed is the average value of the moving speeds at times from start to finish of the counting. The moving speed observed at the time 793 is the average value of the moving speeds from the time 792 to the time 793, for example. Accordingly, the stationary object determination unit 220 should compare the relative speed of the object relative to the moving object observed at the time 781 with the moving speed of the moving object observed at the time 793.

The stationary object determination unit 220 executes the process whenever the moving speed acquisition unit 212 obtains a result of the observation by the moving speed observation device 821, using the processing device 911, for example. The stationary object determination unit 220 receives current moving speed data and immediately preceding moving speed data which have been stored by the moving speed acquisition unit 212, using the processing device 911. The stationary object determination unit 220 obtains two moving speed observation time data respectively indicating a current observation time and an immediately preceding observation time at which the moving speed observation device 821 has observed the moving speeds of the moving object, from the received two moving speed data, using the processing device.

Next, the stationary object determination unit 220 receives one unprocessed peripheral object observation data from among the peripheral object observation data stored by the relative position acquisition unit 211, using the processing device 911. The stationary object determination unit 220 obtains object observation time data indicating the observation time at which the peripheral object observation device 811 has observed the object, from the received peripheral object observation data, using the processing device 911. The stationary object determination unit 220 compares the observation time indicated by the obtained object observation time data with the observation times indicated by the obtained two moving speed observation time data, using the processing device 911.

When the observation time at which the peripheral object observation device 811 has observed the object is before the immediately preceding observation time at which the moving speed observation device 821 has observed the moving speed of the moving object, the stationary object determination unit 220 determines whether or not the object observed by the peripheral object observation device 811 is still, using the moving speed of the moving object observed by the moving speed observation device 821 at the immediately preceding observation time. Using the processing device 911, the stationary object determination unit 220 obtains the moving speed observation value data indicating the moving speed observed by the moving speed observation device 821 from the received immediately preceding moving speed data.

When the observation time at which the peripheral object observation device 811 has observed the object is after the immediately preceding observation time at which the moving speed observation device 821 has observed the moving speed of the moving object and before the current observation time, the stationary object determination unit determines whether or not the object observed by the peripheral object observation device 811 is still, using the moving speed of the moving object observed by the moving speed observation device 821 at the current observation time. Using the processing device 911, the stationary object determination unit 220 obtains the moving speed observation value data indicating the moving speed observed by the moving speed observation device 821 from the received current moving speed data.

When the observation time at which the peripheral object observation device 811 has observed the object is after the current observation time at which the moving speed observation device 821 has observed the moving speed of the moving object, the stationary object determination unit 220 determines whether or not the object observed by the peripheral object observation device 811 is still, using the moving speed of the moving object that will be observed by the moving speed observation device 821 at a subsequent observation time. Since the observation value of the moving speed of the moving object at the subsequent observation time is not obtained yet, the stationary object determination unit 220 does not execute the process on the peripheral object observation data.

As described above, the stationary object determination unit 220 selects the moving speed of the moving object used for determining whether or not the object observed by the peripheral object observation device 811 is still from results of the observations by the moving speed observation device 821, for example. Alternatively, the stationary object determination unit 220 may be configured to compute the moving speed of the moving object used for determining whether or not the object observed by the peripheral object observation device 811 is still, based on the results of the observations by the moving speed observation device 821.

Using the processing device 911, the stationary object determination unit 220 performs a smoothing process, based on the observation times and the moving speeds indicated by the moving speed data stored by the moving speed acquisition unit 212, for example. When the observation time at which the peripheral object observation device 811 has observed the object is before a most recent one of the observation times at which the moving speed observation device 821 has observed the moving speed of the moving object, the stationary object determination unit 220 estimates the moving speed of the moving object at the observation time at which the peripheral object observation device 811 has observed the object, based on a result of the smoothing process, using the processing device 911. Alternatively, when the observation time at which the peripheral object observation device 811 has observed the object is before the most recent observation time at which the moving speed observation device 821 has observed the moving speed of the moving object, the stationary object determination unit 220 predicts the moving speed of the moving object at the observation time at which the peripheral object observation device 811 has observed the object, based on the result of the smoothing process, using the processing device 911. The stationary object determination unit 220 determines whether or not the object observed by the peripheral object observation device 811 is still, using the processing device 911 and the estimated or predicted moving speed of the moving object.

The object correlation unit 230 performs a correlation process about an object observed by the peripheral object observation device 811 and determined to be still by the stationary object determination unit 220, using the processing device 911. That is, the object correlation unit 230 determines results of the observations of the identical stationary object a plurality of times from among results of the observations of the objects by the peripheral object observation device 811. The object correlation unit 230 stores data indicating a result of the determination, using the storage device 914. The data stored by the object correlation unit 230 is referred to as "correlation result data".

The object correlation unit 230 receives the still determination result data stored by the stationary object determination unit 220, using the processing device 911, for example. The object correlation unit 230 receives one unprocessed peripheral object observation data on the object determined to be still by the stationary object determination unit 220 from among the peripheral object observation data stored by the relative position acquisition unit 211, based on a result of the determination indicated by the received still determination result data, using the processing device 911. The object correlation unit 230 obtains the object observation time data indicating the observation time at which the peripheral object observation device 811 has observed the object and the relative position observation value data indicating the relative position of the object relative to the moving object observed by the peripheral object observation device 811, from the received peripheral object observation data, using the processing device 911.

When the trajectory of the relative position of the object relative to the moving object estimated from processed peripheral object observation data is present, the object correlation unit 230 determines whether or not the observation time and the relative position indicated by the obtained data fit the trajectory, using the processing device 911. When the observation time and the relative position fit a plurality of trajectories, the object correlation unit 230 determines one of the trajectories which the observation time and the relative position indicated by the obtained data best fit, using the processing device 911. The object correlation unit 230 incorporates the observation time and the relative position indicated by the obtained data into the best fit trajectory, and thereby updates the trajectory, using the processing device 911.

When the observation time and the relative position indicated by the obtained data fit no trajectory, the object correlation unit 230 determines whether or not there is one of other peripheral object observation data fitting no trajectory that may form a new trajectory, using the processing device 911. When there is the peripheral object observation data that may form the new trajectory, the object correlation unit 230 generates the new trajectory, using the processing device 911.

The object correlation unit 230 stores data indicating the generated or updated trajectory, using the storage device 914.

The absolute position and the orientation of the moving object are not known. Thus, the correlation process by the object correlation unit 230 is performed, based on the relative position (apparent position) of the object relative to the moving object.

Figure 21:
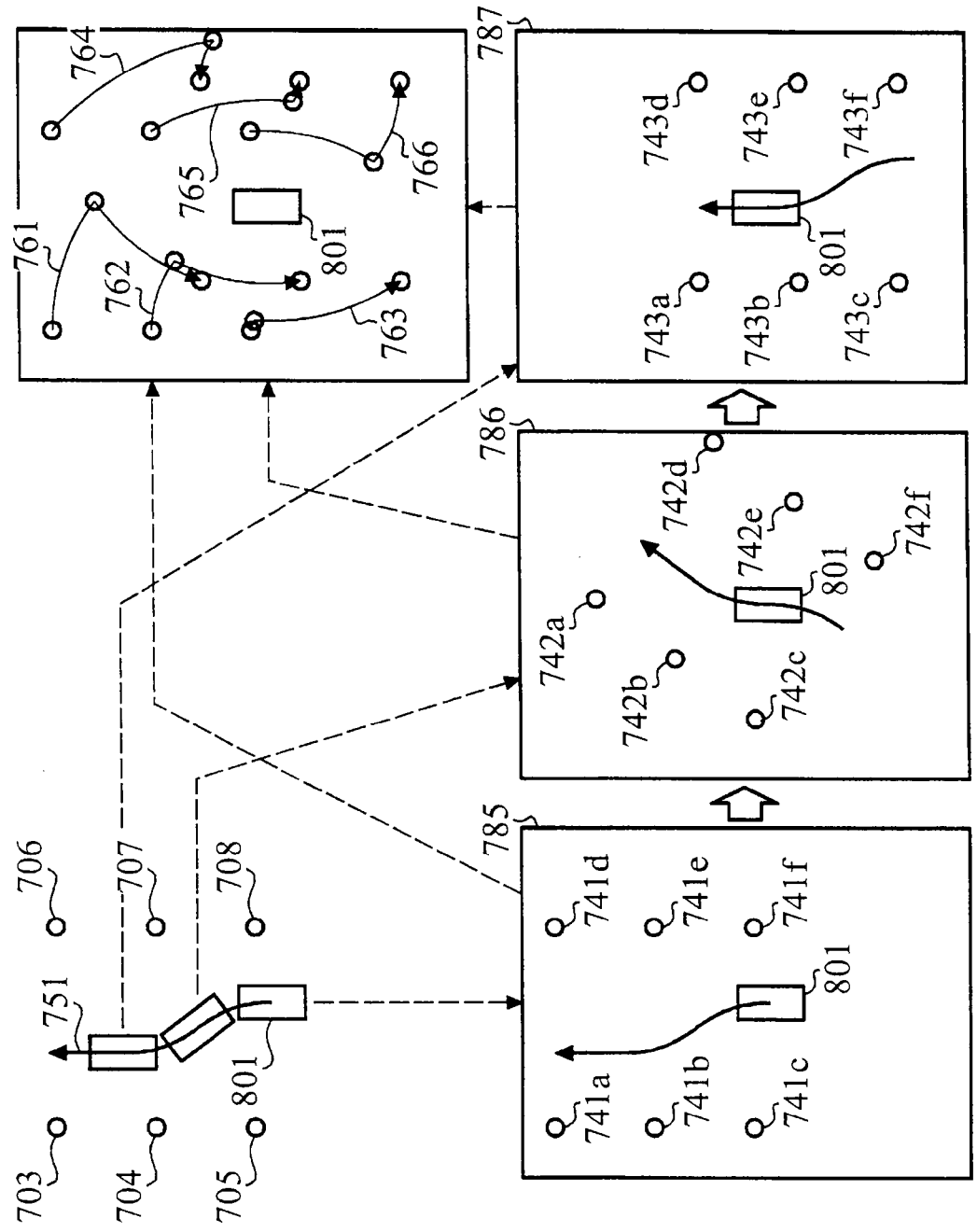
FIG. 21 is a diagram for explaining a relationship between a moving trajectory 751 of a moving object 801 and trajectories 761 to 766 of relative positions of objects 703 to 708 relative to the moving object 801.

FIG. 21 is a diagram for explaining a relationship between a moving trajectory 751 of a moving object 801 and trajectories 761 to 766 of relative positions of objects 703 to 708 relative to the moving object 801.

It is assumed, for example, that the moving object 801 has meandered, as indicated by the moving trajectory 751. Further, it is assumed that the objects 703 to 708 are still.

At a time 785, the peripheral object observation device 811 observes relative positions 741$a$ to 741$f$ of the objects 703 to 708 relative to the moving object 801.

At a time 786, the peripheral object observation device 811 observes relative positions 742$a$ to 742$f$ of the objects 703 to 708 relative to the moving object 801.

At a time 787, the peripheral object observation device 811 observes relative positions 743$a$ to 743$f$ of the objects 703 to 708 relative to the moving object 801.

The object correlation unit 230 performs the correlation process based on these results of the observations, thereby generating the trajectories 761 to 766.

As described above, the relative positions of the stationary objects 703 to 708 relative to the moving object 801 change with movement of the moving object 801. Particularly when the moving object 801 turns around, directions in which the objects 703 to 708 are seen greatly change. Thus, the relative positions of the objects 703 to 708 relative to the moving object 801 also greatly change.

For this reason, the trajectories 761 to 766 of the relative positions of the stationary objects 703 to 708 relative to the moving object 801 may form a complex shape as shown in FIG. 21.

When the peripheral object observation device 811 observes the stationary objects 703 to 708, the respective relative positions of the objects 703 to 708 relative to the moving object 801 greatly change with movement or turn of the moving object 801. However, a positional relationship among the objects 703 to 708 remains unchanged. Not only directions of the relative positions of the objects 703 to 708 relative to the moving object 801 change with turn of the moving object 801, but also directions and distances of the relative positions of the objects 703 to 708 relative to the moving object 801 change with movement of the moving object 801. On contrast therewith, since the objects 703 to 708 are still, distances between the respective objects 703 to 708 remain unchanged, even if the moving object 801 has moved or turned. Only directions among the objects 703 to 708 change with turn of the moving object 801.

Taking advantage of this phenomenon, the object correlation unit 230 predicts relative positions of the objects relative to the moving object 801 observed by the peripheral object observation device 811, using the processing device 911. The object correlation unit 230 performs the correlation process using the processing device 911 and a result of prediction.

The object correlation unit 230 selects one stationary object from among a plurality of objects observed by the peripheral object observation device 811 in one scanning cycle, using the processing device 911, for example. The object correlation unit 230 translates coordinates of relative positions of a plurality of stationary objects relative to the moving object 801 observed in the current scanning cycle in parallel so that coordinates of the selected object coincide with the origin, using the processing device 911. Similarly, the object correlation unit 230 selects one stationary object from among a plurality of objects observed by the peripheral object observation device 811 in an immediately preceding scanning cycle, using the processing device 911. The object correlation unit 230 translates coordinates of relative positions of a plurality of stationary objects relative to the moving object 801 observed in the immediately preceding scanning cycle in parallel so that coordinates of the selected object coincide with the origin, using the processing device 911.

The object correlation unit 230 rotates coordinates obtained by the parallel translation of the coordinates of the relative positions of the stationary objects observed by the peripheral object observation device 811 in the current scanning cycle with respect to the origin, using the processing device 911. The object correlation unit 230 computes a distance between each of coordinates resulting from the rotation and each of coordinates obtained by the parallel translation of the relative positions of the stationary objects observed by the peripheral object observation device 811 in the immediately preceding scanning cycle, using the processing device 911. When the computed distance is smaller than a predetermined threshold value, the object correlation unit 230 regards the objects corresponding to the two coordinates as the identical object and counts the number of pairs of the coordinates, each pair of which may be regarded as the coordinates of the identical object, using the processing device 911.

Using the processing device 911, the object correlation unit 230 repeats this operation by changing an angle of rotation, and obtains the angle having the largest number of the pairs of the coordinates, each pair of which may be regarded as the coordinates of the identical object.

Using the processing device 911, the object correlation unit 230 repeats this operation by changing a combination of the object selected from the plurality of objects observed in the current scanning cycle and the object selected from the plurality of objects observed in the immediately preceding scanning cycle, thereby obtaining the combination and the angle of rotation having the largest number of the pairs of the coordinates, each pair of which may be regarded as the coordinates of the identical object.

Figure 22:
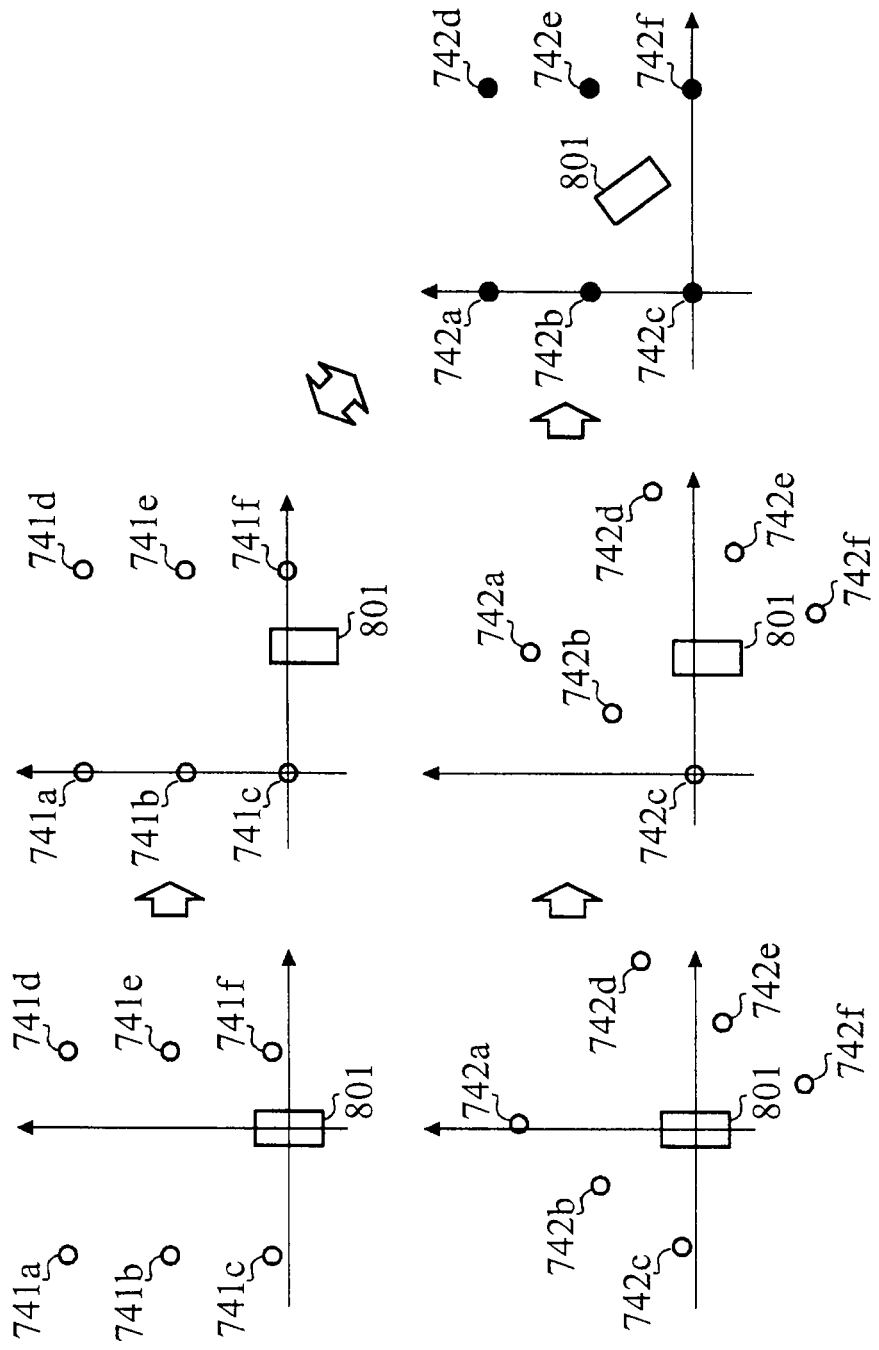
FIG. 22 is a diagram for explaining an operation of an object correlation unit 230 in the fourth embodiment.

FIG. 22 is a diagram for explaining the operation of the object correlation unit 230 in this embodiment.

Using the processing device 911, the object correlation unit 230 selects a relative position 741c, for example, from among relative positions 741a to 741f of stationary objects relative to the moving object 801 observed by the peripheral object observation device 811 in an immediately preceding scanning cycle. The object correlation unit 230 translates coordinates of the relative positions 741a to 741f in parallel so that the coordinates of the relative position 741c coincide with the origin.

Next, using the processing device 911, the object correlation unit 230 selects a relative position 742c, for example, from among relative positions 742a to 742f of stationary objects relative to the moving object 801 observed by the peripheral object observation device 811 in a current scanning cycle. The object correlation unit 230 translates coordinates of the relative positions 742a to 742f in parallel so that the coordinates of the relative position 742c coincide with the origin.

The object correlation unit 230 rotates coordinates of the relative positions 742a to 742f obtained by the parallel translation with respect to the origin, using the processing device 911. The object correlation unit 230 compares coordinates of the relation positions 742a to 742f resulting from the rotation with coordinates of the relative positions 741a to 741f obtained by the parallel translation to count the number of pairs of the coordinates, each pair of which may be regarded as the coordinates of the identical object.

When a combination of the relative positions selected by the object correlation unit 230 is the pair of the relative positions of the identical object actually observed by the peripheral object observation device 811 and the angle of rotation of the coordinates matches the turn angle of the moving object 801, the number of pairs of the coordinates, each pair of which may be regarded as the coordinates of the identical object, is the largest.

The object correlation unit 230 determines the combination of the relative positions having the largest number of pairs of the coordinates, each pair of which may be regarded as the coordinates of the identical object, as relative positions obtained by observation of the identical object by the peripheral object observation device 811. The object correlation unit 230 determines the combination of the relative positions corresponding to the pair of the coordinates which was regarded as the coordinates of the identical object, as the relative positions obtained by observation of the identical object by the peripheral object observation device 811.

As described above, the object correlation unit 230 performs the correlation process only about the object determined to be still by the stationary object determination unit 220. Thus, even if the moving trajectory of the moving object 801 is not unknown, the object observed by the peripheral object observation device 811 may be correlated and tracked.

The object correlation unit 230 may be configured to correlate and track all combinations of relative positions. Alternatively, the object correlation unit 230 may be configured to narrow down the combinations of relative positions for correlation and tracking, using information such as the moving speed of the moving object 801 observed by the moving speed observation device 821.

Further, the object correlation unit 230 may be configured not to limit the range of the angle by which the coordinates translated in parallel is rotated. Alternatively, the object correlation unit 230 may be configured to narrow down the angle, using information such as an angular velocity of the moving object 801 observed by an angular velocity observation device.

When the above-mentioned pairs of coordinates are concentrated into a narrow range, the narrow range may be details of one object. Accordingly, the object correlation unit 230 may be configured not to compare the number of pairs of coordinates, each pair of which may be regarded the coordinates of the identical object, but to compare the area of a convex polygon with vertices thereof being the pairs of coordinates each pair of which may be regarded as the coordinates of the identical object. A combination of the relative positions or the rotation angle having the largest area of the convex polygon should be thereby determined.

The approximate curve computation unit 240 computes an approximate curve that approximates the configuration of a road on which the moving object 801 is located, based on a result of the determination by the stationary object determination unit 220 and a result of the determination by the object correlation unit 230, using the processing device 911.

The approximate curve computation unit 240 uses the relative positions of the objects relative to the moving object 801 determined to be a result of the observation of the identical stationary object by the peripheral object observation device 811, for example.

The approximate curve computation unit 240 determines a time for computing the relative positions of the stationary objects relative to the moving object 801 at the time, using the processing device 911. The approximate curve computation unit 240 computes the relative position of each of the objects relative to the moving object determined to have a plurality of observation results by the object correlation unit 230 at the determined time, based on the plurality of results of the observations of the object by the peripheral object observation device 811.

When stationary objects are assumed to be present at an edge of a road, the configuration of the edge of the road may be estimated by connecting positions of the stationary objects. However, there is an observation error or the like. Accordingly, it is necessary to smooth a line obtained by connecting the positions of the stationary objects. The approximate curve computation unit 240 approximates the configuration of the edge of the road by a predetermined function such as a quadratic curve or a circle.

The approximate curve computation unit 240 computes an approximate curve that approximates the configuration of the road based on a plurality of the computed relative positions of the stationary objects at a same time, using the processing device 911. The approximate curve computation unit 240 computes coefficients of the approximate curve using the processing device 911. Using the processing device 911, the approximate curve computation unit 240 computes the coefficients of the approximate curve by a least square method or the like, for example.

The relative positions used for computing the approximate curve by the approximate curve computation unit 240 are relative positions of the objects determined to be the stationary objects by the stationary object determination unit 220 and determined to have been observed two or more times by the object correlation unit 230. Accordingly, there is little likelihood of erroneous observation of a signal due to noise or erroneous determination of an object that is not still to be still.

With this arrangement, influences of erroneous detection and erroneous determination may be excluded. Accuracy of road configuration estimation may be thereby increased.

The approximate curve computation unit 240 may be configured to compute an approximate curve using only relative positions of an object determined to have been observed a predetermined (such as five) number of times or more by the object correlation unit 230. The larger the threshold value for the number of times is, possibility of the erroneous detection or the erroneous determination is reduced. Reliability is therefore increased. However, when the threshold is large, the number of objects capable of being used for computation of the approximate curve is reduced. Further, it takes time from when an object has entered into a range that may be observed by the peripheral object observation device 811 until the relative position of the object may be used for computation of the approximate curve. Accordingly, the configuration of the road at a far location cannot be estimated. For this reason, preferably, the threshold value is set to four to six times, for example.

The approximate curve computation unit 240 may be configured to compute the coefficients of the approximate curve using the weighted least square method with the number of times where an identical object has been observed. That is, the larger the number of times at which the identical object has been observed, the lower the possibility of the erroneous detection or the erroneous determination is. Weighting is therefore increased for such an object having a large number of observation times. Conversely, when the number of times at which the identical object has been observed is small, there is a possibility of the erroneous detection or the erroneous determination. Thus, weighting is reduced for such an identical object having a small number of observation times. The approximate curve computation unit 240 computes the approximate curve in which the sum of square of weighted residuals is minimized, using the processing device 911. With this arrangement, the configuration of a road at a remote location may be estimated while excluding the influences of the erroneous detection and erroneous determination.

Figure 23:
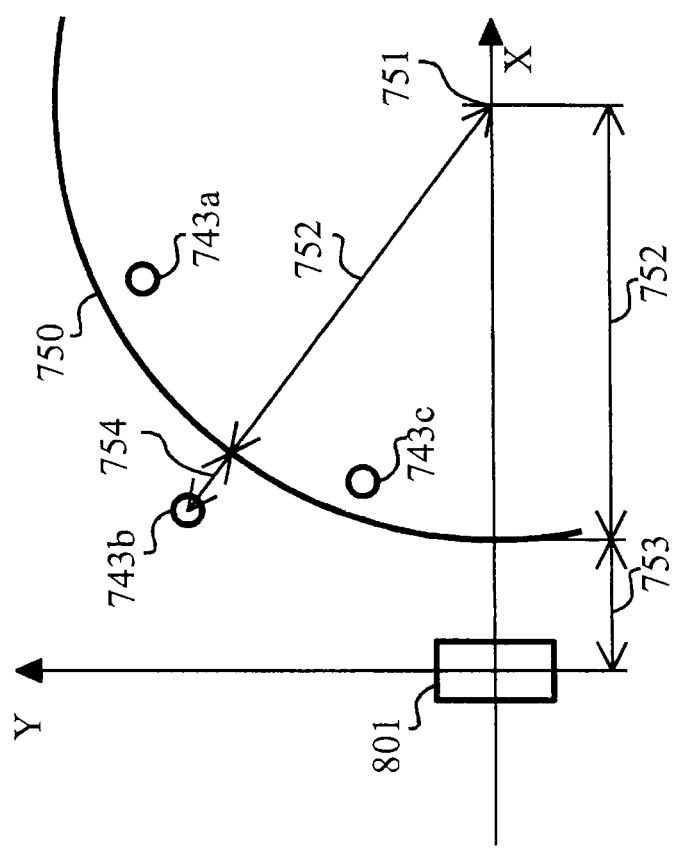
FIG. 23 is a diagram showing an example of a relationship between an approximate curve 750 and each of relative positions 743a to 743c of objects relative to the moving object 801.

FIG. 23 is a diagram showing an example of a relationship between an approximate curve 750 and each of relative positions 743a to 743c of objects relative to the moving object 801.

The approximate curve 750 computed by the approximate curve computation unit 240 is a circle, for example. This example uses a relative coordinate system where the moving object 801 is set to the origin, a running direction of the moving object 801 is indicated by a Y axis, and a right direction perpendicular to the running direction is indicated by an X axis.

The approximate curve 750 in this relative coordinate system can be expressed by the following equation, for example:

$$(x-O_x)^2 + y^2 = R^2 \quad \text{[Expression 20]}$$

where $O_x$ denotes an x coordinate of a center 751 of the circle, which is the approximate curve 750. R denotes a radius 752 of the circle, which is the approximate curve 750.

In this example, the center 751 is assumed to be on the X axis. When the moving object 801 moves along a road configuration, the center of the circle ought to be located just beside the moving object 801. In this case, a distance 753 from the moving object 801 to the edge of the road is a difference between the x coordinate $O_x$ of the center 751 and the radius 752.

The number of correlated objects is denoted as n, and relative coordinates of an i-th one of the correlated n objects relative to the moving object 801 computed by the approximate curve computation unit 240 is denoted as $(x_i, y_i)$. A residual 754 can be defined to be a distance obtained by subtracting the radius 752 from the distance between the object and the center 751.

$$\epsilon_i = \sqrt{(x_i - O_x)^2 + y_i^2} - R \qquad \text{[Expression 21]}$$

where $\epsilon_i$ denotes the residual 754 of the i-th object.

The approximate curve computation unit 240 computes the X coordinate $O_x$ of the center 751 and the radius R whereby the sum of square of weighted residuals defined by the following equation is minimized:

$$J = \sum_{i=1}^{n} W_i \cdot \varepsilon_i^2 \qquad \text{[Expression 22]}$$

where J denotes the sum of square of weighted residuals. $W_i$ denotes the weight of the i-th object. The weight $W_i$ indicates the number of times of correlation of the i-th object, for example.

Figure 24:
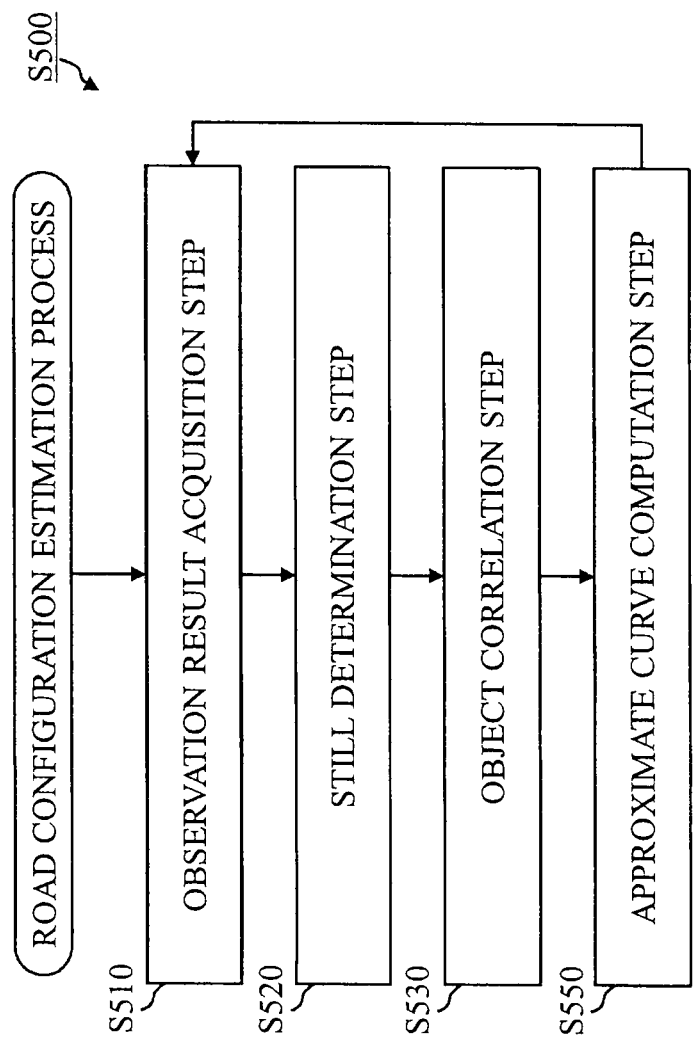
FIG. 24 is a flowchart diagram showing an example of a flow of a road configuration estimation process S500 in the fourth embodiment.

FIG. 24 is a flowchart diagram showing an example of a flow of a road configuration estimation process S500 in this embodiment.

In the road configuration estimation process S500, the road configuration estimation apparatus 200 estimates the angular velocity of a moving object or the like. The road configuration estimation process S500 includes an observation result acquisition step S510, a still determination step S520, an object correlation step S530, and an approximate curve computation step S550, for example.

In the observation result acquisition step S510, the relative position acquisition unit 211 and the moving speed acquisition unit 212 respectively obtain results of the observations by the peripheral object observation device 811 and the moving speed observation device 821.

In the still determination step S520, the stationary object determination unit 220 determines whether or not an object observed by the peripheral object observation device 811 is still, based on the observation results obtained in the observation result acquisition step S510.

In the object correlation step S530, the object correlation unit 230 performs the correlation process about the object determined to be still by the stationary object determination unit 220 in the still determination step S520.

In the approximate curve computation step S550, the approximate curve computation unit 240 computes the approximate curve, based on the observation results obtained in the observation result acquisition step S510 and a result obtained by the correlation process by the object correlation unit 230 in the object correlation step S530.

The road configuration estimation apparatus 200 returns the procedure to the observation result acquisition step S510 to repeat the procedure.

Figure 25:
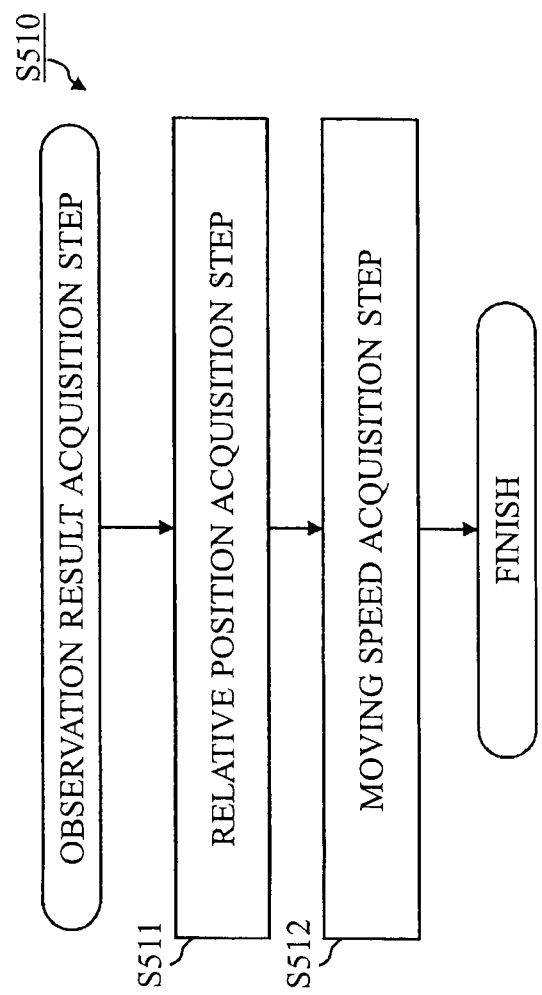
FIG. 25 is a flowchart diagram showing an example of a flow of an observation result acquisition step S510 in the fourth embodiment.

FIG. 25 is a flowchart diagram showing an example of a flow of the observation result acquisition step S510 in this embodiment.

The observation result acquisition step S510 includes a relative position acquisition step S511 and a moving speed acquisition step S512, for example.

In the relative position acquisition step S511, the relative position acquisition unit 211 determines whether or not the peripheral object observation device 811 outputs the signal indicating the observation result, using the processing device 911. When the relative position acquisition unit 211 determines that the peripheral object observation device 811 outputs the signal, the relative position acquisition unit 211 receives the signal output by the peripheral object observation device 811, using the input device 902. The relative position acquisition unit 211 obtains the observation result indicated by the input signal, using the processing device 911. The relative position acquisition unit 211 generates peripheral object observation data indicating the obtained observation result, using the processing device 911. The peripheral object observation data generated by the relative position acquisition unit 211 includes object observation time data, relative position observation value data, and relative speed observation value data, for example.

The object observation time data indicates a time at which the peripheral object observation device 811 has observed the object.

The object observation time data is integer value data in which an elapse of time from a predetermined time is expressed in millisecond, for example. Alternatively, the object observation time data is a set of integer value data indicating the number for a frame and integer value data expressing an elapse of time from the start time of the frame in millisecond. One frame is one cycle of scanning by the peripheral object observation device 811. The length of one frame is 0.2 seconds, for example.

The relative position observation value data indicates the relative position of the object relative to the moving object observed by the peripheral object observation device 811. The relative position observation value data is a set of two real value data expressing coordinates of the object observed by the peripheral object observation device 811 in meter in a moving-object referenced relative coordinate system in which the moving object is set to the origin, a running direction of the moving object is set to a Y axis, and a right direction perpendicular to the running direction of the moving object is set to an X axis, for example. Alternatively, the relative position observation value data is a set of real value data expressing a distance between the object and the moving object observed by the peripheral object observation device 811 in meter and real value data expressing an angle between the running direction of the moving object and a direction, in which the object is seen from the moving object, observed by the peripheral object observation device 811 in radian.

The relative speed observation value data indicates the relative speed of the object relative to the moving object observed by the peripheral object observation device 811. The relative speed observation value data is a set of two real value data expressing components of a relative speed vector of the object relative to the moving object observed by the peripheral object observation device 811 in meter per second in the moving-object-referenced relative coordinate system, for example. Alternatively, the relative speed observation value data is real number value data expressing a component of the relative speed of the object relative to the moving object observed by the peripheral object observation device 811 in the direction of a distance between the object and the moving object in meter per second.

The relative position acquisition unit 211 stores the generated peripheral object observation data, using the storage device 914.

In the moving speed acquisition step S512, the moving speed acquisition unit 212 determines whether or not the moving speed observation device 821 outputs the signal indicating the observation result, using the processing device 911. When it is determined that the moving speed observation device 821 outputs the signal, the moving speed acquisition unit 212 receives the signal output by the moving speed observation device 821, using the input device 902. The moving speed acquisition unit 212 obtains the observation result indicated by the received signal, using the processing device 911. The moving speed acquisition unit 212 generates moving speed data indicating the obtained observation result, using the processing device 911. The moving speed data generated by the moving speed acquisition unit 212 includes moving speed observation time data and moving speed observation value data, for example.

The moving speed observation time data indicates a time at which the moving speed observation device 821 has observed the moving speed of the moving object. The moving speed observation time data is integer value data expressing an elapse of time from a predetermined time in millisecond, for example.

The moving speed observation value data indicates the moving speed of the moving object observed by the moving speed observation device 821. The moving speed observation value data is real value data expressing the moving speed of the moving object observed by the moving speed observation device 821 in meter per second, for example.

The moving speed acquisition unit 212 stores the generated moving speed data, using the storage device 914.

Expression formats of the observation times of the object observation time data and the moving speed observation time data may be different if mutual conversion of the expression formats is possible.

Figure 26:
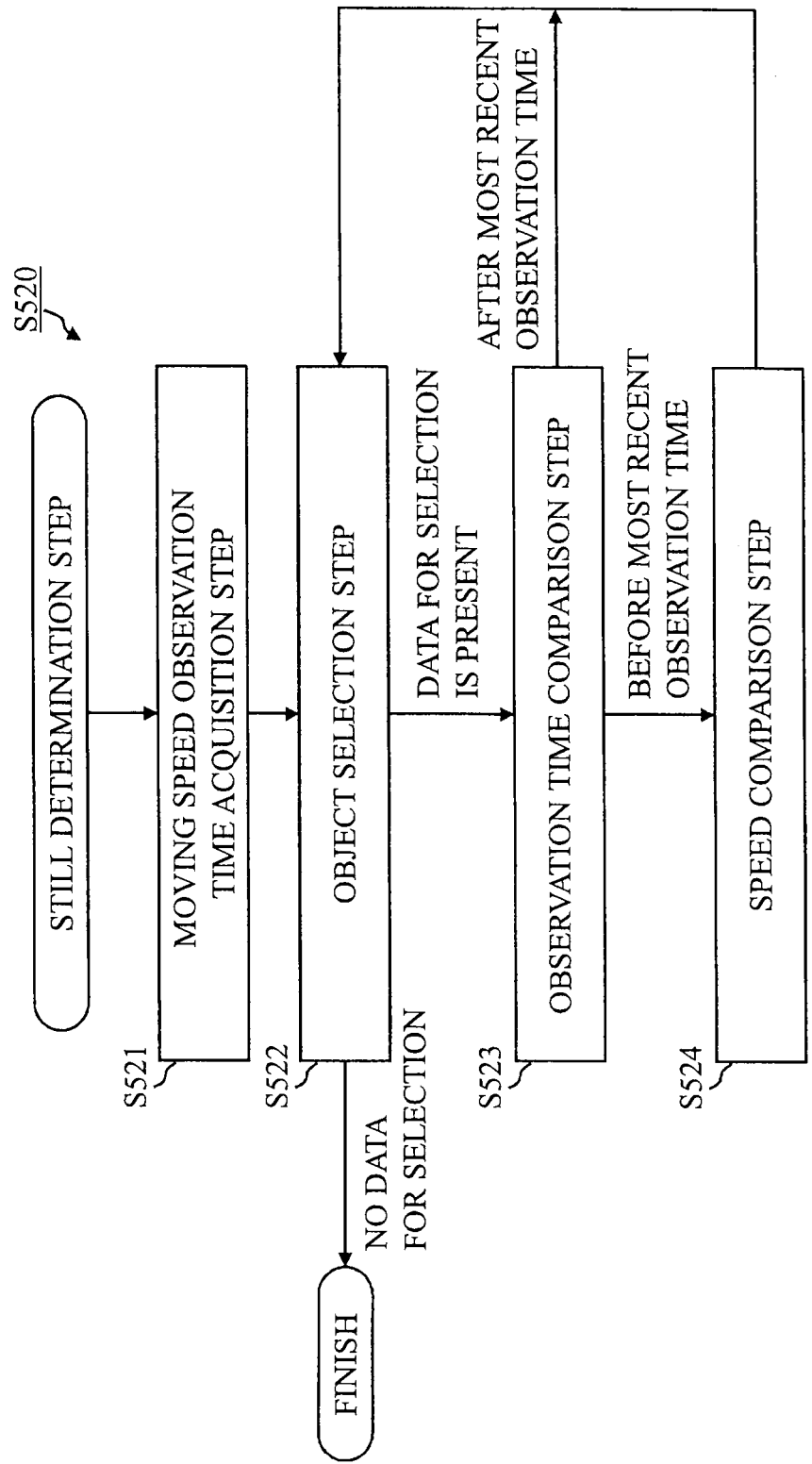
FIG. 26 is a flowchart diagram showing an example of a flow of a still determination step S520 in the fourth embodiment.

FIG. 26 is a flowchart diagram showing an example of a flow of the still determination step S520 in this embodiment.

The still determination step S520 includes a moving speed observation time acquisition step S521, an object selection step S522, an observation time comparison step S523, and a speed comparison step S524, for example.

In the moving speed observation time acquisition step S521, the stationary object determination unit 220 obtains one of the moving speed data stored by the moving speed acquisition unit 212 having a most recent observation time, using the processing device 911. The stationary object determination unit 220 obtains the most recent observation time at which the moving speed observation device 821 has observed the moving speed of the moving object from moving speed observation time data included in the obtained moving speed data, using the processing device 911. The stationary object determination unit 220 obtains the moving speed of the moving object observed by the moving speed observation device 821 from moving speed observation value data included in the obtained moving speed data, using the processing device 911.

When the moving speed observation device 821 does not observe a new moving speed after the still determination step S520 has been executed at an immediately preceding time, the stationary object determination unit 220 may finish the still determination step S520 without performing subsequent processes. The stationary object determination unit 220 compares a most recent observation time obtained when the moving speed observation time acquisition step S521 has been executed at the immediately preceding time with the most recent observation time obtained at a current time, using the processing device 911, for example. When the observation times are the same, the stationary object determination unit 220 finishes the still determination step S520.

In the object selection step S522, using the processing device 911, the stationary object determination unit 220 selects one of the peripheral object observation data stored by the relative position acquisition unit 211 in the relative position acquisition step S511, on which determination as to whether the object is still or not has not been done yet.

When the stationary object determination unit 220 determines about certain peripheral object observation data whether or not the object in the peripheral object observation data is still in the speed comparison step S524 that will be described later, for example, the stationary object determination unit 220 associates and stores still determination result data indicating a result of the determination with the peripheral object observation data, using the storage device 914.

By determining whether or not still determination result data associated with certain peripheral object observation data is stored, using the processing device 911, the stationary object determination unit 220 determines determination about the peripheral object observation data whether or not the object is still has been finished.

When the peripheral object observation data to be selected is not present, the stationary object determination unit 220 finishes the still determination step S520, using the processing device 911.

When one or more peripheral object observation data to be selected are present, the stationary object determination unit 220 selects one of the peripheral object observation data, using the processing device 911. The stationary object determination unit 220 proceeds to the observation time comparison step S523, using the processing device 911.

In the observation time comparison step S523, the stationary object determination unit 220 obtains the observation time at which the peripheral object observation device 811 has observed the object from object observation time data included in the peripheral object observation data selected in the object selection step S522, using the processing device 911. The stationary object determination unit 220 compares the obtained observation time with the observation time obtained in the moving speed observation time acquisition step S521, using the processing device 911.

When the observation time at which the peripheral object observation device 811 has observed the object is after the most recent observation time at which the moving speed observation device 821 has observed the moving speed of the moving object, the stationary object determination unit 220 does not determine whether or not the object in the peripheral object observation data is still. The stationary object determination unit 220 returns the procedure to the object selection step S522, using the processing device 911, and selects a subsequent one of the peripheral observation data.

When the observation time at which the peripheral object observation device 811 has observed the object is before the most recent observation time at which the moving speed observation device 821 has observed the moving speed of the moving object, the stationary object determination unit 220 determines whether or not the object in the peripheral object observation data is still. Using the processing device 911, the stationary object determination unit 220 proceeds to the speed comparison step S524.

In the speed comparison step S524, the stationary object determination unit 220 obtains the relative speed of the object relative to the moving object observed by the peripheral object observation device 811 from relative speed observation value data included in the peripheral object observation data selected in the object selection step S522, using the processing device 911. Using the processing device 911, the stationary object determination unit 220 determines whether or not the object is still, based on the obtained relative speed and the moving speed of the moving object obtained in the moving speed observation time acquisition step S521. The stationary object determination unit 220 generates still determination data indicating a result of the determination, using the processing device 911. The stationary object determination unit 220 associates and stores the generated still determination data with the peripheral object observation data selected in the object selection step S522, using the storage unit 914.

Using the processing device 911, the stationary object determination unit 220 returns the procedure to the object selection step S522 to select the subsequent one of the peripheral object observation data.

Figure 27:
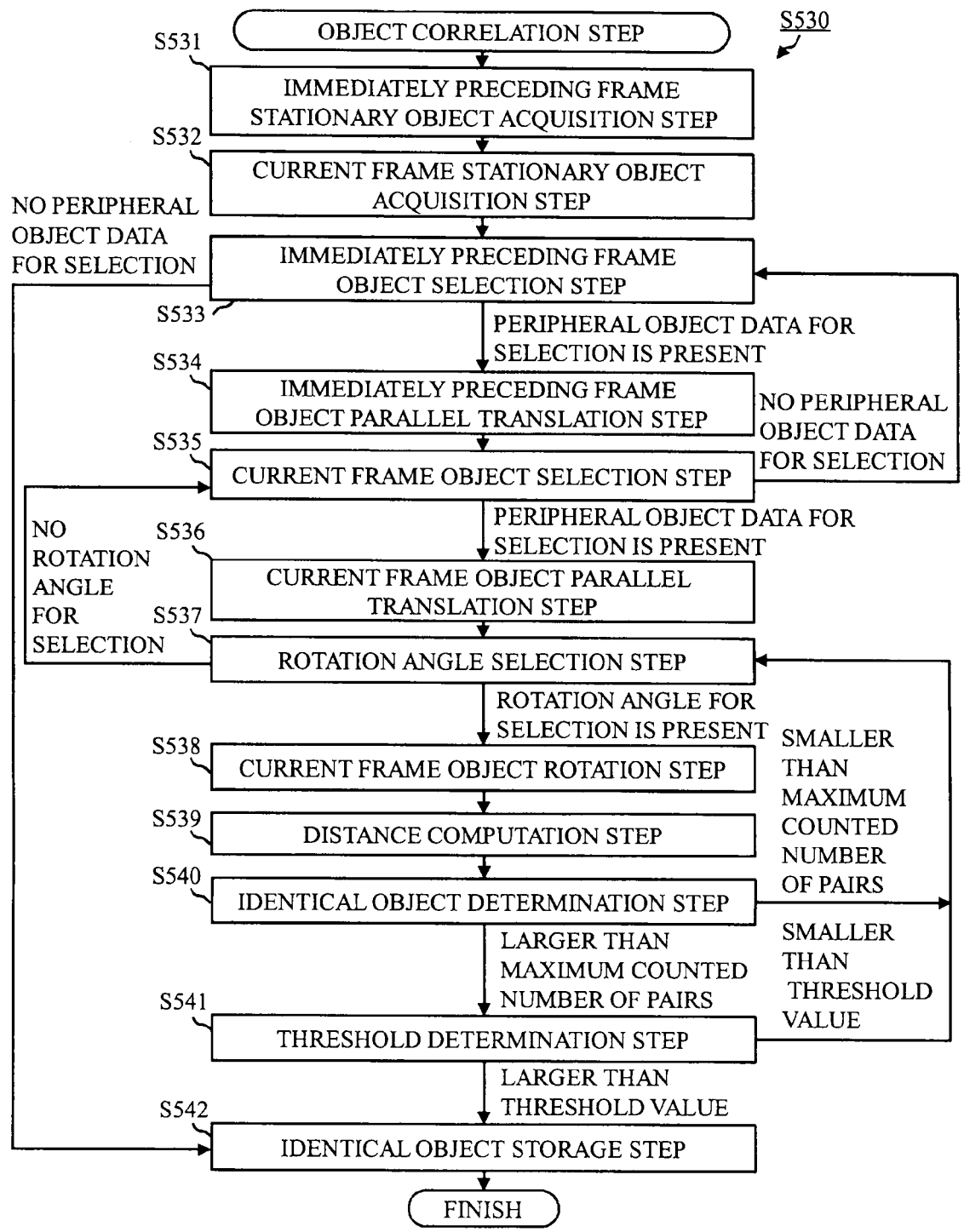
FIG. 27 is a flowchart diagram showing an example of a flow of an object correlation step S530 in this embodiment.

FIG. 27 is a flowchart diagram showing an example of a flow of the object correlation step S530 in this embodiment.

The object correlation step S530 includes an immediately preceding frame stationary object acquisition step S531, a current frame stationary object acquisition step S532, an immediately preceding frame object selection step S533, an immediately preceding frame object parallel translation step S534, a current frame object selection step S535, a current frame object parallel translation step S536, a rotation angle selection step S537, a current frame object rotation step S538, a distance computation step S539, an identical object determination step S540, a threshold value determination step S541, and an identical object storage step S542.

In the immediately preceding frame stationary object acquisition step S531, the object correlation unit 230 obtains all peripheral object observation data on objects observed by the peripheral object observation device 811 in an immediately preceding frame and determined to be still by the stationary object determination unit 220 in the still determination step S520 from among the peripheral object observation data stored by the relative position acquisition unit 211, using the processing device 911.

Using the processing device 911, for each of the obtained peripheral object observation data, the object correlation unit 230 obtains the number of frames having the peripheral object observation data determined by the object correlation unit 230 that the peripheral object observation device 811 has observed identical objects in the obtained peripheral object observation data and peripheral object observation data in one or more frames before the immediately preceding frame.

Assume that in the identical object storage step S542 which will be described later, for example, the object correlation unit 230 has determined that peripheral object observation data on an object observed by the peripheral object observation device 811 in a certain frame indicates the identical object in the peripheral object observation data observed by the peripheral object observation device 811 in a frame preceding the certain frame, using the processing device 911. Then, the object correlation unit 230 generates correlation count data indicating the number of times of correlation. The number of times of correlation indicates the number of frames in which it has been determined that the identical object has been observed. The object correlation unit 230 associates and stores the correlation count data with the peripheral object observation data, using the storage device 914. When the peripheral object observation data determined to be obtained by observation of the identical object in a frame preceding the certain frame has no associated correlation count data, the object correlation unit 230 generates the correlation count data in which the number of times of correlation is set to "one". When the correlation count data associated with the peripheral object observation data determined to be obtained by observation of the identical object is present, the object correlation unit 230 generates new correlation count data having the number of times of correlation obtained by incrementing the number of times of correlation indicated by the correlation count data by one.

Using the processing device 911, the object correlation unit 230 obtains the number of times of correlation indicated by the correlation count data stored associated with the obtained peripheral object observation data. The object correlation unit 230 thereby obtains the number of frames in which it has been determined that the identical object was observed.

The object correlation unit 230 ranks all the obtained peripheral object observation data in the descending order of the obtained number of the frames, using the processing device 911. The larger the number of correlated frames is, the lower the possibility that the peripheral object observation data is obtained by erroneous detection due to noise or the like, and the lower the possibility of the erroneous recognition of a moving object to be still. For this reason, the peripheral object observation data having a large number of correlated frames is highly likely to be correlated with peripheral object observation data in a current frame as well. By ranking the peripheral object observation data in the descending order of the possibility of being correlated with the peripheral object observation data in the current frame in advance, the amount of computation in the object correlation step S530 may be reduced.

In the current frame stationary object acquisition step S532, the object correlation unit 230 obtains all peripheral object observation data on objects observed by the peripheral object observation device 811 in a most recent frame and determined to be still by the stationary object determination unit 220 in the still determination step S520 from among the peripheral object observation data stored by the relative position acquisition unit 211, using the processing device 911.

In the immediately preceding frame object selection step S533, the object correlation unit 230 selects one of the peripheral object observation data in the order of the ranking in the immediately preceding frame stationary object acquisition step S531 from among the peripheral object observation data obtained in the immediately preceding frame stationary object acquisition step S531, using the processing device 911.

When all the peripheral object observation data obtained in the immediately preceding frame stationary object acquisition step S531 have been already selected and no peripheral object observation data to be selected is present, the object correlation unit 230 proceeds to the identical object storage step S542, using the processing device 911.

When there are the peripheral object observation data that have not been selected yet, the object correlation unit 230 selects one of the peripheral object observation data that have not been selected yet, using the processing device 911. The object correlation unit 230 predicts the relative position of an object that is identical to the object in the selected peripheral object observation data and that will be observed by the peripheral object observation device 811 in the current frame. Using the processing device 911, the object correlation unit 230 makes prediction, based on a state quantity such as the trajectory of the relative position of the correlated object relative to the moving object in the frames up to the immediately preceding frame, for example.

In the immediately preceding frame object parallel translation step S534, using the processing device 911, the object correlation unit 230 subtracts coordinates of relative positions of the objects relative to the moving object indicated by relative position observation value data included in the peripheral object observation data selected in the current frame stationary object acquisition step S532 from coordinates of relative positions of the objects relative to the moving object observed by the peripheral object observation device 811 indicated by relative position observation value data included in all of the peripheral object observation data obtained in the immediately preceding frame stationary object acquisition step S531, thereby translating the coordinates of the objects in parallel. The object correlation unit 230 stores data indicating coordinates obtained by parallel translation for each of the peripheral object observation data obtained in the immediately preceding frame stationary object acquisition step S531, using the storage device 914.

In the current frame object selection step S535, using the processing device 911, the object correlation unit 230 ranks the peripheral object observation data obtained in the current frame stationary object acquisition step S532 in the order of closeness of the relative position of each object relative to the moving object observed by the peripheral object observation device 811 indicated by relative position observation value data included in the peripheral object observation data to the relative position predicted in the immediately preceding frame object selection step S533. This operation is performed because the shorter the distance of the relative position of the object to the predicted relative position is, the higher the possibility that the identical object has been observed is. The object correlation unit 230 may be configured to extract only the peripheral object observation data where the distance between its relative position and the predicted relative position shorter than a predetermined threshold value, and then ranks the extracted data in the order of closeness of the relative positions.

Using the processing device 911, the object correlation unit 230 selects one of the peripheral object observation data obtained in the current frame stationary object acquisition step S532 (or the extracted peripheral object observation data each having the distance to the relative position predicted in the immediately preceding frame object selection step S533 shorter than the predetermined threshold value) in the order of closeness of the distance to the relative position predicted in the immediately preceding frame object selection step S533.

When all of the peripheral object observation data obtained in the current frame stationary object acquisition step S532 (or the extracted peripheral object observation data each having the distance to the relative position predicted in the immediately preceding frame object selection step S533 shorter than the predetermined threshold value) have been already selected, and no peripheral object observation data to be selected is present, the object correlation unit 230 returns the procedure to the immediately preceding frame object selection step S533, using the processing device 911, and selects a subsequent one of the peripheral object observation data selected in the immediately preceding frame stationary object acquisition step S531.

When there are the peripheral object observation data that have not been selected yet, the object correlation unit 230 selects one of the peripheral object observation data that have not been selected yet, using the processing device 911, and proceeds to the current frame object parallel translation step S536.

In the current frame object parallel translation step S536, using the processing device 911, the object correlation unit 230 subtracts coordinates of the relative position of the object relative to the moving object indicated by the relative position observation value data included in the peripheral object observation data selected in the current frame object selection step S535 from coordinates of relative positions of the objects observed by the peripheral object observation device 811 indicated by the relative position observation value data included in all of the peripheral object observation data obtained in the current frame stationary object acquisition step S532, thereby translating the coordinates of the objects in parallel. The object correlation unit 230 stores data indicating coordinates obtained by translating in parallel for each of the peripheral object observation data obtained in the current frame stationary object acquisition step S532, using the storage device 914.

In the rotation angle selection step S537, the object correlation unit 230 assumes that the peripheral object observation data selected in the immediately preceding frame object selection step S533 and the peripheral object observation data selected in the current frame object selection step S535 are the peripheral object observation data indicating observation results obtained by observation of the identical object, and estimates the turn angle of the moving object, using the processing device 911. The object correlation unit 230 may be configured to use the angular velocity of the moving object observed by the angular speed observation device or the like for estimation of the turn angle. The object correlation unit 230 determines a plurality of rotation angles for trial, based on the estimated turn angle, using the processing device 911.

The object correlation unit 230 selects one of the determined rotation angles in the order of closeness to the estimated turn angle, using the processing device 911.

When all of the determined rotation angles have already been selected and no rotation angle to be selected is present, the object correlation unit 230 returns the procedure to the current frame object selection step S535, using the processing device 911, and selects a subsequent one of the peripheral object observation data obtained in the current frame stationary object acquisition step S532.

When an unselected one of the rotation angles is present, the object correlation unit 230 selects the unselected one of the rotation angles, using the processing device 911, and proceeds to the current frame object rotation step S538.

In the current frame object rotation step S538, the object correlation unit 230 rotates the coordinates of the objects obtained by parallel translation in the current time object parallel translation step S536 for all the peripheral object observation data obtained in the current frame stationary object acquisition step S532, with respect to the origin by the rotation angle selected in the rotation angle selection step S537, using the processing device 911.

In the distance computation step S539, for all combinations of all the peripheral object observation data obtained in the immediately preceding frame stationary object acquisition step S531 and all the peripheral object observation data obtained in the current frame stationary object acquisition step S532, using the processing device 911, the object correlation unit 230 computes distances between the respective coordinates about the peripheral object observation data obtained in the immediately preceding frame stationary object acquisition step S531, obtained by parallel translation in the immediately preceding frame object parallel translation step S534 and respective coordinates about the peripheral object observation data obtained in the current frame stationary object acquisition step S532, obtained by rotation in the current frame object rotation step S538. The object correlation unit 230 generates pairs of the peripheral object observation data obtained in the immediately preceding frame stationary object acquisition step S531 and the peripheral object observation data obtained in the current frame stationary object acquisition step S532 in the ascending order of the computed distances, using the processing device 911.

In the identical object determination step S540, the object correlation unit 230 counts the number of the pairs of the peripheral object observation data generated in the distance computation step S539 each having the computed distance shorter than a predetermined threshold value. The object correlation unit 230 compares the counted number of the pairs with the maximum value of the number of the pairs having been counted so far in the identical object determination step S540 during the current prosecution of the object correlation step S530, using the processing device 911.

When it is found that the current counted number of the pairs is smaller than the maximum value of the number of the pairs counted so far, the object correlation unit 230 returns the procedure to the rotation angle selection step S537 to select a subsequent one of the rotation angles.

When it is found that the current counted number of the pairs is larger than the maximum value of the number of the pairs counted so far, the object correlation unit 230 stores data indicating the pairs each having the computed distance shorter than the predetermined threshold value from among the pairs generated in the distance computation step S539 and the counted number of the pairs, using the storage device 914. The object correlation unit 230 proceeds to the threshold determination step S541, using the processing device 911.

In the threshold determination step S541, the object correlation unit 230 compares the number of the pairs counted in the distance computation step S539 with a predetermined threshold value, using the processing device 911.

When it is found that the counted number of the pairs is smaller than the threshold value, the object correlation unit 230 returns the procedure to the rotation angle selection step S537 to select the subsequent one of the rotation angles.

When it is found that the counted number of the pairs is larger than the threshold value, the object correlation unit 230 proceeds to the identical object storage step S542, using the processing device 911. The reason for this operation is as follows. Since the process is tried in the descending order of the possibility that correlation may be taken, it is highly likely that a correct combination and a correct rotation angle may be found in an early stage. Thus, the amount of computation is reduced not by performing trial of the process after it has been found that the counted number of the pairs is larger than the threshold value.

The threshold value used in the comparison may be a predefined constant. Alternatively, the object correlation unit 230 may compute the threshold, based on the number of the peripheral object observation data obtained in the immediately preceding frame stationary object acquisition step S531 and the number of the peripheral object observation data obtained in the current frame stationary object acquisition step S532. To take an example, the object correlation unit 230 compares the number of the peripheral object observation data obtained in the immediately preceding frame stationary object acquisition step S531 with the number of the peripheral object observation data obtained in the current frame stationary object acquisition step S532 to obtain the smaller number of the peripheral object observation data, and multiplies the obtained number by a predetermined constant (such as 0.6), thereby computing the threshold value.

In the identical object storage step S542, the object correlation unit 230 determines the pairs indicated by the data stored in the identical object determination step S540 to be the peripheral object observation data indicating the result of the observation of identical objects by the peripheral object observation device 811, using the processing device 911. The object correlation unit 230 generates the above-mentioned correlation count data as correlation result data indicating the result of the determination, using the processing device 911. The object correlation unit 230 generates data indicating which peripheral object observation data are the peripheral object observation data indicating the result of the observation of an identical object by the peripheral object observation device 811 as the correlation result data, using the processing device 911. The object correlation unit 230 assigns a number to an object observed by the peripheral object observation device 811, for example, using the processing device 911. The object correlation unit 230 associates and stores data indicating the assigned number with the peripheral object observation data, using the storage device 914. The object correlation unit 230 assigns the same number to the peripheral object observation data as that assigned for a peripheral object observation data in an immediately preceding frame, when the peripheral object observation data is determined to indicate the result of the observation of the object observed by the peripheral object observation device 811 identical to that indicated by the peripheral object observation data in the immediately preceding frame. The object correlation unit 230 assigns a different number to the other peripheral object observation data from that assigned to any of the peripheral object observation data.

Figure 28:
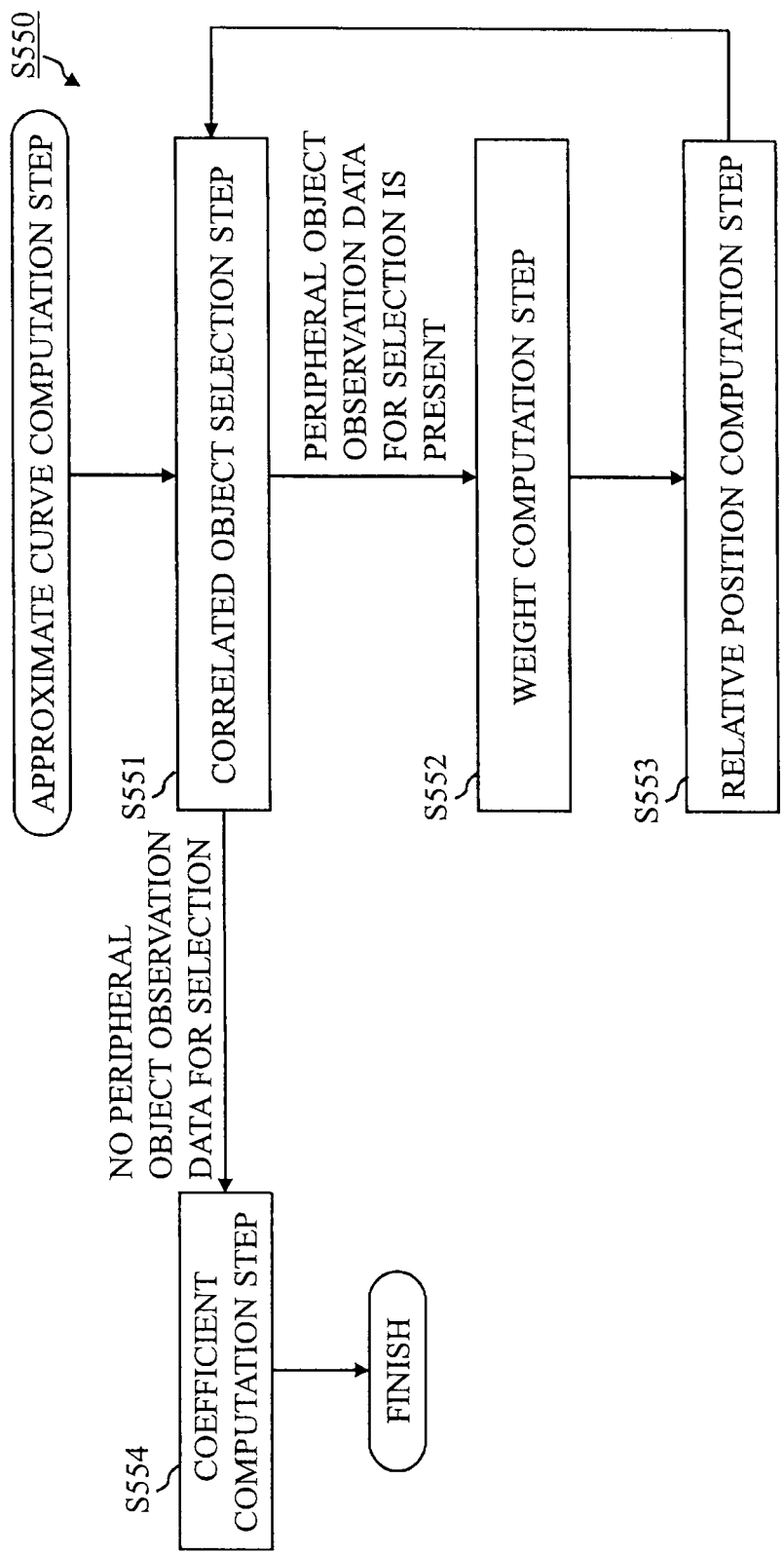
FIG. 28 is a flowchart diagram showing an example of a flow of an approximate curve computation step S550 in the fourth embodiment.

FIG. 28 is a flowchart diagram showing an example of a flow of the approximate curve computation step S550 in this embodiment.

The approximate curve computation step S550 includes a correlated object selection step S551, a weight computation step S552, a relative position computation step S553, and a coefficient computation step S554.

In the correlated object selection step S551, using the processing device 911, the approximate curve computation unit 240 selects one of the peripheral object observation data stored by the relative position acquisition unit 211 on an object observed by the peripheral object observation device 811 in a most recent frame. The peripheral object observation data is selected when the object correlation unit 230 has determined in the object correlation step S530 that it indicates a result of the observation of the object identical to that in the peripheral object observation data observed by the peripheral object observation device 811 in an immediately preceding frame. The approximate curve computation unit 240 selects from among the peripheral object observation data stored by the relative position acquisition unit 211, the peripheral object observation data on which associated correlation count data has been stored by the object correlation unit 230, using the processing device 911, for example.

When the peripheral object observation data for which correlation has been taken are already selected and no peripheral object observation data to be selected is present, the approximate curve computation unit 240 proceeds to the coefficient computation step S554, using the processing device 911.

When there is unselected peripheral object observation data in the peripheral object observation data for which correlation has been taken, the approximate curve computation unit 240 selects the unselected peripheral object observation data and then proceeds to the weight computation step S552, using the processing device 911.

In the weight computation step S552, the approximate curve computation unit 240 computes a weight $W_i$, based on the number of times of correlation of the peripheral object observation data selected in the correlated object selection step S551, using the processing device 911.

In the relative position computation step S553, the approximate curve computation unit 240 computes a relative position $(x_i, y_i)$ of the object indicated by the peripheral object observation data selected by the correlated object selection step S551 relative to the moving object at a certain time, using the processing device 911.

The approximate curve computation unit 240 returns the procedure to the correlated object selection step S551 to select a subsequent one of the peripheral object observation data, using the processing device 911.

In the coefficient computation step S554, the approximate curve computation unit 240 computes the coefficients $O_x$ and R by which the sum of square of weighted residuals J is minimized, based on the weight $W_i$ computed in the weight computation step S552 and the relative position $(x_i, y_i)$ computed in the relative position computation step S553. The approximate curve computation unit 240 generates simultaneous equations by which the factors $O_x$ and R that minimize the sum of square of weighted residuals are obtained, using the processing device 911. Using the processing device 911, the approximate curve computation unit 240 solves the generated simultaneous equations to compute the factors $O_x$ and R.

Fifth Embodiment

A fifth embodiment will be described, using FIGS. 29 to 33.

The same reference numerals are assigned to components common to those in the first to fourth embodiments, thereby omitting repeated description of the components.

Figure 29:
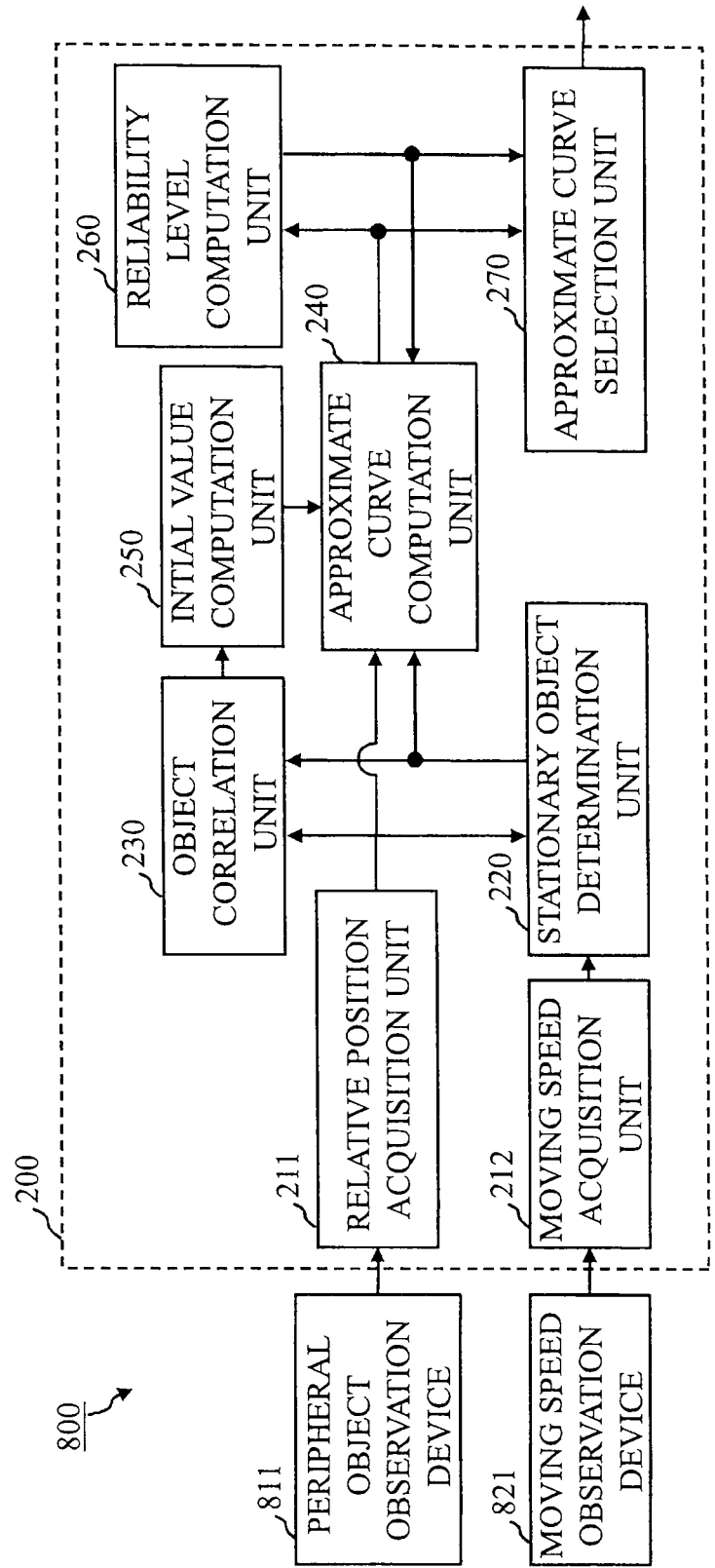
FIG. 29 is a system configuration diagram showing an example of an overall configuration of a road configuration estimation system 800 in a fifth embodiment.

FIG. 29 is a system configuration diagram showing an example of an overall configuration of a road configuration estimation system 800 in this embodiment.

A road configuration estimation apparatus 200 includes an initial value computation unit 250, a reliability level computation unit 260, and an approximate curve selection unit 270 in addition to the configuration described in the fourth embodiment.

The approximate curve computation unit 240 updates an approximate curve computed at an immediately preceding time, thereby computing an approximate curve at a latest time, instead of individually computing the approximate curve at each times. Whenever the stationary object determination unit 220 determines that an object observed by the peripheral object observation device 811 is still, the approximate curve computation unit 240 updates the approximate curve, based on a result of the observation by the peripheral object observation device 811, using the processing device 911. The approximate curve computation unit 240 updates the approximate curve, using a tracking filter such as an extended Kalman filter.

The initial value computation unit 250 computes the initial value of the approximate curve computed by the approximate curve computation unit 240. The initial value computation unit 250 computes the initial value of the approximate curve, based on a result of the determination by the object correlation unit 230, using the processing device 911.

The reliability level computation unit 260 computes the reliability level of the approximate curve computed by the approximate curve computation unit 240.

When a plurality of approximate curves computed by the approximate curve computation unit 240 are present, the approximate curve selection unit 270 selects one of the approximate curves computed by the approximate curve computation unit 240 for adoption, based on the reliability level computed by the reliability level computation unit 260.

The trajectory of the relative position of the object relative to a moving object observed by the peripheral object observation device 811, reflects movement and a change in the orientation of the moving object. Accordingly, a moving amount of the moving object is known from the trajectory of the relative position of the object relative to the moving object observed by the peripheral object observation device 811.

Figure 30:
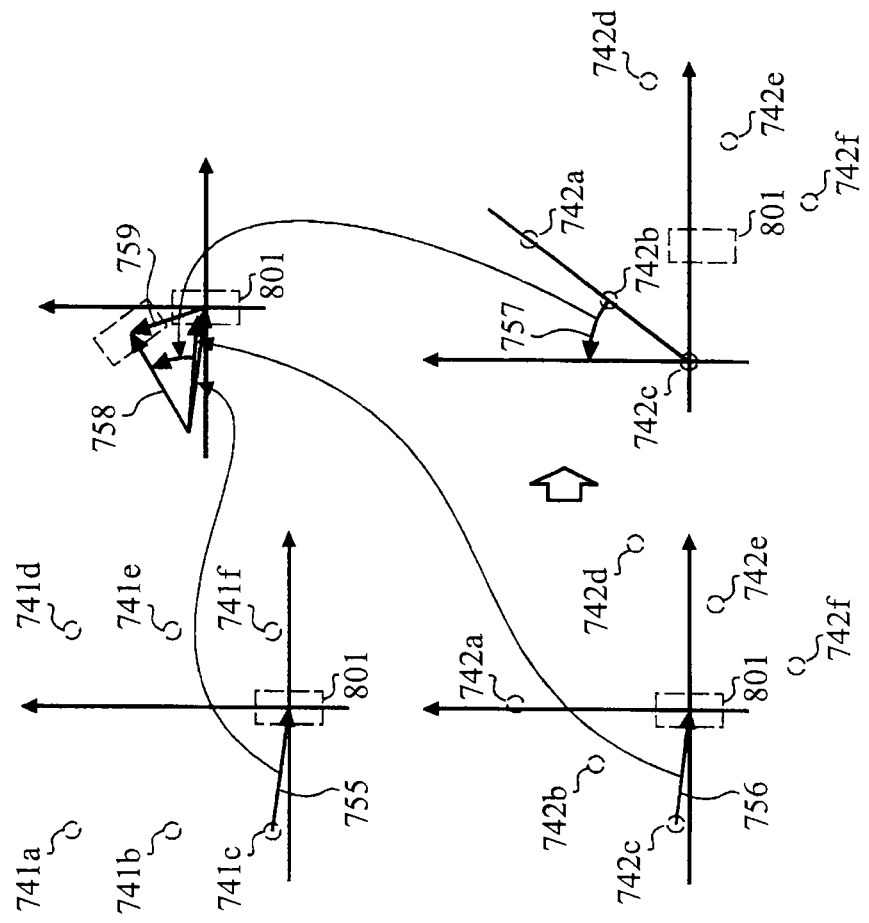
FIG. 30 is a diagram for explaining a relationship between a parallel translation amount and a rotation angle used for a correlation process by an object correlation unit 230 and a moving amount of a moving object 801.

FIG. 30 is a diagram for explaining a relationship between a parallel translation amount and a rotation angle used for the correlation process by the object correlation unit 230 and the moving amount of the moving object 801.

The following is assumed: the object correlation unit 230 takes correlation between relative positions 741a to 741f of stationary objects relative to a moving object 801 observed by the peripheral object observation device 811 in a certain frame and relative positions 742a to 742f of the stationary objects relative to the moving object 801 observed by the peripheral object observation device 811 in another frame; the object correlation unit 230 translates coordinates of the relative positions 741a to 741f in parallel using a vector 755 to cause the coordinates of the relative position 741c to coincide with the origin; the object correlation unit 230 translates coordinates of the relative positions 742a to 742f in parallel, using a vector 756 to cause the coordinates of the relative position 742c to coincide with the origin and then rotates the coordinates of the translated relative positions just by a rotation angle 757; and correlation is thereby taken.

In this case, a difference vector 759 obtained by subtracting the vector 755 from a vector 758 indicates the moving amount of the moving object 801 in a moving-object-referenced relative coordinate system between those two frames. The vector 758 is obtained by rotating the vector 756 just by the rotation angle 757.

The rotation angle 757 is the turn angle of the moving object 801 between the two frames.

When the number of pairs counted at the current time is larger than the maximum value of the number of pairs counted so far in the identical object determination step S540 described with reference to FIG. 27, for example, the object correlation unit 230 stores the peripheral object observation data selected in the immediately preceding frame object selection step S533, the peripheral object observation data selected in the current frame object selection step S535, and data indicating the rotation angle selected in the rotation angle selection step S537, using the storage device 914.

The initial value computation unit 250 estimates the moving amount and the turn angle of the moving object, based on the two peripheral object observation data and the data indicating the rotation angle, which are stored by the object correlation unit 230. The initial value computation unit 250 obtains the relative position of the object relative to the moving object observed by the peripheral object observation device 811 in the most recent frame from the peripheral object observation data selected by the object correlation unit 230 in the current frame object selection step S535, using the processing device 911, for example. Using the processing device 911, the initial value computation unit 250 rotates coordinates indicating the obtained relative position with respect to the origin just by the rotation angle selected by the object correlation unit 230 in the rotation angle selection step S537. Using the processing device 911, the initial value computation unit 250 obtains the relative position of the object relative to the moving object observed by the peripheral object observation device 811 in the immediately preceding frame from the peripheral object observation data selected by the object correlation unit 230 in the immediately preceding frame object selection step S533. Using the processing device 911, the initial value computation unit 250 computes a difference obtained by subtracting coordinates obtained by the rotation from coordinates indicating the obtained relative position, and sets the computed difference to the estimation value of the moving amount of the moving object. Using the processing device 911, the initial value computation unit 250 sets the rotation angle selected by the object correlation unit 230 in the rotation angle selection step S537 to the estimation value of the turn angle of the moving object.

When a moving object such as a motor vehicle is running on a road, the moving object may be considered to make movement along the configuration of the road under normal conditions. For this reason, the moving amount and the turn angle of the moving object estimated by the initial value computation unit 250 reflect the configuration of a portion of the road on which the moving object has already passed.

The initial value computation unit 250 computes the curvature of the road on which the moving object is running, based on the estimated moving amount and the estimated turn angle of the moving object, using the processing device 911. The initial value computation unit 250 computes the quotient by dividing the turn angle by a distance moved by the moving object, as the curvature of the road, using the processing device 911, for example.

When the moving speed of the moving object is slow, the moving object does not necessarily move along the configuration of the road. For this reason, the initial value computation unit 250 may be configured to obtain the moving speed of the moving object observed by the moving speed observation device 821 based on moving speed data stored by the moving speed acquisition unit 212, and compares the obtained moving speed with a predetermined threshold value, using the processing device 911. Then, the initial value computation unit 250 may be configured to compute the curvature of the road only when the moving speed of the moving object is faster than the threshold value.

The initial value computation unit 250 computes the distance between the position of a stationary object along the road and the position where the moving object is running. The initial value computation unit 250 computes of the center of a circle that approximates the configuration of the road, based on the computed curvature, using the processing device 911, for example. The initial value computation unit 250 obtains one of relative positions of the object relative to the moving object correlated by the object correlation unit 230, whose distance from the moving object is closer to a predetermined threshold value, using the processing device 911. Using the processing device 911, the initial value computation unit 250 rotates the obtained relative position with respect to the computed center so that the object is located just lateral to the moving object, thereby estimating a position at which the object passes just lateral to the moving object. The initial value computation unit 250 computes the distance between the position of the stationary object along the road and the position where the moving object is running, based on the estimated position, using the processing device 911. The distance computed by the initial value computation unit 250 becomes the initial value of the X-intercept of the approximate curve.

When there are a plurality of relative positions of objects relative to the moving object correlated by the object correlation unit 230, whose distances from the moving object are closer to the predetermined threshold value, the initial value computation unit 250 estimates an position at which the object passes just lateral to the moving object for each relative position, using the processing device 911.

The initial value computation unit 250 groups the plurality of relative positions, based on the estimated positions, using the processing device 911. When a distance between the estimated positions of the objects is smaller than a predetermined threshold value, the objects having such estimated positions are considered to be arranged in a line. The initial value computation unit 250 computes the distance between the two of the computed relative positions to compare the distance with the threshold value, using the processing device 911, for example. When the distance between the two relative positions is smaller than the threshold value, the initial value computation unit 250 classifies the two relative positions into a same group, using the processing device 911. When such a group is located on each of the right and left sides of the moving object, for example, the group on the right side may be considered to be the right edge of the road, and the group on the left side of the moving object may be considered to be the left edge of the road. When two of the groups as described above are located on the right side of the moving object, the group closer to the moving object may be considered to be the median of the road, and the group that is more distant from the moving object may be considered to be the right edge of the road, in the case of left-hand traffic.

The initial value computation unit 250 averages estimated positions of the relative positions classified into each group to set the computed mean position as the estimated position of the group, using the processing device 911. When there are three of the groups as mentioned above, for example, the initial value computation unit 250 estimates three positions. The initial value computation unit 250 computes three initial values of approximate curves' X-intercepts. The approximate curve computation unit 240 computes three approximate curves, based on this computation.

As described above, the curvature computed by the initial value computation unit 250 based on the moving amount and the turn angle is the curvature of the portion of the road through which the moving object has already passed. Accordingly, when the curvature of the road is changed at a point ahead of the moving object, the curvature of a portion of the road after the change in the curvature is not known. For this reason, the approximate curve computation unit 240 computes the approximate curve that approximates the configuration of the road including the portion of the road after the change in the curvature, using the curvature computed by the initial value computation unit 250 as the initial value of the curvature.

Figure 31:
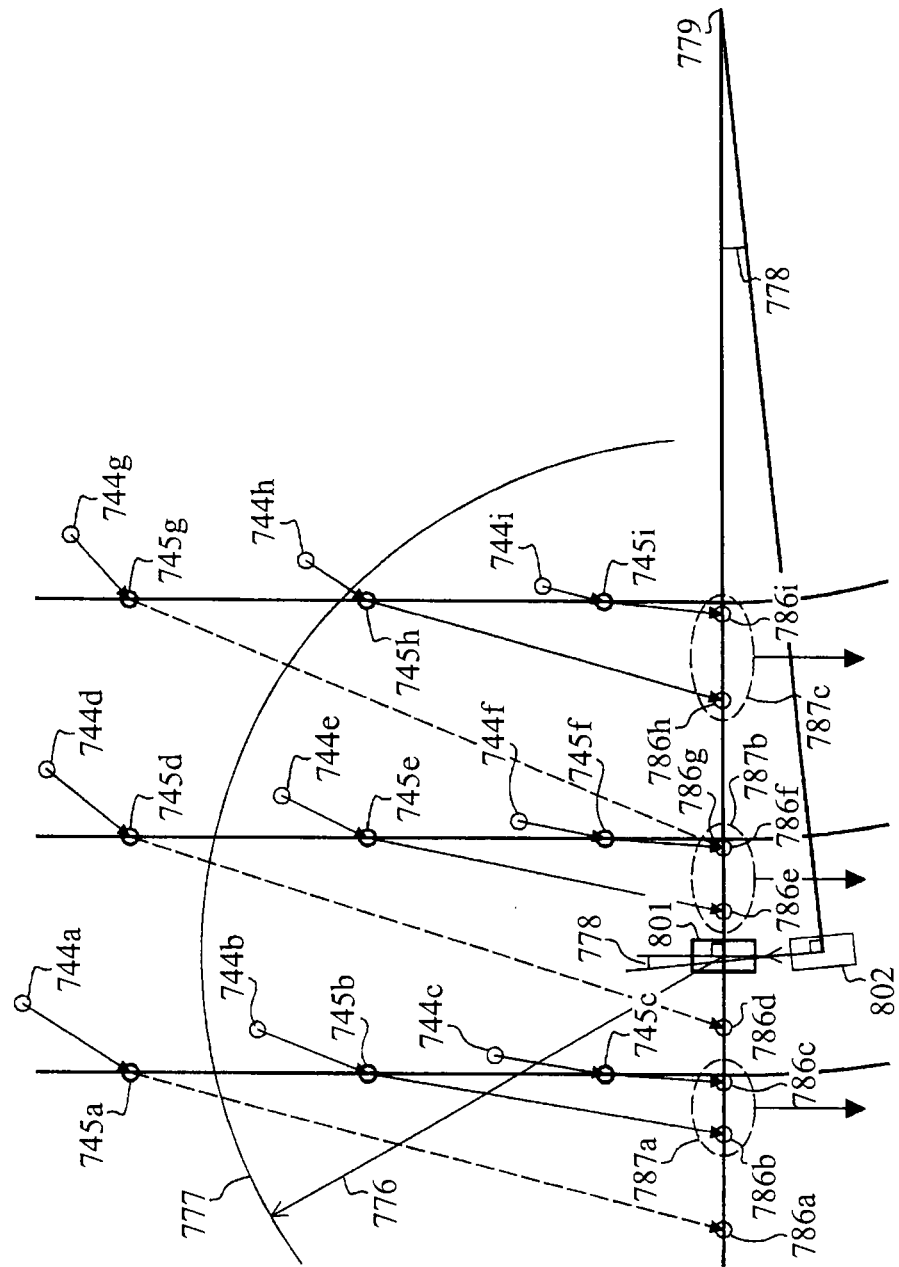
FIG. 31 is an explanatory diagram for explaining an operation of an initial value computation unit 250 in the fifth embodiment.

FIG. 31 is an explanatory diagram for explaining an operation of the initial value computation unit 250 in this embodiment.

When the moving object 801 is located at a position 802, the peripheral object observation device 811 observes relative positions 744*a* to 744*i* of nine objects. The stationary object determination unit 220 determines that the objects respectively observed at the relative positions 744*a* to 744*i* are still.

When the moving object 801 is moved to a current position, the peripheral object observation device 811 observes relative positions 745*a* to 745*i* of the nine objects. The stationary object determination unit 220 determines that the objects respectively observed at the positions 745*a* to 745*i* are still.

The object correlation unit 230 determines that the relative positions 744*a* and 745*a* have resulted from observation of the identical object. Similarly, the object correlation unit 230 determines that the relative positions 744*b* and 745*b* have resulted from observation of the identical object, the relative positions 744*c* and 745*c* have resulted from observation of the identical object, the relative positions 744*d* and 745*d* have resulted from observation of the identical object, the relative positions 744*e* and 745*e* have resulted from observation of the identical object, the relative positions 744*f* and 745*f* have resulted from observation of the identical object, the relative positions 744*g* and 745*g* have resulted from observation of the identical object, the relative positions 744*h* and 745*h* have resulted from observation of the identical object, and the relative positions 744*i* and 745*i* have resulted from observation of the identical object.

The initial value computation unit 250 computes a moved distance and a turn angle 778 of the moving object, based on this determination result. The initial value computation unit 250 computes a turn center 779, based on the computed moving distance and turn angle 778. The relative positions 745b, 745c, 745e, 745f, 745h, 745i of six objects from among the relative positions 745a to 745i of nine objects are within a range 777 where a distance from moving object 801 is shorter than threshold value 776. The initial value computation unit 250 rotates the relative positions 745b, 745c, 745e, 745f, 745h, and 745i of six objects with respect to the turn center 779, thereby computing positions 786b, 786c, 786e, 786f, 786h, and 786i that will be located just lateral to the moving object 801. The initial value computation unit 250 groups the computed six positions, thereby generating three groups 787a to 787c. The initial value computation unit 250 averages the positions classified into each of the generated three groups 787a to 787c. The obtained average position for each group is set as the initial value of the X-intercept of each of three approximate curves.

This example in FIG. 31 shows a state where the moving object 801 has just passed through a curve and is then entering into a straight road. Thus, the curvature of the road on which the moving object 801 was running differs from the curvature of the road on which the moving object 801 will run from now on. This difference leads to an error of the initial value of the X-intercept of each approximate curve that will be computed by the initial value computation unit 250. The larger a distance from the moving object 801 is, more the error caused by the change in the curvature increases. For this reason, the initial value computation unit 250 does not compute positions 786a, 786d, and 786g that will be located just lateral to the moving object 801 for the relative positions 745a, 745d, and 745g of the objects each having a distance from the moving object 801 larger than the threshold value 776.

Figure 32:
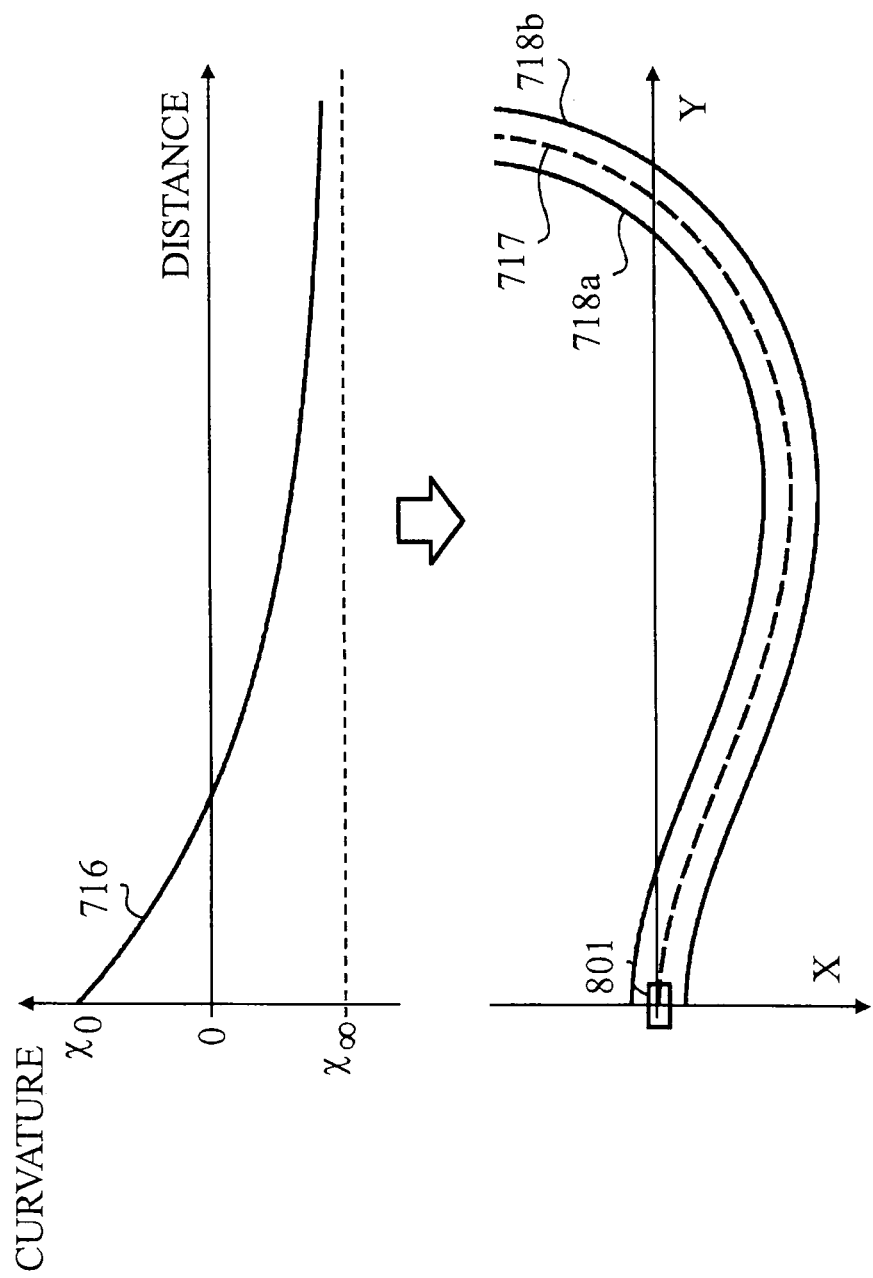
FIG. 32 is a diagram showing an example of approximate curves computed by an approximate curve computation unit 240 in the fifth embodiment.

FIG. 32 is a diagram showing an example of approximate curves computed by the approximate curve computation unit 240 in this embodiment.

A curve 716 indicates a relationship between a distance from the moving object 801 and the curvature of a road. In this example, the configuration of the road is approximated by the approximate curve that assumes a continuous change in the curvature of the road. Assume that the curvature at the current position of the moving object is indicated by $\chi_0$ and the curvature at a very far position is indicated by $\chi_\infty$. Then, the larger the distance from the moving object is, the more the curvature of the road approaches the curvature $\chi_\infty$.

A curve 717 approximates a route through which the moving object is running. The curvature of the curve 717 follows the relationship indicated by the curve 716. Two curves 718a and 718b are approximate curves that approximate configurations of edges of the road. Each of the curves 718a and 718b has a constant distance from the curve 717.

[Expression 23]
$$\chi(s) = (\chi_0 - \chi_\infty)e^{as} + \chi_\infty$$
$$\theta(s) = \int_0^s \chi(s)ds = \frac{\chi_0 - \chi_\infty}{a}(e^{as} - 1) + \chi_\infty s$$
$$C: \begin{pmatrix} x \\ y \end{pmatrix} = \begin{pmatrix} \int_0^s \sin\theta(s)ds + w\cos\theta(s) \\ \int_0^s \cos\theta(s)ds - w\sin\theta(s) \end{pmatrix}$$

where s denotes a distance from the moving object along the road, and is equal to or more than zero. $\chi$ denotes a curvature of the road and is a function of the distance s. $\chi_0$ denotes the curvature when the distance s is zero. $\chi_\infty$ denotes the curvature that is gradually approached as the distance s increases. a denotes a change rate of the curvature of the road, and is smaller than zero. θ denotes a road direction relative to a road direction when the distance s is zero, and is a function of the distance s. C denotes an approximate curve. w denotes a distance between a running position of the moving object and an edge of the road.

The approximate curve computation unit 240 computes the approximate curve expressed by the equation given above, for example. The approximate curve computation unit 240 uses initial values computed by the initial value computation unit 250 as initial values of the curvature $\chi_0$, the curvature $\chi_\infty$, and the distance s. Among the initial values computed by the initial value computation unit 250, the initial values of the curvatures are the initial values of the curvatures $\chi_0$ and $\chi_\infty$ and the initial value of the X-intercept is the initial value of the distance s. Since the initial value computation unit 250 does not compute the initial value of the change rate a, the approximate curve computation unit 240 sets a predetermined value (such as $-1 \times 10^{-5}$) as the initial value of the change rate a.

The approximate curve is not limited to the curve expressed by this equation, and may be a conic curve such as a circle or a parabola, a clothoid curve, an elliptic curve, or a hyperelliptic curve.

When there is no approximate curve being tracked, the approximate curve computation unit 240 generates the approximate curve in which the initial values computed by the initial value computation unit 250 have been set, using the processing device 911, and starts tracking.

When there is the approximate curve being tracked, the approximate curve computation unit 240 determines whether or not the initial values computed by the initial value computation unit 250 are those of the approximate curve being tracked, using the processing device 911. The approximate curve computation unit 240 computes a difference by subtracting the initial value of the X-intercept computed by the initial value computation unit 250 from the X-intercept of the approximate curve being tracked, using the processing device 911, for example. Using the processing device 911, the approximate curve computation unit 240 compares the absolute value of the computed difference with a predetermined threshold value. When the absolute value of the difference is smaller than the threshold value, the approximate curve computation unit 240 determines that the initial value belongs to the approximate curve. When the absolute value of the difference is larger than the threshold value, the approximate curve computation unit 240 determines that the initial value does not belong to the approximate curve.

When the approximate curve computation unit 240 determines that the initial value computed by the initial value computation unit 250 does not belong to any of approximate curves being tracked, the approximate curve computation unit 240 newly generates an approximate curve where the initial value is set, using the processing device 911.

When the stationary object determination unit 220 determines that an object observed by the peripheral object observation device 811 is still, the approximate curve computation unit 240 determines whether or not the relative position of the object determined to be still by the stationary object determination unit 220 can be regarded as belonging to one of the approximate curves being tracked, using the processing device 911. The approximate curve computation unit 240 causes all of the approximate curves being tracked to transition in time, thereby causing all of the approximate curves to coincide with a time at which the peripheral object observation device 811 has observed the object, using the processing device 911, for example. The approximate curve computation unit 240 computes a distance between each of the approximate curves that have transitioned in time and the relative position of the object observed by the peripheral object monitoring device 811, using the processing device 911. The approximate curve computation unit 240 determines the approximate curve having a shortest computed distance, using the processing device 911. The approximate curve computation unit 240 compares the computed distance of the determined approximate curve with a predetermined threshold value, using the processing device 911. When the distance between the relative position of the object and the approximate curve is smaller than the threshold value, the approximate curve computation unit 240 updates the approximate curve, using the relative position of the object as an observation value, using the processing device 911.

When the approximate curve computed by the approximate curve computation unit 240 is the above-mentioned approximate curve and a tracking filter used by the approximate curve computation unit 240 for updating the approximate curve is an extended Kalman filter, the approximate curve computation unit 240 uses state equations given by the following equations, for example:

[Expression 24]

$$x = \begin{pmatrix} \chi_0 \\ \chi_\infty \\ a \\ w \\ v \end{pmatrix},$$

$$f(x) = \begin{pmatrix} (\chi_0 - \chi_\infty)e^{av\Delta t} \\ \chi_\infty \\ a \\ w \\ v \end{pmatrix},$$

$$z = \begin{pmatrix} x_o \\ y_o \\ v_s \end{pmatrix},$$

$$h(x) = \begin{pmatrix} \int_0^{s_o} \sin\theta(s)\,ds + w\cos\theta(s) \\ \int_0^{s_o} \cos\theta(s)\,ds - w\sin\theta(s) \\ v \end{pmatrix}$$

where x denotes a vector representing state quantities. $\chi_0$, $\chi_\infty$, a, and w denotes coefficients of the above-mentioned approximate curve C. v denotes the moving speed of the moving object. f denotes a function representing a state transition model. $\Delta_t$ denotes an elapse of time from updating at an immediately preceding time. Z denotes a vector representing an amount of observation. $x_o$ denotes the X coordinate of the object observed by the peripheral object observation device 811 in a relative coordinate system relative to the moving object. $y_o$ denotes the y coordinate of the object observed by the peripheral object observation device 811 in the relative coordinate system relative to the moving object. $v_s$ denotes the moving speed of the moving object observed by the moving speed observation device 821. h denotes a function representing an observation model. $s_o$ denotes a distance from the moving object to a point closest to the relative position of the object observed by the peripheral object observation device 811 on the approximate curve C.

The approximate curve computation unit 240 causes all of the approximate curves being tracked to transition in time whenever the peripheral object observation device 811 observes the relative position of a stationary object, and updates only the approximate curve that could be correlated with the relative position.

When there are a plurality of the approximate curves each having a distance from the relative position smaller than the threshold value, the approximate curve computation unit 240 may be configured to update not only the approximate curve having a smallest distance from the relative position but also all of the plurality of the approximate curves each having the distance from the relative position smaller than the threshold value.

The reliability level computation unit 260 computes the reliability level of the approximate curve computed by the approximate curve computation unit 240, using the processing device 911. The reliability level computation unit 260 computes the reliability level of the approximate curve, based on a spatial variance of the relative position used for updating the approximate curve by the approximate curve computation unit 240.

The reliability level computation unit 260 accumulates and stores the distance $s_o$ from the moving object to the point on the approximate curve C closest to the relative position used for updating for each approximate curve computed by the approximate curve computation unit 240, using the storage device 914.

When the approximate curve computation unit 240 performs the time transition process, the reliability level computation unit 260 computes a difference by subtracting the product between the moving speed v of the moving object and the transition time $\Delta_t$ from the distance $s_o$ for each stored distance $s_o$, using the processing device 911. The reliability level computation unit 260 updates the distance $s_o$ by the computed difference, and stores the updated distance $s_o$, using the storage device 914. When the distance $s_o$ is negative, the reliability level computation unit 260 deletes the distance $s_o$, and does not store the updated distance $s_o$.

When the approximate curve computation unit 240 performs the updating process of an approximate curve, the reliability level computation unit 260 obtains information for identifying the approximate curve such as the number for the approximate curve updated by the approximate curve computation unit 240 and the distance $s_o$. The reliability level computation unit 260 stores the obtained distance $s_o$ together with the already stored distance $s_o$, using the storage device 914.

The reliability level computation unit 260 computes a variance $\delta^2$ of the distance $s_o$, based on the distance $s_o$ stored as described above. The reliability level computation unit 260 computes a total value $\Sigma s_o$ of the stored distances $s_o$, using the processing device 911. The reliability level computation unit 260 computes an average value $s_a$ based on the computed total value $\Sigma s_o$, using the processing device. The reliability level computation unit 260 computes a total value $\Sigma(s_o - s_a)^2$ of square of a difference between the stored distance $s_o$ and the computed average value $s_a$, using the processing device 911. The reliability level computation unit 260 computes the variance $\delta^2$, based on the computed total value $\Sigma(s_o - s_a)^2$, using the processing device 911.

The reliability level computation unit 260 sets the variance $\delta^2$ computed for each approximate curve as the reliability value of the approximate curve without alteration. Alternatively, the reliability level computation unit 260 normalizes the computed variance $\delta^2$, and sets the normalized variance $\delta^2$ as the reliability level of the approximate curve, using the processing device 911.

The reliability level computation unit 260 may be configured to use an error variance-covariance matrix computed during computation of each approximate curve by the approximate curve computation unit 240 for reliability level computation.

The approximate curve computation unit 240 may be configured to discard the approximate curve having a low reliability level computed by the reliability level computation unit 260. The approximate curve computation unit 240 obtains the reliability level of each of the approximate curves being tracked that has been computed by the reliability level computation unit 260, using the processing device 911, for example. The approximate curve computation unit 240 compares the obtained reliability level with a predetermined threshold value, using the processing device 911. When the reliability level is lower than the threshold value, the approximate curve computation unit 240 stops approximate curve tracking, using the processing device 911. Alternatively, the approximate curve computation unit 240 may be configured to reinitialize the coefficients $\chi_o$ or $\chi_\infty$ of the approximate curve, using the coefficients of a different one of the approximate curves being tracked.

The approximate curve selection unit 270 selects the approximate curve to be adopted, from among the approximate curves computed by the approximate curve computation unit 240, based on the reliability level computed by the reliability level computation unit 260. Using the processing device 911, the approximate curve selection unit 270 determines the approximate curve having a highest reliability level from among the approximate curves computed by the approximate curve computation unit 240, and adopts the determined approximate curve. The approximate curve selection unit 270 outputs coefficients of the adopted approximate curve, using the processing device 911.

When there are a plurality of the approximate curves each having the reliability level higher than the predetermined threshold value, the approximate curve selection unit 270 may be configured to adopt the plurality of the approximate curves each having the reliability level higher than the predetermined threshold value rather than to adopt only one of the approximate curves having the reliability level that is the highest. Alternatively, the approximate curve selection unit 270 may be configured to weight coefficients of each approximate curve computed by the approximate curve computation unit 240 by the reliability level computed by the reliability level computation unit 260, average the weighted coefficients of the approximate curves, and then adopt the approximate curve having the averaged coefficients.

Figure 33:
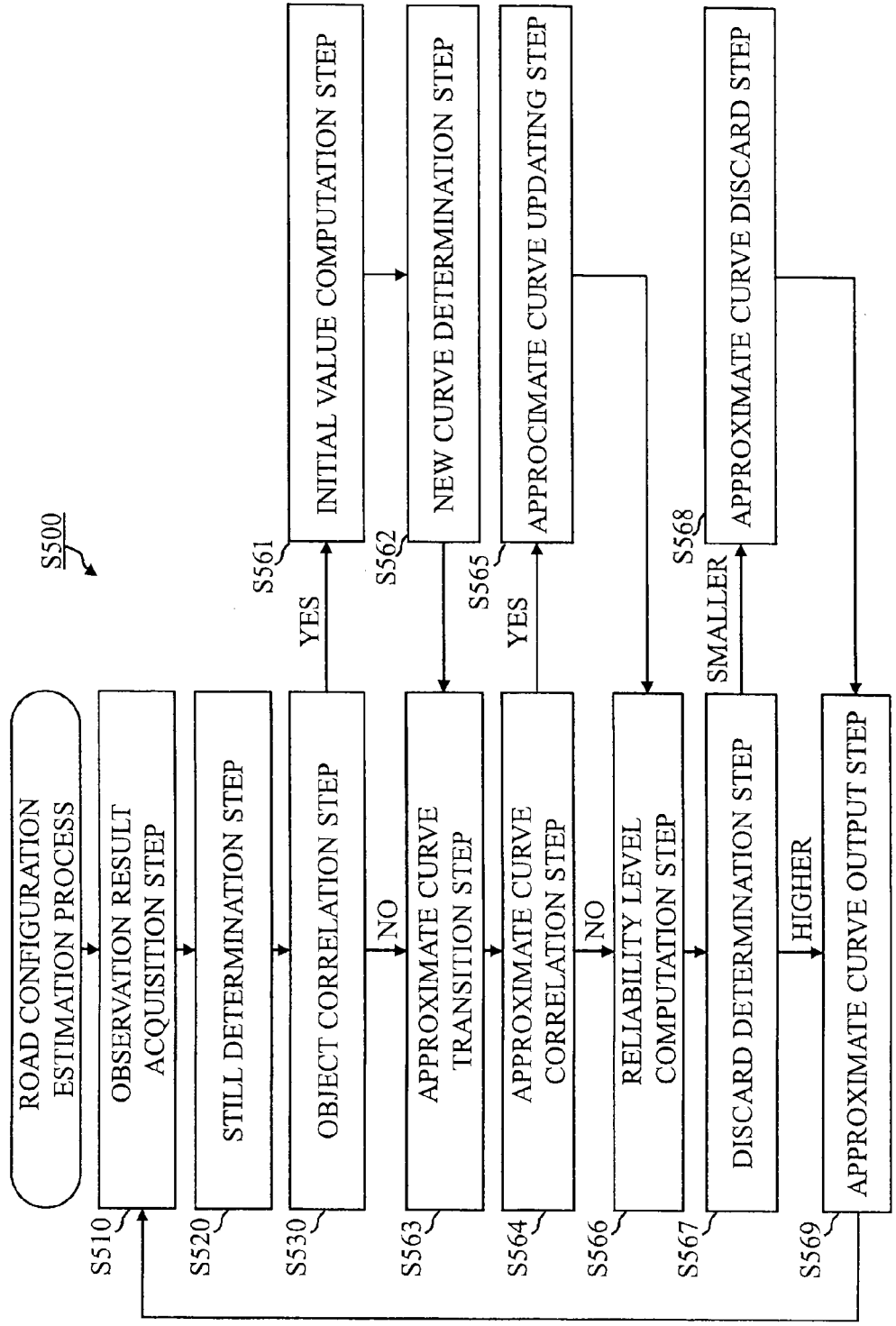
FIG. 33 is a flowchart diagram showing an example of a flow of a road configuration estimation process S500 in the fifth embodiment.

FIG. 33 is a flowchart diagram showing an example of a flow of a road configuration estimation process S500 in this embodiment.

In addition to the observation result acquisition step S510, the still determination step S520, and the object correlation step S530 described in the fourth embodiment, the road configuration estimation process S500 includes an initial value computation step S561, a new curve determination step S562, an approximate curve transition step S563, an approximate curve correlation step S564, an approximate curve updating step S565, a reliability level computation step S566, a discard determination step S567, an approximate curve discard step S568, and an approximate curve output step S569.

When the peripheral object observation device 811 determines that there is peripheral object observation data with which the relative position of a stationary object newly observed by the peripheral object observation device 811 can be correlated in the object correlation step S530, the object correlation unit 230 proceeds to the initial value computation step S561.

When the peripheral object observation device 811 determines that there is no peripheral object observation data with which the relative position of the stationary object can be correlated, the object correlation unit 230 proceeds to the approximate curve transition step S563, using the processing device 911.

In the initial value computation step S561, the initial value computation unit 250 estimates the moving amount and turn angle of the moving object, based on the relative position correlated by the object correlation unit 230 in the object correlation step S530, using the processing device 911. The initial value computation unit 250 computes initial values of approximate curve coefficients, based on the estimated moving amount and the estimated turn angle of the moving object and the relative position stored by the relative position acquisition unit 211 in the observation result acquisition step S510, using the processing device 911.

In the new curve determination step S562, the approximate curve computation unit 240 determines whether or not the initial values computed by the initial value computation unit 250 in the initial value computation step S561 belong to one of approximate curves being tracked, using the processing device 911. When there is the initial value determined not to belong to any of the approximate curves being tracked, the approximate curve computation unit 240 generates a new approximate curve and performs initialization using the initial values, using the processing device 911.

In the approximate curve transition step S563, the approximate curve computation unit 240 performs the time transition process for all the approximate curves being tracked, based on a difference between an observation time at which the time transition process has been performed at an immediately preceding time and an observation time at which the peripheral object observation device 811 has newly observed the stationary object, using the processing device 911. The reliability level computation unit 260 performs the time transition process about all of the stored distances $s_o$, using the processing device 911.

In the approximate curve correlation step 564, the approximate curve computation unit 240 determines one of the approximate curves being tracked which can be correlated with the relative position of the stationary object newly observed by the peripheral object observation device 811, using the processing device 911.

When there is the approximate curve which can be correlated with the relative position, the approximate curve computation unit 240 proceeds to the approximate curve updating step S565, using the processing device 911.

When there is no approximate curve which can be correlated with the relative position, the approximate curve computation unit 240 proceeds to the reliability level computation step S566, using the processing device 911.

In the approximate curve updating step S565, the approximate curve computation unit 240 performs the updating process on any approximate curve determined to be correlatable in the approximate curve correlation step S564, using the relative position of the stationary object newly observed by the peripheral object observation device 811 and using the processing device 911. The reliability level computation unit 260 stores the distance $s_o$ about the approximate curve, using the storage device 914.

In the reliability level computation step S566, the reliability level computation unit 260 computes the reliability level of each of the approximate curves being tracked, based on the stored distance $s_o$, using the processing device 911.

In the discard determination step S567, the approximate curve computation unit 240 compares the reliability level of each of the approximate curves being tracked with the predetermined threshold value, using the processing device 911. The reliability level has been computed by the reliability level computation unit 260 in the reliability level computation step S566.

When there is the approximate curve having the reliability level lower than the threshold value, the approximate curve computation unit 240 proceeds to the approximate curve discard step S568, using the processing device 911.

When the reliability level of each of the approximate curves is higher than the threshold value, the approximate curve computation unit 240 proceeds to the approximate curve output step S569, using the processing device 911.

In the approximate curve discard step S568, the approximate curve computation unit 240 discards the approximate curve whose reliability level has been determined to be lower than the threshold value in the discard determination step S567, using the processing device 911.

In the approximate curve output step S569, the approximate curve selection unit 270 selects one of the approximate curves that will be adopted, based on the reliability level computed by the reliability level computation unit 260 in the reliability level computation step S566, using the processing device 911. The approximate curve selection unit 270 outputs the adopted approximate curve, using the processing device 911.

Sixth Embodiment

A sixth embodiment will be described using FIGS. 34 to 49.

Same reference numerals are assigned to components common to those in the first to fifth embodiments, thereby omitting repeated description of the components.

Figure 34:
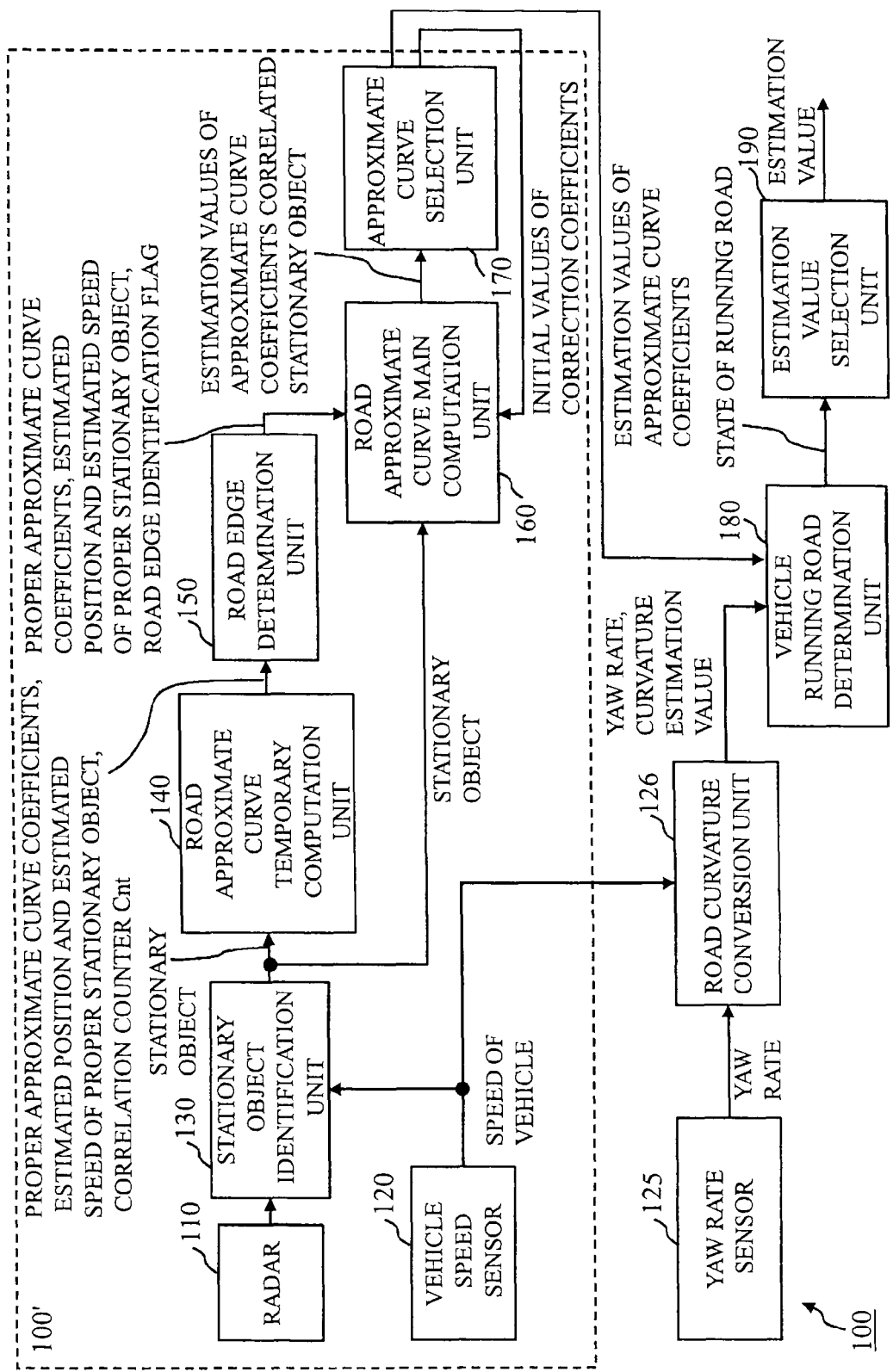
FIG. 34 is a block diagram showing an overall configuration of a road configuration recognition apparatus 100 in a sixth embodiment.

FIG. 34 is a block diagram showing an overall configuration of a road configuration recognition apparatus 100 in this embodiment.

In addition to the functional blocks described in the first embodiment, the road configuration recognition apparatus (road configuration estimation apparatus) 100 further includes a yaw rate sensor 125, a road curvature conversion unit 126, a vehicle running road determination unit 180, and an estimation value selection unit (estimation value selection/integration unit) 190. A portion 100' surrounded by a broken line corresponds to the road configuration recognition apparatus 100 in the first embodiment. The road configuration recognition apparatus 100 may be configured by replacing the portion 100' with the road configuration recognition apparatus 100 described in one of the second to fifth embodiments.

The road configuration recognition apparatus 100 makes determination about a preceding vehicle by switching road curvature estimation values (or approximate curve coefficients), according to the running road. One of the road curvature estimation values is based on a yaw rate, and the other is based on a stationary object.

The road configuration recognition apparatus 100 classifies running roads into four types including "straight roads," "roads before curves (before curved roads)," "curve roads (curved roads)," and "curve exits (curved road exits)." Then, the road configuration recognition apparatus 100 switches the estimation values according to the type of the running road.

Figure 35:
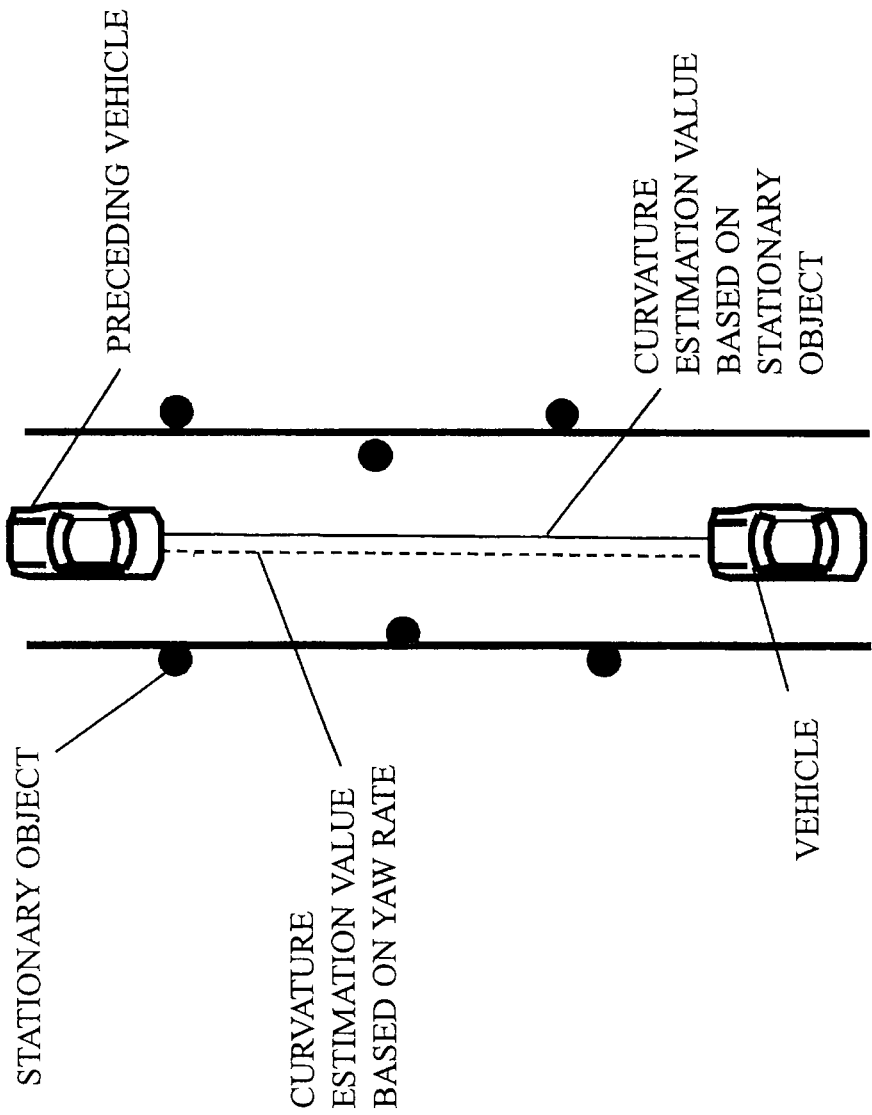
FIG. 35 is a diagram showing an example of a straight road.

FIG. 35 is a diagram showing an example of a straight road.

On the straight road, the yaw rate is affected by a steering wobble. For this reason, the curvature estimation value based on a stationary object is more accurate than the curvature estimation value based on the yaw rate.

Figure 36:
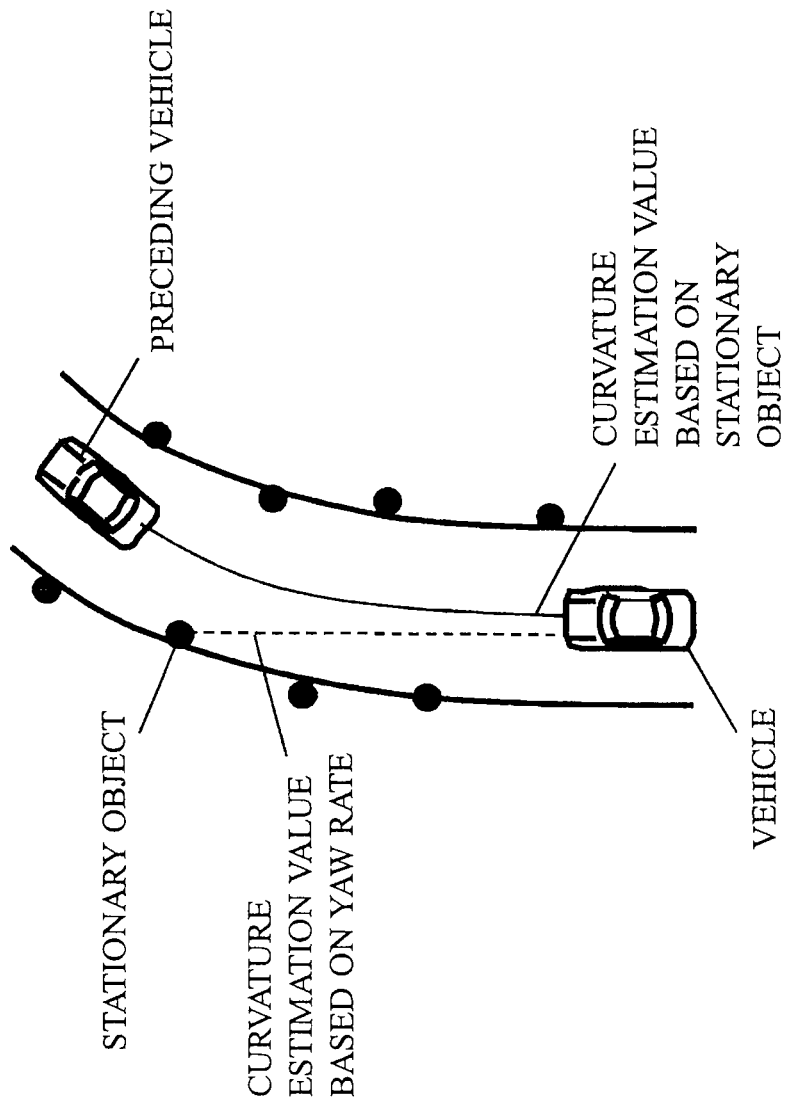
FIG. 36 is a diagram showing a road before a curve

FIG. 36 is a diagram showing an example of a road before a curve.

A road before a curve, as shown in FIG. 36, means a situation where a vehicle is on a straight road and a preceding vehicle is on a curve road. Since the radar 110 may observe a stationary object in a far distance, the configuration of the curve may be recognized. For that reason, the curvature estimation value based on the stationary object is more accurate than that based on the yaw rate.

Figure 37:
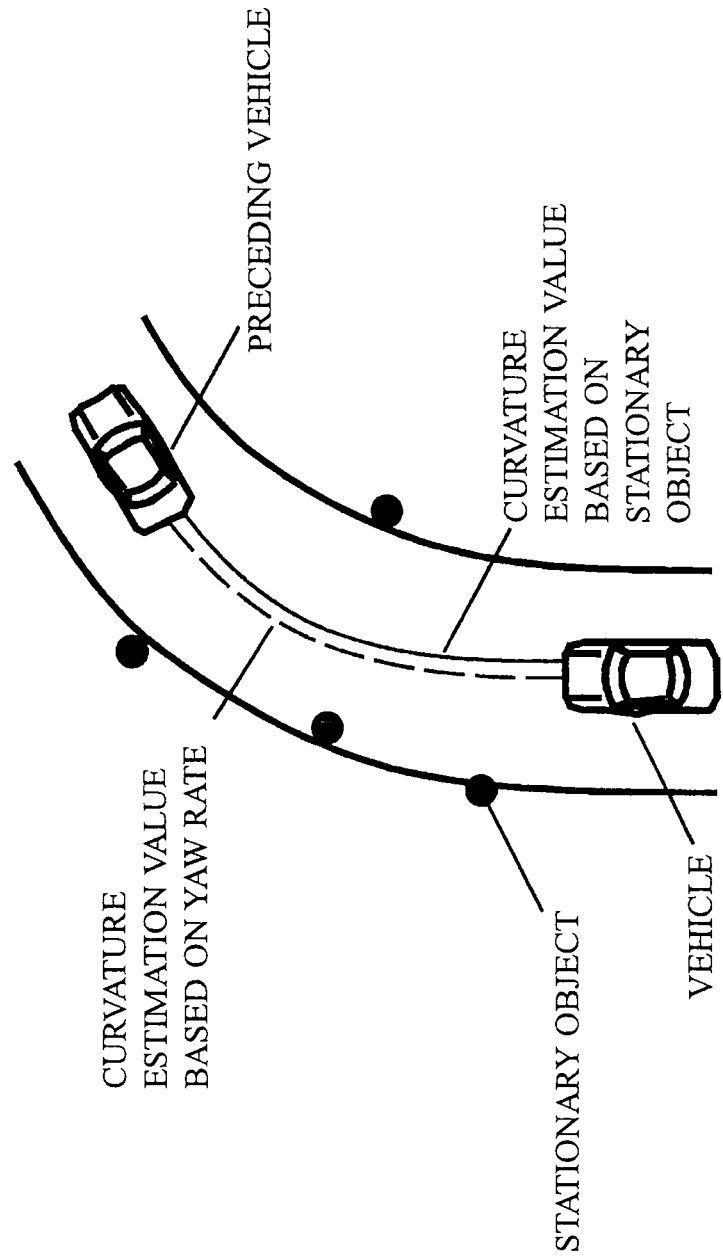
FIG. 37 is a diagram showing an example of a curve road.

FIG. 37 is a diagram showing an example of a curve road.

On the curve road, a vehicle is running on the curve, so that the steering angle of the vehicle is constant. The curvature estimation value based on a stationary object is affected by an observation error of the stationary object. Accordingly, the curvature estimation value based on the yaw rate is more stable and more accurate than that based on a stationary object.

Figure 38:
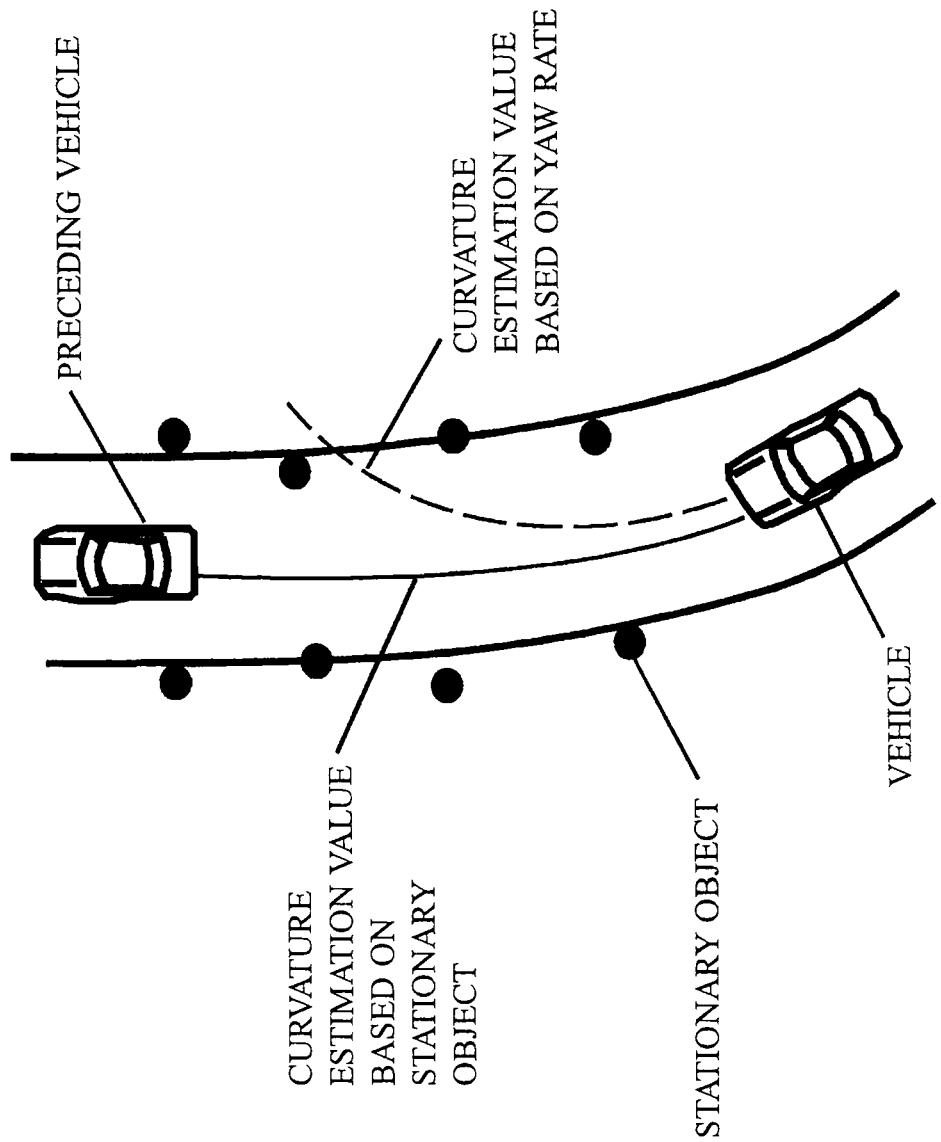
FIG. 38 is a diagram showing an example of a curve exit.

FIG. 38 is a diagram showing an example of a curve exit.

A curve exit, as shown in FIG. 38, means a situation where a vehicle is on a curve road and a preceding vehicle is on a straight road. In this case, the curvature estimation value based on a stationary object is more accurate than the curvature estimation value based on the yaw rate, as in the case of the road before a curve.

In consideration of the above-mentioned possible situations on a running road, the road configuration recognition apparatus 100 determines the type of the running road and switches the estimation value according to the type of the running road.

Next, operation of the road configuration recognition apparatus 100 will be described.

The road curvature conversion unit 126 computes a curvature estimation value using the following equation, for example:

[Expression 25]

$$\chi_{yaw} = \frac{\omega}{V} \qquad (15)$$

where $\chi_{yaw}$ denotes a curvature, V denotes the speed of a vehicle, and $\omega$ denotes a yaw rate. The road curvature conversion unit 126 uses an observation value observed by the yaw rate sensor 125, as the yaw rate $\omega$. Alternatively, the road curvature conversion unit 126 uses, as the yaw rate $\omega$, an estimation value of the yaw rate resulting from smoothing of the observation value observed by the yaw rate sensor 125, using a known smoothing filter (such as a Kalman filter or an $\alpha$ filter). The road curvature conversion unit 126 computes the curvature $\chi_{yaw}$ by computing a quotient resulting from division of the yaw rate $\omega$ by the speed of the vehicle observed by the vehicle speed sensor 120.

The vehicle running road determination unit 180 determines the type of a road on which the vehicle is running, using the yaw rate $\omega$ and the estimation value of approximate curve coefficients obtained from the approximate curve selection unit 170 in the road configuration recognition apparatus 100.

The vehicle running road determination unit 180 determines the state of the running road more accurately, using a state transition model, for example.

Figure 39:
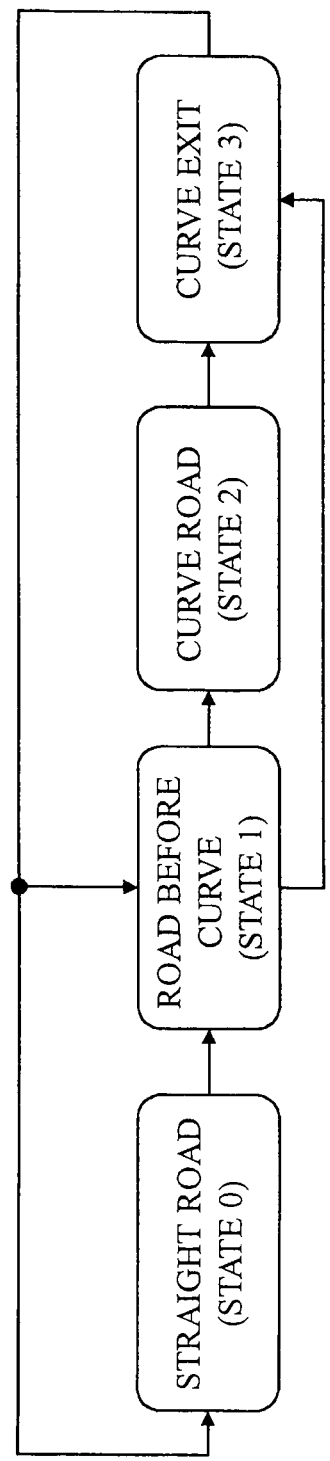
FIG. 39 is a state transition diagram showing an example of a state transition model for a vehicle running road in the sixth embodiment.

FIG. 39 is a state transition diagram showing an example of the state transition model for the running road of the vehicle in this embodiment.

An initial state (an initial value) is a straight road (state 0). When a predetermined condition (hereinafter referred to as a "road-before-curve judgment condition") is satisfied on the straight road (state 0), a state transition is made from the straight road (state 0) to the road before a curve (state 1).

When a predetermined condition (hereinafter referred to as a curve-road judgment condition") is satisfied on the road before the curve (state 1), a state transition is made to the curve road (state 2). When another predetermined condition (hereinafter referred to as a "short-curve judgment condition") is satisfied on the curve road, a state transition is made to a curve exit (state 3).

When a predetermined condition (hereinafter referred to as a "curve-exit judgment condition") is satisfied on the curve road (state 2), a state transition is made to the curve exit (state 3).

When a predetermined condition (hereinafter referred to as a curve-end judgment condition") is satisfied on the curve exit (state 3), a state transition is made to the straight road (state 0). When another predetermined condition (hereinafter referred to as a "consecutive-curve judgment condition") is satisfied, a state transition is made to the road before a curve (state 1).

Figure 40:
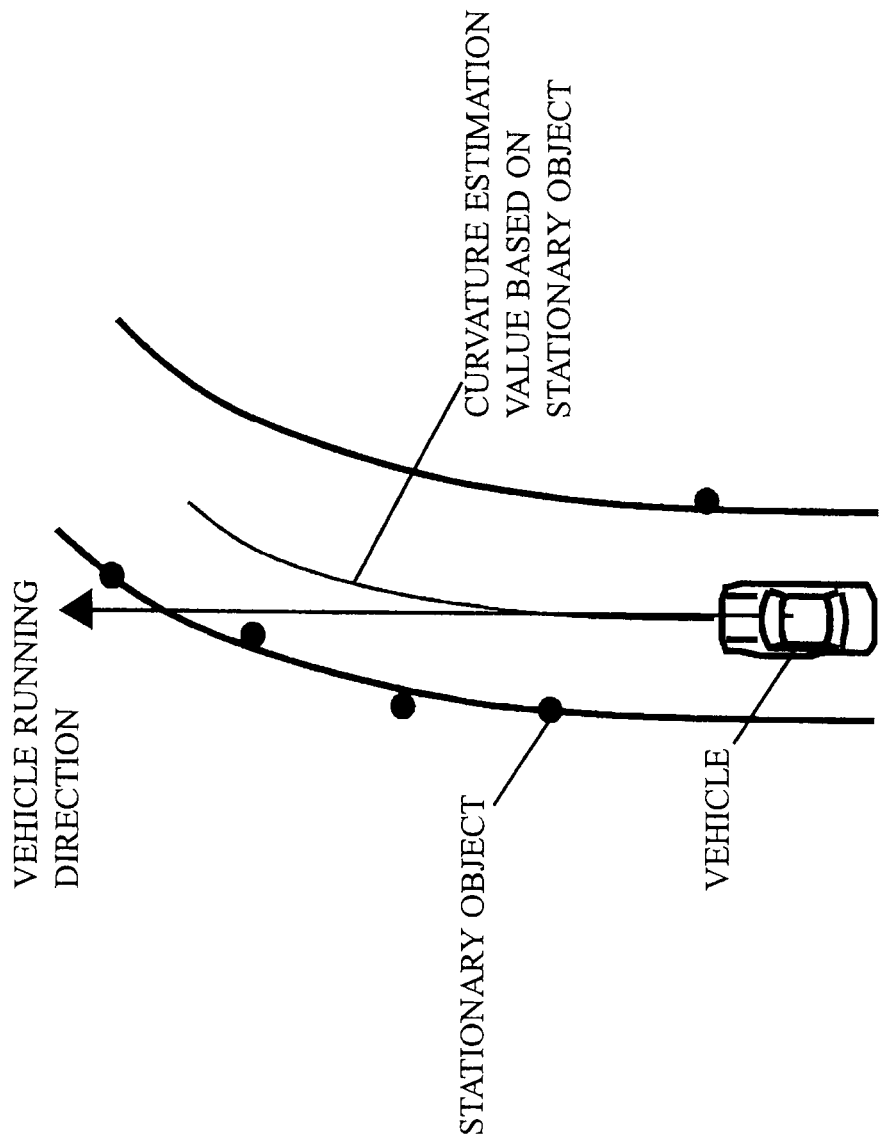
FIG. 40 is a diagram for explaining an example of a road-before-curve judgment condition in the sixth embodiment.

FIG. 40 is a diagram for explaining an example of the road-before-curve judgment condition in this embodiment.

When a quadratic curve represented by Equation (1) described in the first embodiment is used as the approximate curve of a road configuration computed from a stationary object, the vehicle running road determination unit 180 uses it as the road-before-curve judgment condition, for example, that the coefficient (inclination) a of the approximate curve computed from the stationary object is equal to or larger than a certain threshold.

Figure 41:
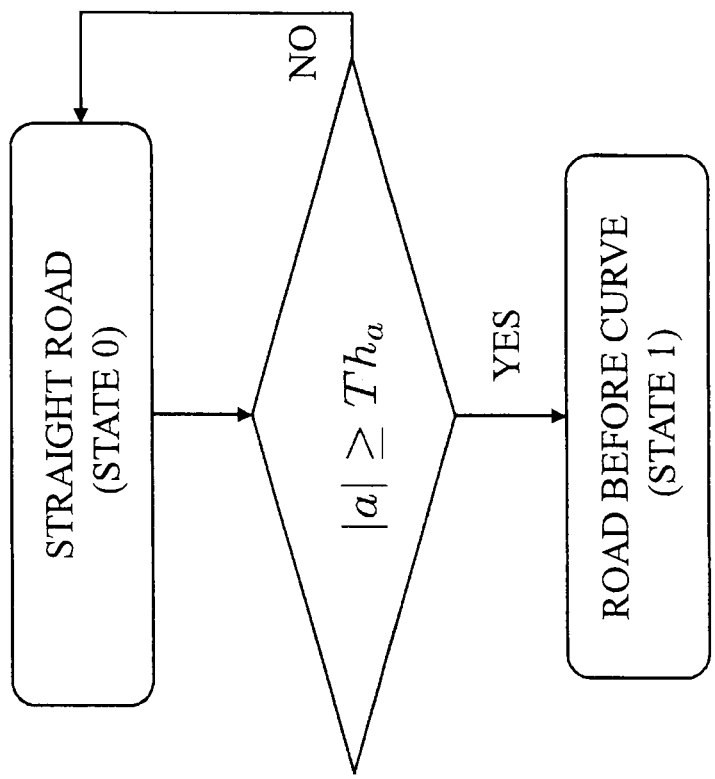
FIG. 41 is a flow diagram for determination of a state transition from a straight road (state 0) to the road before a curve (state 1) in the sixth embodiment.

FIG. 41 is a flow diagram for determination of the state transition from the straight road (state 0) to the road before a curve (state 1) in this embodiment.

The vehicle running road determination unit 180 determines whether or not the road-before-curve judgment condition is satisfied, based on the approximate curve of the road computed by the road approximate curve main computation unit 160. The vehicle running road determination unit 180 compares the absolute value of the coefficient a of the approximate curve of the road computed by the road approximate curve main computation unit 160 with a threshold $Th_a$. When the absolute value of the coefficient a is larger than the threshold $Th_a$, the vehicle running road determination unit 180 transitions the state of the vehicle running road to the road before the curve (state 1).

Alternatively, the vehicle running road determination unit 180 may be configured to use it as the road-before-curve judgment condition, that a position $X_{ref}$ is larger than a predetermined threshold. The position $X_{ref}$ is a position in a vehicle axle direction of a point on the road approximate curve. The point is a reference distance $Y_{ref}$ from the vehicle in a vehicle running direction. When the position $X_{ref}$ is larger than the predetermined threshold, the vehicle running road determination unit 180 determines that the road-before-curve judgment condition is satisfied. In this case, the vehicle running direction is set to a Y axis. Then, the vehicle running road determination unit 180 computes the value of the position $X_{ref}$ in the vehicle axle direction separated by the reference distance $Y_{ref}$ using the inclination $\underline{a}$ computed by the road approximate curve main computation unit 160 and Equation (1). The vehicle running road determination unit 180 then compares the computed value of the position $X_{ref}$ with the threshold. The vehicle running road determination unit 180 uses zero instead of the value computed by the road approximate curve main computation unit 160, as the X-intercept b, to compute the position $X_{ref}$ in the vehicle axle direction. The vehicle running road determination unit 180 computes the position $X_{ref}$ in the vehicle axle direction, using the following equation:

$$X_{ref} = \alpha Y_{ref}^2 \qquad \text{[Expression 26]}$$

Figure 42:
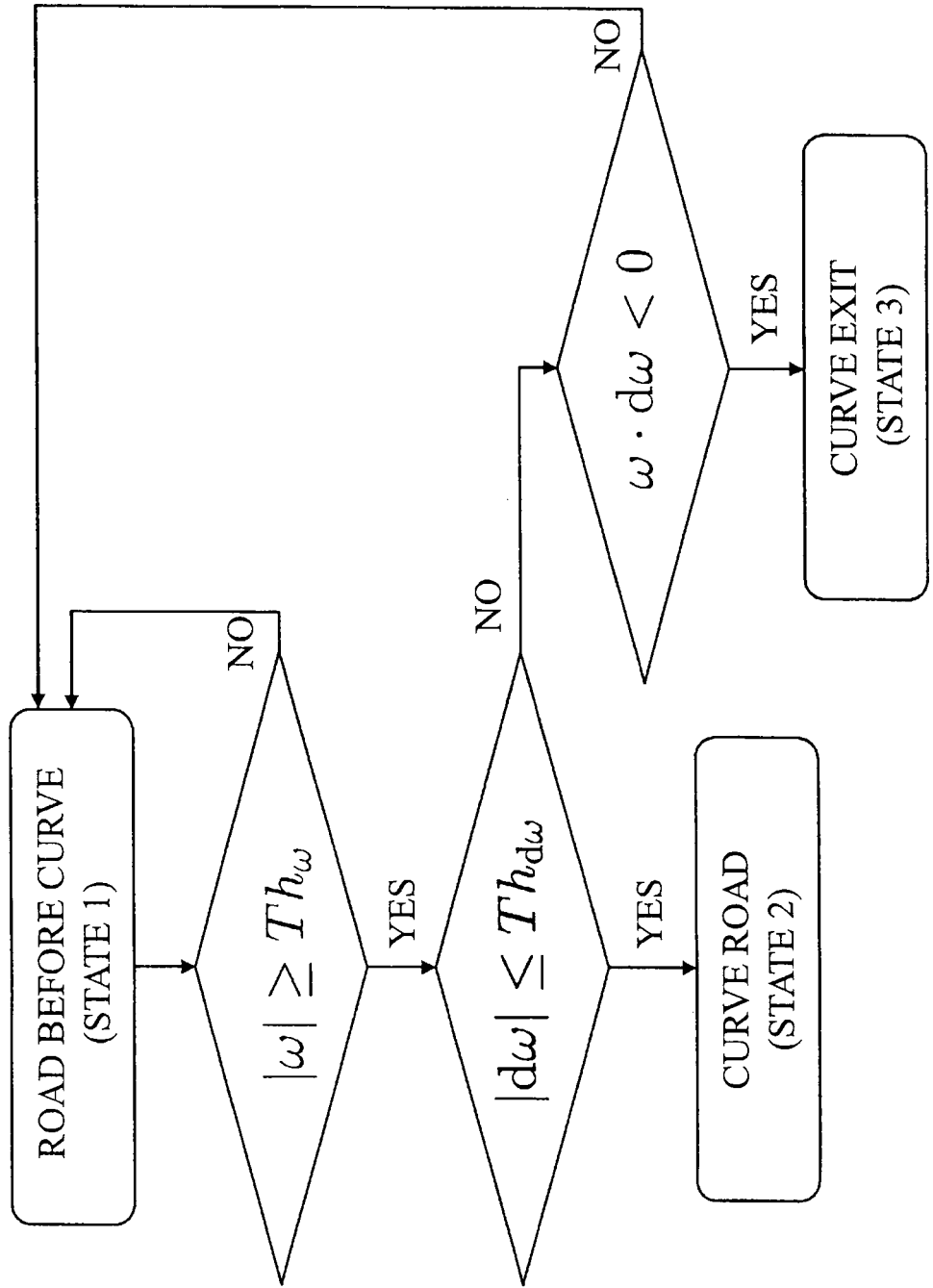
FIG. 42 is a flow diagram for determination of a state transition from the road before the curve (state 1) to each of the curve road (state 2) and a curve exit (state 3) in the sixth embodiment.

FIG. 42 is a flow diagram for determination of the state transition from the road before a curve (state 1) to the curve road (state 2) and to the curve exit (state 3) in this embodiment.

The vehicle running road determination unit 180 compares the absolute value of the yaw rate ω with a predetermined threshold $Th_\omega$.

When the absolute value of the yaw rate ω is equal to or larger than the threshold $Th_\omega$, the vehicle running road determination unit 180 computes a yaw rate change rate $d_\omega$, based on the most recent yaw rate and a yaw rate in the past before N-time sampling, for example. The vehicle running road determination unit 180 computes the yaw rate change rate $d_\omega$, using the following equation:

[Expression 27]

$$d\omega = \omega_t - \omega_{t-N\cdot\Delta T} \qquad (16)$$

where $\omega_t$ denotes a yaw rate at a time t, and $\omega_{t-N\cdot\Delta T}$ denotes a yaw rate at a time (t−N·ΔT). AT denotes a sampling interval.

The vehicle running road determination unit 180 compares the absolute value of the computed yaw rate change rate $d_\omega$, with a predetermined threshold $Th_{d\omega}$.

When the absolute value of the yaw rate change rate $d_\omega$ is equal to or less than the predetermined threshold $Th_{d\omega}$, the vehicle running road determination unit 180 transitions the state of the vehicle running road to the curve road (state 2).

When the absolute value of the yaw rate change rate $d_\omega$ is larger than the predetermined threshold $Th_{d\omega}$, the vehicle running road determination unit 180 compares the sign of the yaw rate ω with the sign of the yaw rate change rate $d_\omega$.

When the sign of the yaw rate ω and the sign of the yaw rate change rate $d_\omega$ are different, the vehicle running road determination unit 180 transitions the state of the vehicle running road to the curve exit (state 3).

Figure 43:
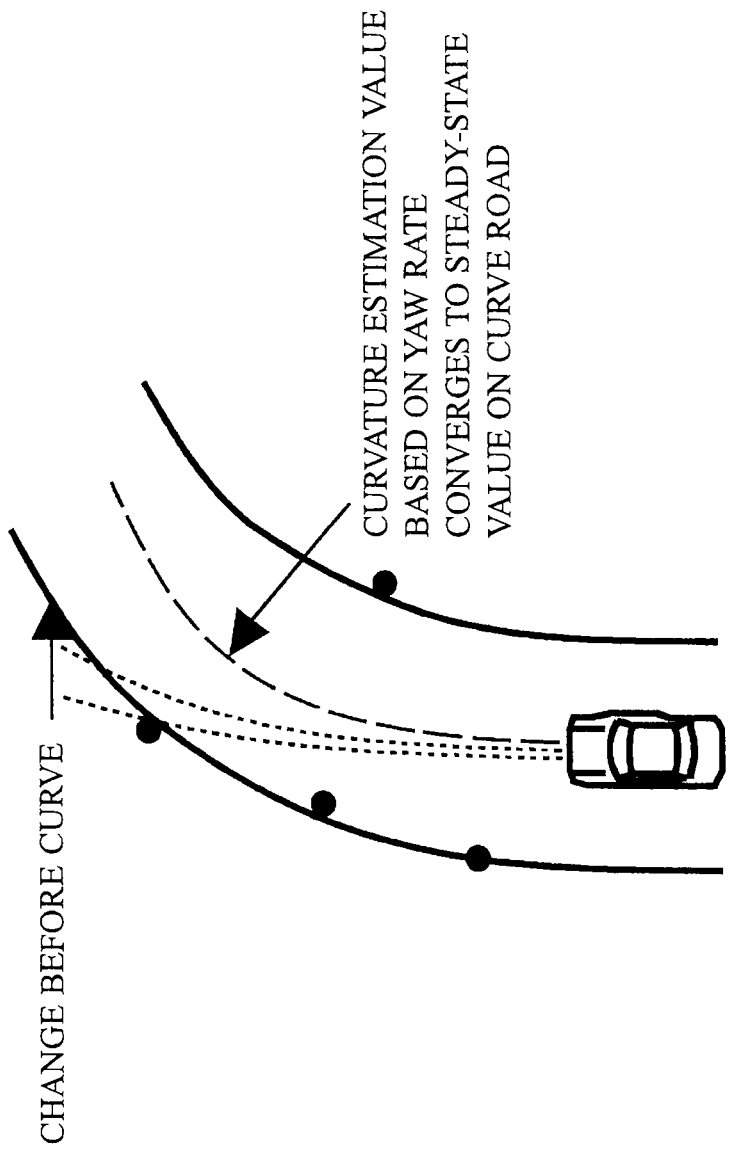
FIG. 43 is a diagram explaining a curve-road judgment condition based on a yaw rate.

FIG. 43 is a diagram explaining the curve-road judgment condition based on the yaw rate.

On a curve road, as shown in FIG. 43, the yaw rate converges to a steady-state value. The vehicle running road determination unit 180 uses it as the curve-road judgment condition, for example, that the absolute value of the yaw rate ω is equal to or larger than the threshold $Th_\omega$ and the absolute value of the yaw rate change rate $d_\omega$ is equal to or smaller than the threshold $Th_{d\omega}$ on the road before the curve (state 1). When the curve-road judgment condition is satisfied, the vehicle running road determination unit 180 transitions the state of the vehicle running road to the curve road (state 2).

Figure 44:
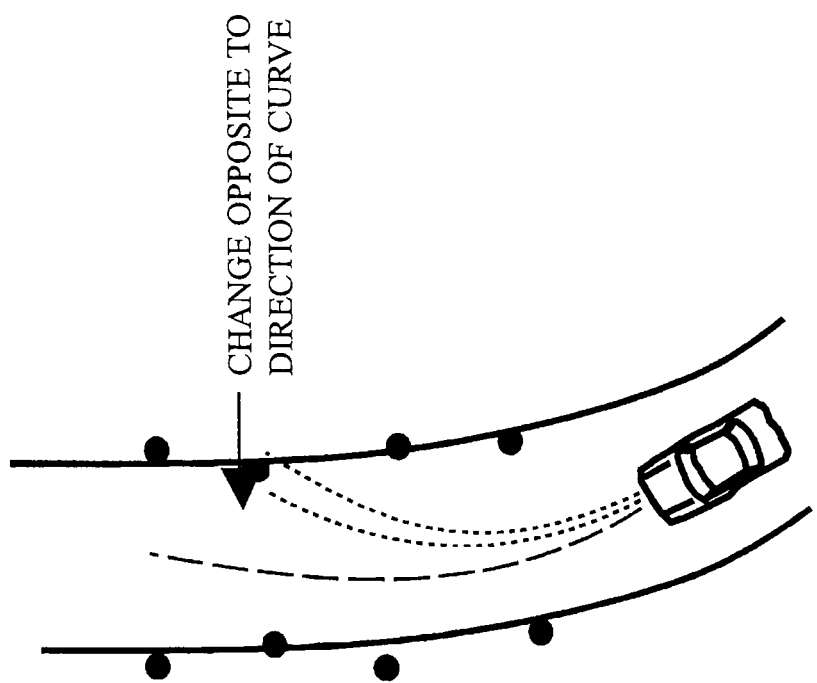
FIG. 44 is a diagram explaining a short-curve judgment condition based on the yaw rate.

FIG. 44 is a diagram explaining the short-curve judgment condition based on the yaw rate.

When the absolute value of the yaw rate ω is equal to or larger than the threshold $Th_\omega$ and the absolute value of the yaw rate change rate $d_\omega$ is equal to or larger than the threshold $Th_{d\omega}$, a curve road may be short, and a vehicle may have entered a curve exit, as shown in FIG. 44. The vehicle running road determination unit 180 uses it as the short-curve judgment condition, for example, that a changing direction of the yaw rate is opposite to a bending direction of the curve on the road before the curve (state 1). When the short-curve judgment condition is satisfied, the vehicle running road determination unit 180 transitions the state of the vehicle running road to the curve exit (state 3).

Figure 45:
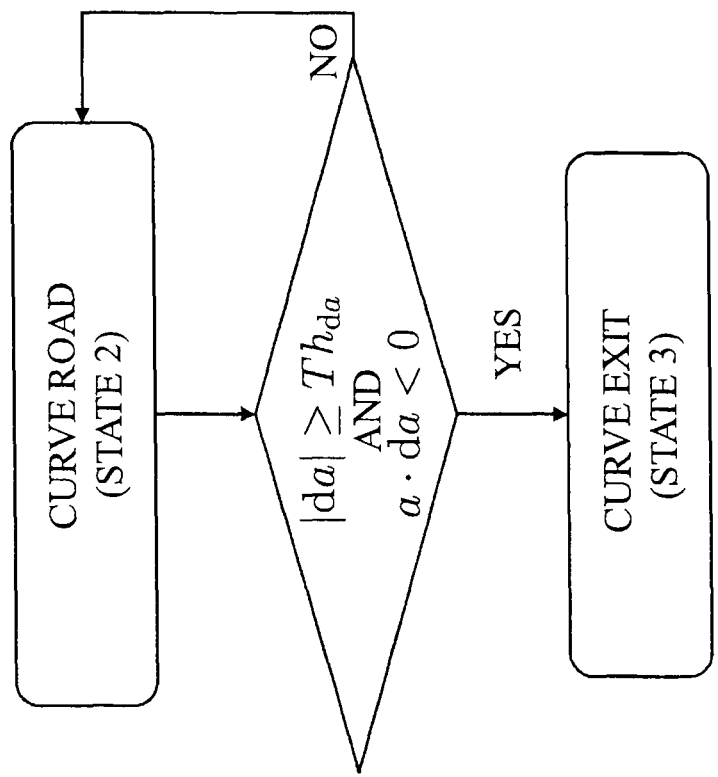
FIG. 45 is a flow diagram for determination of a state transition from the curve road (state 2) to the curve exit (state 3) in the sixth embodiment.

FIG. 45 is a flow diagram for determination of the state transition from the curve road (state 2) to the curve exit (state 3) in this embodiment.

The vehicle running road determination unit 180 computes a change rate da of the approximate curve coefficient (inclination) a based on an estimation value $a_t$ of the approximate curve coefficient (inclination) a at a most recent time and an estimation value $a_{t-N\cdot\Delta T}$ of the approximate curve coefficient (inclination) a in the past before N-time sampling, for example, by using the following expression.

[Expression 28]

$$da = a_t - a_{t-N\cdot\Delta T} \quad (17)$$

where ΔT denotes a sampling interval.

The vehicle running road determination unit 180 compares the absolute value of the computed change rate da with a predetermined threshold $Th_{da}$. When the absolute value of the change rate da is equal to or larger than the threshold $Th_{da}$, the vehicle running road determination unit 180 compares the sign of the approximate curve coefficient a with the sign of the change rate da. When the sign of the approximate curve coefficient a and the sign of the change rate da are different, the vehicle running road determination unit 180 transitions the state of the vehicle running road to the curve exit (state 3).

Figure 46:
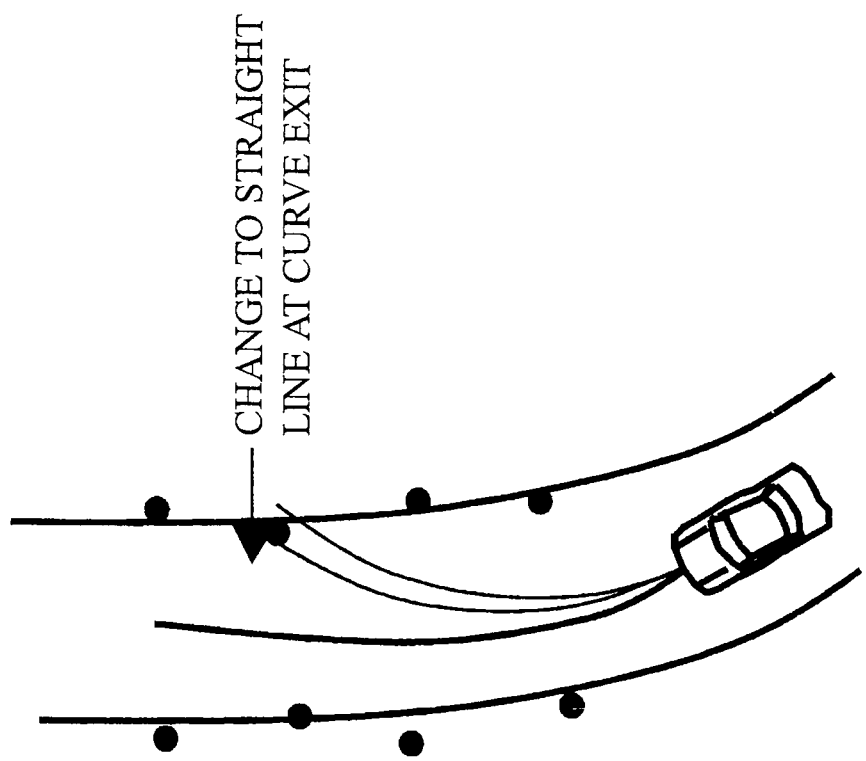
FIG. 46 is a diagram explaining a curve-exit judgment condition based on a road approximate curve.

FIG. 46 is a diagram explaining the curve-exit judgment condition based on the road approximate curve.

As shown in FIG. 46, the approximate curve changes to a straight line at a curve exit. The vehicle running road determination unit 180 uses it as the curve-exit judgment condition, for example, that the absolute value of the change rate da of the approximate curve coefficient (inclination) a is equal to or larger than the threshold $Th_{da}$ and the sign of the approximate curve coefficient (inclination) a is opposite to the sign of the change rate da on the curve road (state 2). When the curve-exit judgment condition is satisfied, the vehicle running road determination unit 180 transitions the state of the vehicle running road to the curve exit (state 3).

Figure 47:
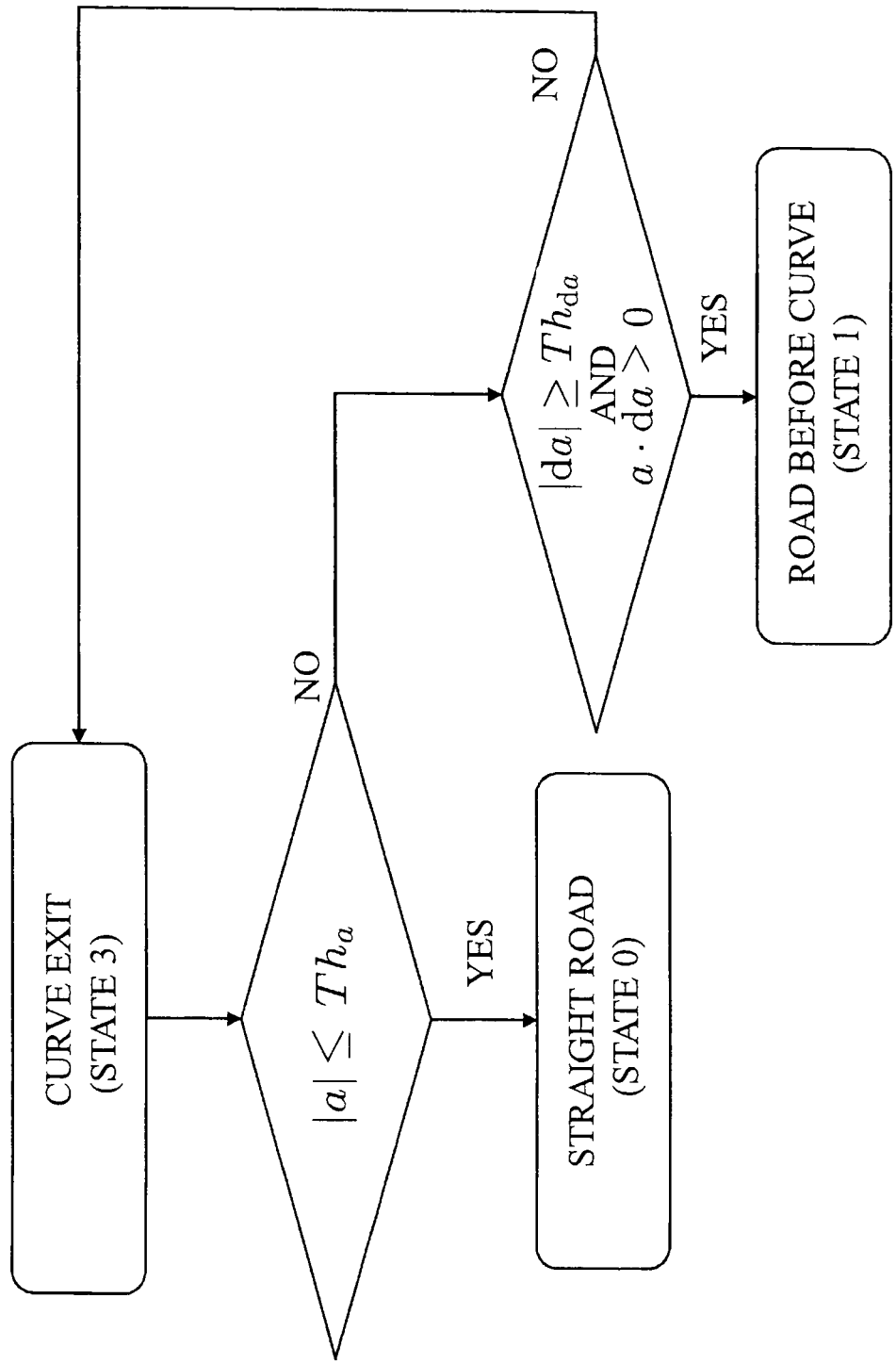
FIG. 47 is a flow diagram for determination of a state transition from the curve exit (state 3) to each of the straight road (state 0) and the road before a curve (state 1) in the sixth embodiment.

FIG. 47 is a flow diagram for determination of the state transition from the curve exit (state 3) to the straight road (state 0) and to the road before a curve (state 1) in this embodiment.

The vehicle running road determination unit 180 compares the absolute value of the approximate curve coefficient a computed by the road approximate curve main computation unit 160 with the threshold $Th_a$, for example.

When the absolute value of the approximate curve coefficient a is equal to or less than the threshold $Th_a$, the vehicle running road determination unit 180 transitions the state of the vehicle running road to the straight road (state 0).

When the absolute value of the approximate curve coefficient a exceeds the threshold $Th_a$, the vehicle running road determination unit 180 computes the change rate da of the coefficient a. The vehicle running road determination unit 180 compares the absolute value of the computed change rate da with the threshold $Th_{da}$.

When the absolute value of the change rate da is equal to or larger than the threshold $Th_{da}$, the vehicle running road determination unit 180 compares the sign of the coefficient a with the sign of the change rate da. When the sign of the coefficient a is the same as the sign of the change rate da, the vehicle running road determination unit 180 transitions the state of the vehicle running road to the road before a curve (state 1).

Figure 48:
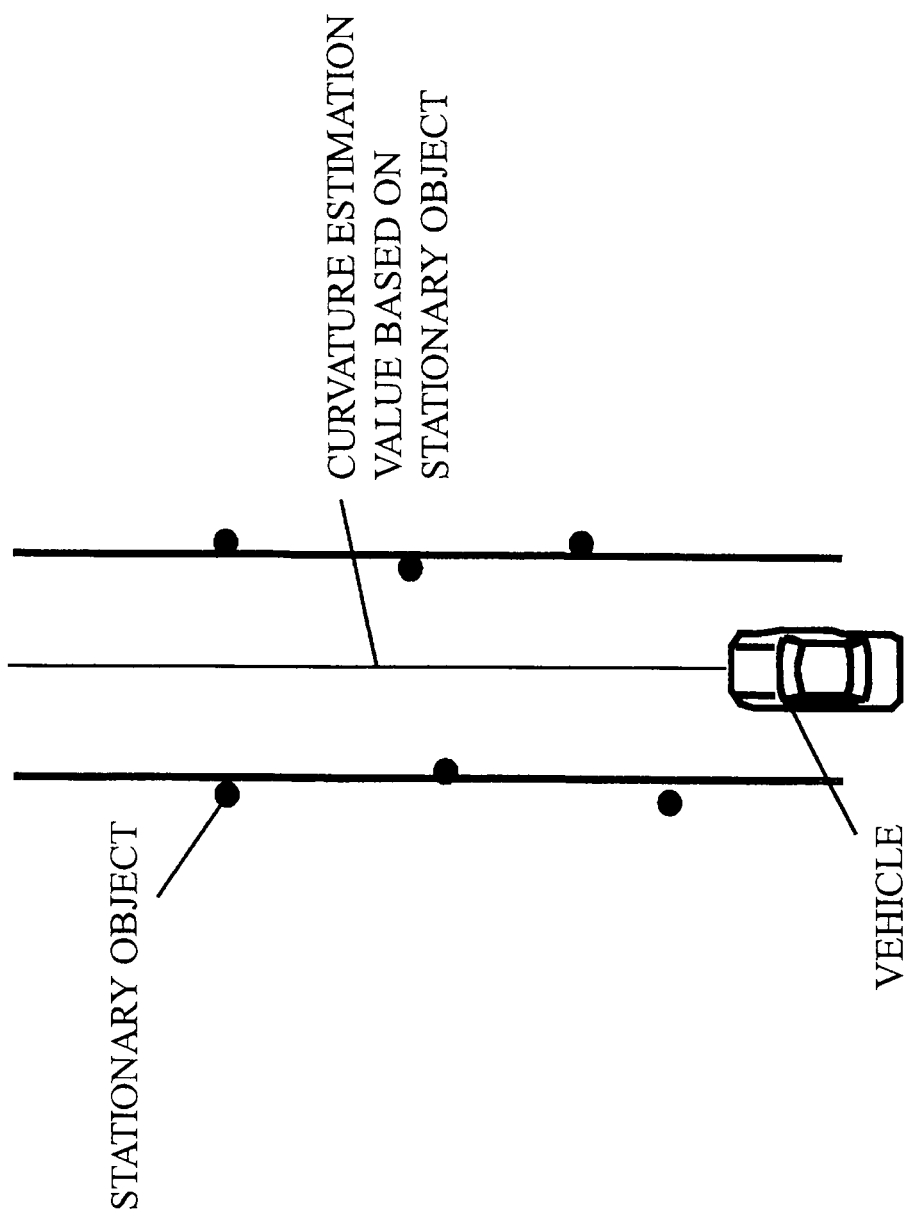
FIG. 48 is a diagram explaining a curve-end judgment condition based on the road approximate curve.

FIG. 48 is a diagram explaining the curve-end judgment condition based on the road approximate curve.

As shown in FIG. 48, the absolute value of the approximate curve coefficient (inclination) a is equal to or less than the threshold $Th_a$ on a straight road. The vehicle running road determination unit 180 uses it as the curve-end judgment condition, for example, that the absolute value of the approximate curve coefficient a is equal to or less than the threshold $Th_a$ at the curve exit (state 3). When the curve-end judgment condition is satisfied, the vehicle running road determination unit 180 transitions the state of the vehicle running road to the straight road (state 0).

Figure 49:
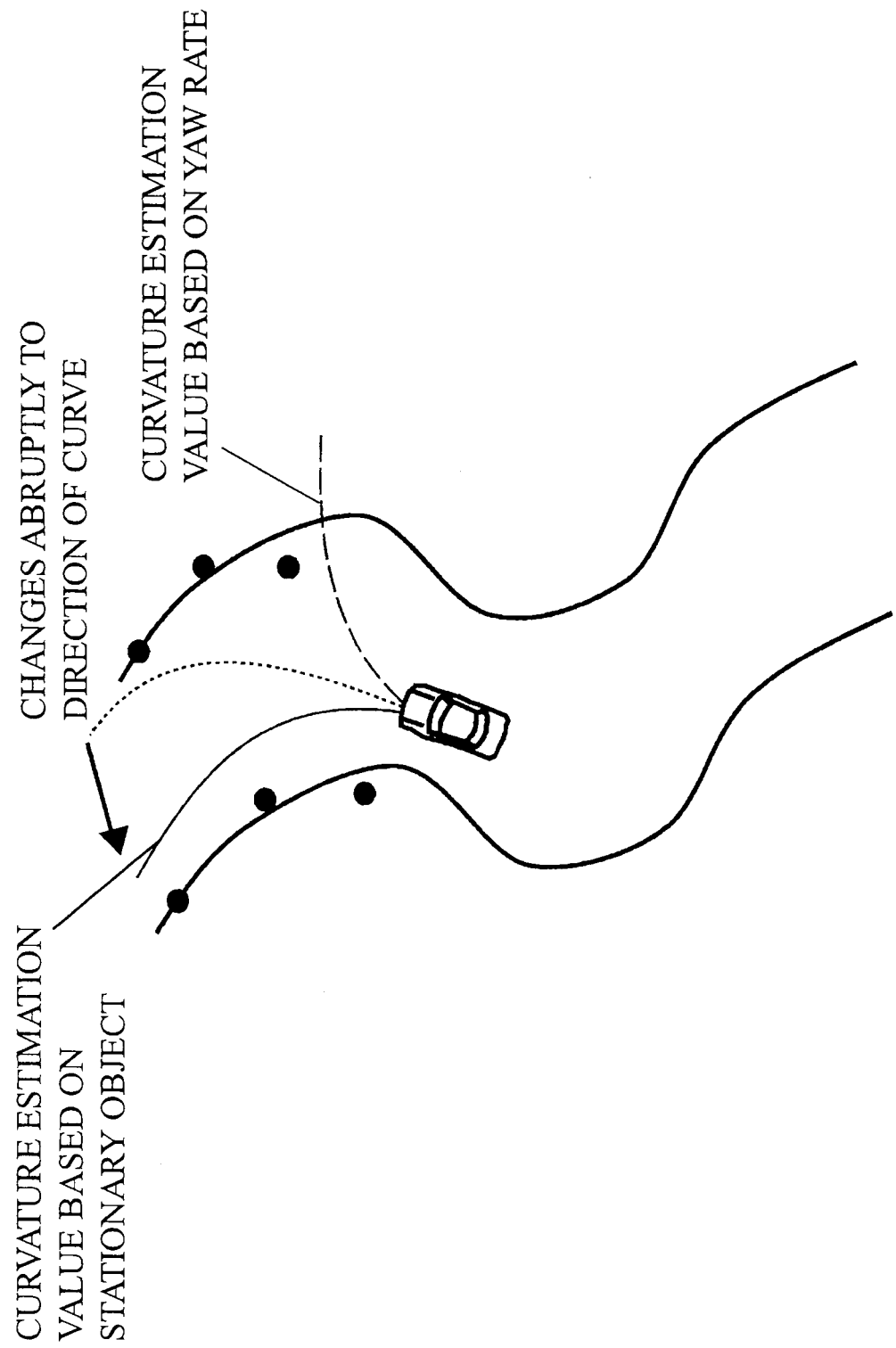
FIG. 49 is a diagram explaining a curve-continuity judgment condition based on the road approximate curve.

FIG. 49 is a diagram explaining the consecutive-curve judgment condition based on the road approximate curve.

When curves are successive, as shown in FIG. 49, there may be no time for the absolute value of the approximate curve coefficient (inclination) a to be equal to or less than the threshold $Th_a$, because of lack of a straight road. The vehicle running road determination unit 180 uses it as the consecutive-curve judgment condition, for example, that the change rate da of the approximate curve coefficient (inclination) a is equal to or larger than the threshold and the sign of the approximate curve coefficient (inclination) a is the same as the sign of the change rate da. When the consecutive-curve judgment condition is satisfied, the vehicle running road determination unit 180 transitions the state of the vehicle running road to the road before a curve (state 1).

The vehicle running road determination unit 180 may be configured to transition the state of the vehicle running road when the condition has been satisfied M times or more of N determinations, instead of transitioning the state of the vehicle running road when the condition has been satisfied in one-time determination. With this arrangement, an error in the state transition may be reduced.

The estimation value selection unit 190 (estimation value selection/integration unit) outputs a curvature estimation value $\chi_{fix}$ based on a stationary object when the state of the vehicle running road is the straight road (state 0), the road before a curve (state 1), or the curve exit (state 3). When the state of the vehicle running road is the curve road (state 2), the estimation value selection unit 190 outputs a curvature estimation value $\chi_{yaw}$ based on the yaw rate.

Alternatively, the estimation value selection unit 190 may be configured to change weighting according to the state of the vehicle running road, and to integrate the curvature estimation value $\chi_{fix}$ based on the stationary object and the curvature estimation value $\chi_{yaw}$ based on the yaw rate. The following is an example of it. The estimation value selection unit 190 computes the integrated curvature estimation value x, using the following equations:

[Expression 29]

$$\chi = \lambda_{yaw}\chi_{yaw} + \lambda_{fix}\chi_{fix} \quad (18)$$

$$\lambda_{yaw} + \lambda_{fix} = 1 \quad (19)$$

where $\lambda_{yaw}$ and $\lambda_{fix}$ denote weights set by the estimation value selection unit 190 based on the state of the vehicle running road. $\chi_{fix}$ denotes the curvature of the vehicle running road computed from the road approximate curve selected by the approximate curve selection unit 170. The estimation value selection unit 190 computes the curvature estimation value $\chi_{fix}$ using the following approximate expression:

$$\chi_{fix} = \frac{2a}{(1+2ay')^{\frac{3}{2}}} \quad \text{[Expression 30]}$$

where y' denotes a value set in advance, as a Y coordinate position for determining the curvature on the road approximate curve.

When the state of the vehicle running road is "0" (which denotes the straight road), the estimation value selection unit 190 sets each of the weights $\lambda_{yaw}$ and $\lambda_{fix}$ to 0.5, thereby computing the curvature estimation value x. When the state of the vehicle running road is "1" (which denotes the road before a curve) or "3" (which denotes the curve exit), the estimation value selection unit 190 respectively sets the weights $\lambda_{yaw}$ and $\lambda_{fix}$ to 0.1 and 0.9, thereby computing the curvature estimation value $\chi$. When the state of the vehicle running road is "2" (which denotes the curve road), the estimation value selection unit 190 respectively sets the weights $\lambda_{yaw}$ and $\lambda_{fix}$ to 0.9 and 0.1, thereby computing the curvature estimation value x.

Alternatively, the estimation value selection unit 190 may be configured to output a road approximate curve instead of the curvature estimation value. The following is an example of it. When the state of the vehicle running road is the straight road (state 0), road before a curve (state 1), or curve exit (state 3), the estimation value selection unit 190 outputs the road approximate curve selected by the approximate curve selection unit 170. When the state of the vehicle running road is the curve road (state 2), the estimation value selection unit 190 computes a curve with a constant curvature, based on the curvature estimation value $\chi_{yaw}$ using the yaw rate, for output as the road approximate curve. To take an example, the estimation value selection unit 190 outputs one of curves expressed by the following equations:

$$x = \begin{cases} \frac{1}{\chi_{yaw}} - \sqrt{\left(\frac{1}{\chi_{yaw}}\right)^2 - y^2} & (\chi_{yaw} > 0) \\ \frac{1}{\chi_{yaw}} + \sqrt{\left(\frac{1}{\chi_{yaw}}\right)^2 - y^2} & (\chi_{yaw} < 0) \end{cases} \quad \text{[Expression 31]}$$

where $\chi_{yaw}$ denotes a curvature computed by the road curvature conversion unit 126, based on the yaw rate $\omega$ measured by the yaw rate sensor 125. b denotes the coefficient (x-intercept) b of the road approximate curve selected by the approximate curve selection unit 170.

The estimation value selection unit 190 may be configured to output a quadratic curve expressed by the following equation, which approximates the equations above by a Taylor expansion, for output as the road approximate curve:

$$x = \frac{\frac{1}{\chi_{yaw}^2}}{2\left(\frac{1}{\chi_{yaw}^2} - y'^2\right)^{\frac{3}{2}}} y^2 + b \quad \text{[Expression 32]}$$

where y' is a value set in advance as a Y coordinate position for determining the curvature on the road approximate curve.

It can be seen that the form of the expression for the road approximate curve output by the estimation value selection unit 190 is the same, irrespective of the state of the vehicle running road. Only coefficient values of the road approximate curve differ. Accordingly, with this arrangement, processing in a subsequent stage such as determination about a preceding vehicle is facilitated.

Alternatively, the estimation value selection unit 190 may be configured to compute a curve obtained by weighted integration of the road approximate curve selected by the approximate curve selection unit 170 and the road approximate curve based on the curvature estimation value $\chi_{yaw}$ using the yaw rate, for output as the road approximate curve. The following is an example of it. The estimation value selection unit 190 outputs a curve expressed by the following equation, as the road approximate curve:

$$x = \left( \lambda_{yaw} \frac{\frac{1}{\chi_{yaw}^2}}{2\left(\frac{1}{\chi_{yaw}^2} - y'^2\right)^{\frac{3}{2}}} + \lambda_{fix} a \right) y^2 + b \quad \text{[Expression 33]}$$

where $\lambda_{yaw}$ and $\lambda_{fix}$ denote weights set by the estimation value selection unit 190 based on the state of the vehicle running road. a and b denote coefficients of the road approximate curve selected by the approximate curve selection unit 170.

The road configuration estimation apparatus (road configuration recognition apparatus 100) includes the road curvature conversion unit (126), the vehicle running road determination unit (180), and the estimation value selection/integration unit (estimation value selection unit 190).

The road curvature conversion unit (126) converts a yaw rate to a road curvature.

The vehicle running road determination unit (180) makes determination about a vehicle running road, based on the yaw rate and the approximate curve coefficients.

The estimation value selection/integration unit (190) selects a curvature estimation value according to a result of the determination about the vehicle running road.

The estimation value selection/integration unit (190) performs weighted integration of curvature estimation values according to the result of the determination about the vehicle running road.

The vehicle running road determination unit (180) makes a state transition when each state transition judgment expression is satisfied M times among N times of determinations based on the state transition of the vehicle running road, and determines the state of the vehicle running road.

According to the road configuration estimation apparatus in this embodiment, by determining the type of the vehicle running road, selection of a suitable estimation value or weighted integration of suitable estimation values is performed according to the running road. More accurate determination about a preceding vehicle may be therefore made.

Seventh Embodiment

A seventh embodiment will be described using FIGS. 50 to 52.

Same reference numerals are assigned to components common to those in the first to sixth embodiments, thereby omitting repeated description of the components.

Figure 50:
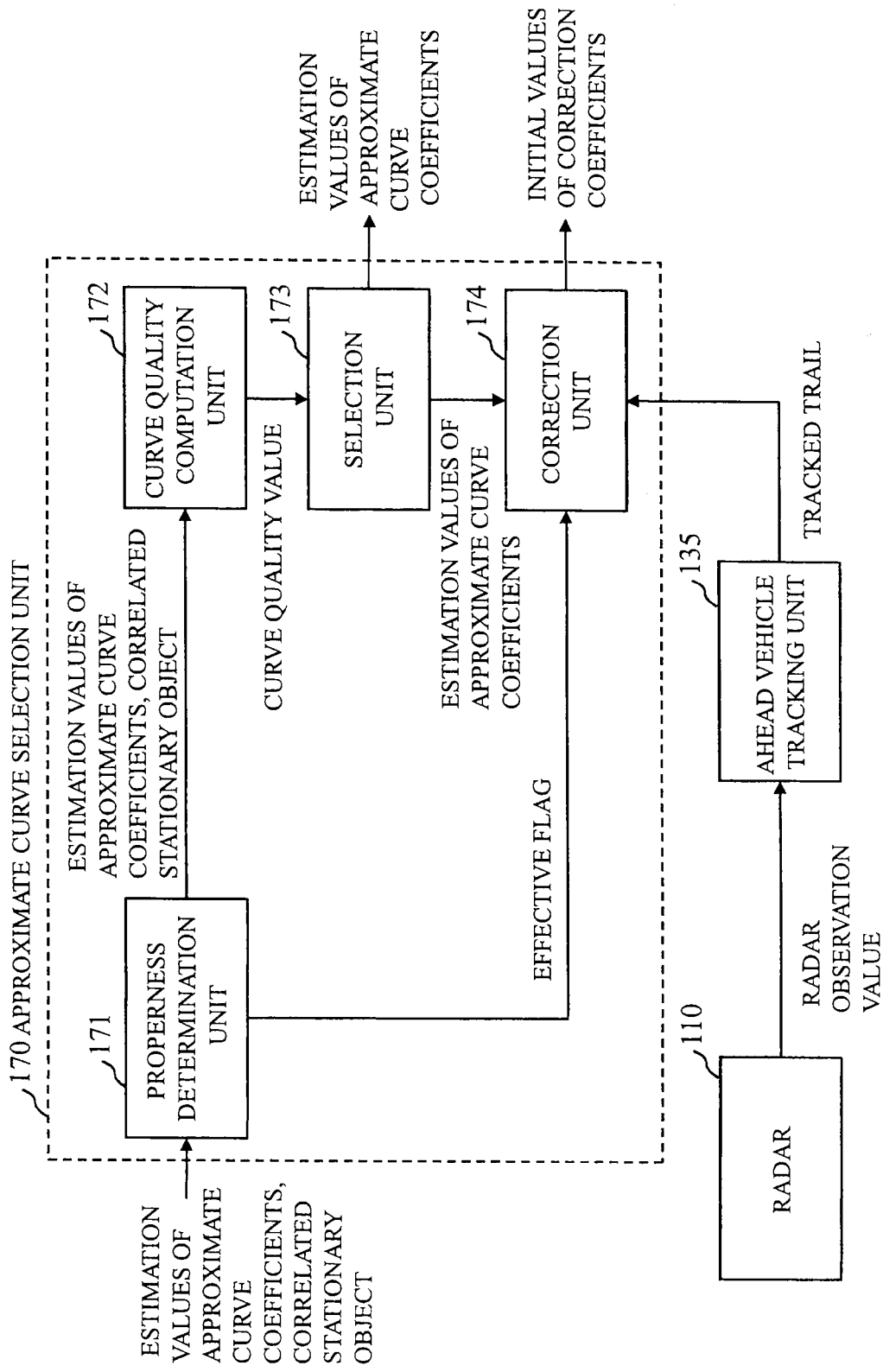
FIG. 50 is a block diagram showing an example of a portion of a configuration of a road configuration recognition apparatus 100 in a seventh embodiment.

FIG. 50 is a block diagram showing an example of a portion of a configuration of a road configuration recognition apparatus 100 in this embodiment.

In addition to the functional blocks described in the first embodiment, the road configuration recognition apparatus (road configuration estimation apparatus) 100 includes an ahead vehicle tracking unit 135. The road configuration recognition apparatus 100 may be configured by adding the ahead vehicle tracking unit 135 to the road configuration recognition apparatus 100 described in one of the second to sixth embodiments, instead of the road configuration recognition apparatus 100 described in the first embodiment.

Figure 51:
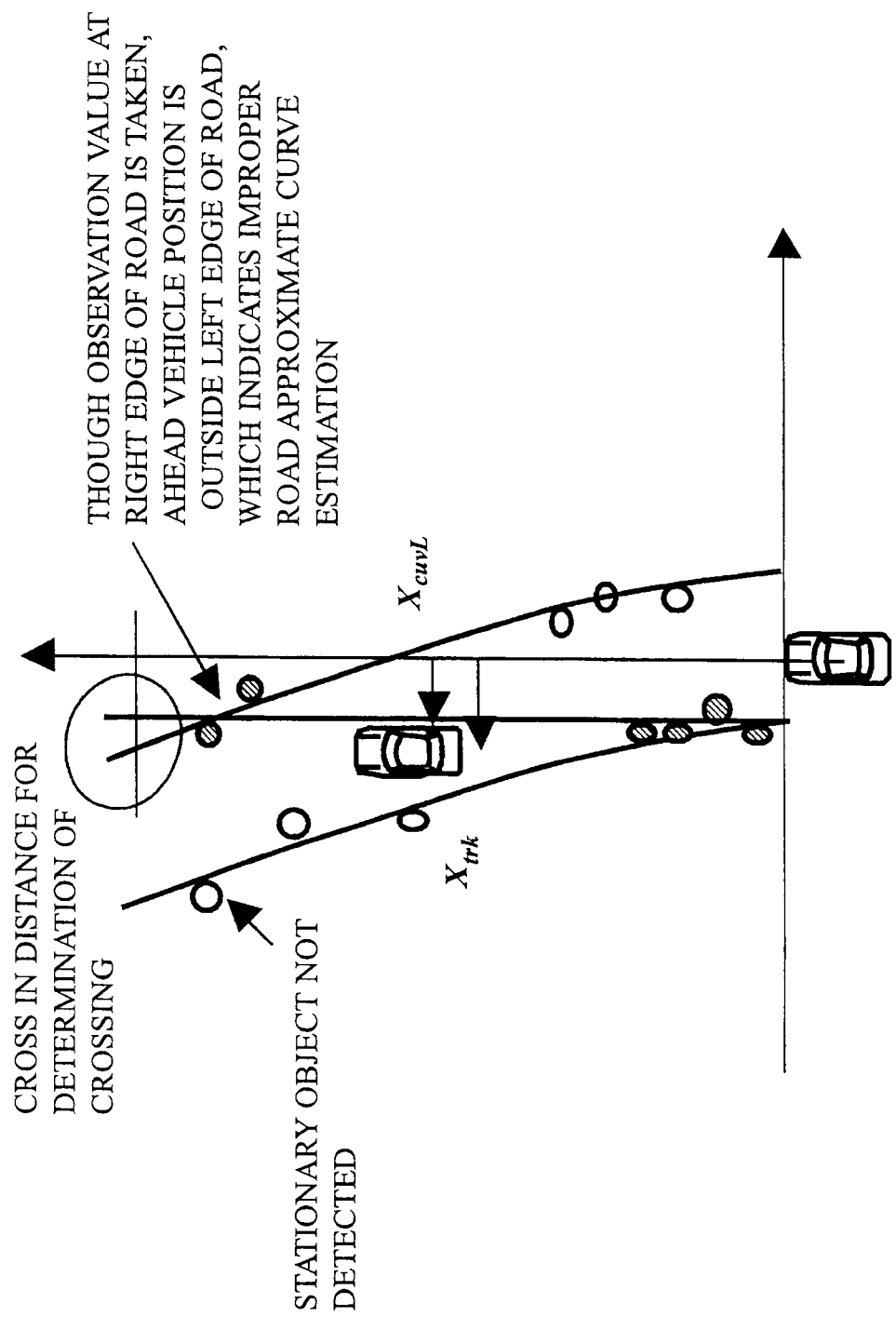
FIG. 51 is a diagram explaining an example of a system of road approximate curve correctness determination.

FIG. 51 is a diagram explaining an example of a system of road approximate curve correctness determination.

When road approximate curves (estimation curves) cross each other as shown in FIG. 51, the road approximate curves become contenders for an observation value. Accuracy of the road approximate curves may thereby deteriorate. The observation value that should have been assigned to a certain approximate curve may be used by another approximate curve. An erroneous road approximate curve may be thereby computed, and may be finally output. This may cause erroneous determination about a preceding vehicle.

The road configuration recognition apparatus 100 corrects the erroneous approximate curve based on a positional relationship between a vehicle ahead and the approximate curve. When the vehicle ahead is present outside the left edge of the road as in this FIG. 51, for example, the road configuration recognition apparatus 100 determines that the estimation value of the approximate curve of the left edge of the road is erroneous and corrects the estimation value.

Next, operation will be described.

The ahead vehicle tracking unit 135 tracks an ahead vehicle running ahead of the vehicle, based on observation values of the position, the relative speed and the like of an object observed by the radar 110. The ahead vehicle tracking unit 135 outputs the tracked trail of the vehicle ahead. When there are a plurality of vehicles ahead, the ahead vehicle tracking unit 135 tracks each of the vehicles ahead, and outputs trails respectively corresponding to the vehicles ahead.

When approximate curves of the right and left edges of the road cross at a location of a predetermined distance in the running direction of the vehicle and a certain one of approximate curves computed by the road approximate curve main computation unit 160 is located inside the position of the ahead vehicle, the correction unit 174 of the approximate curve selection unit 170 initializes the certain approximate curve.

To take an example, the correction unit 174 computes a position X in a vehicle axle direction of a point on each road approximate curve. The point on each road approximate curve is a predetermined distance $Y_D$ from the vehicle in the vehicle running direction, Y-axis. When the road approximate curve selected by the selection unit 173 is a curve expressed by Equation (1), the correction unit 174 computes the position X, using the following equation:

$$X = \alpha Y_D^2 + b \qquad \text{[Expression 34]}$$

where a and b are coefficients of each road approximate curve selected by the approximate curve selection unit 170.

The correction unit 174 computes the position X for each road approximate curve selected by the approximate curve selection unit 170. When the approximate curve selection unit 170 selects two road approximate curves, one of which approximates the right edge of a road and the other approximates the left edge of the road, for example, the correction unit 174 computes the position X for the approximate curve of the left edge of the road (hereinafter referred to as a position "$X_{cuvL}$") and computes the position X for the approximate curve of the right edge of the road (hereinafter referred to as a position "$X_{cuvR}$").

Based on the computed positions X of a plurality of road approximate curves, the correction unit 174 determines whether or not two of the road approximate curves cross each other. To take an example, the correction unit 174 determines whether or not the following relational expression is satisfied, based on the position $X_{cuvL}$ computed for the approximate curve of the left edge of the road and the position $X_{cuvR}$ computed for the approximate curve of the right edge of the road. When the following relational expression is satisfied, the correction unit 174 determines that the road approximate curves mutually cross.

[Expression 35]

$$X_{cuvL} \geq X_{cuvR} \qquad (20)$$

When there are three or more road approximate curves selected by the approximate curve selection unit 170, the correction unit 174 computes the positions X respectively for the road approximate curves selected by the approximate curve selection unit 170 in the ascending order of the magnitude of the coefficient b (x-intercept). When the position X computed for a certain one of the road approximate curves is smaller than or equal to the position X computed for the road approximate curve having the smaller coefficient b than that of the certain one of the road approximate curves, the correction unit 174 determines that the two road approximate curves cross each other.

When the correction unit 174 determines that the two road approximate curves cross each other, the correction unit 174 determines whether or not a relationship between the position of a vehicle ahead and the road approximate curves is normal, based on each tracked trail output by the ahead vehicle tracking unit 135. The correction unit 174, for example, computes a position X in the vehicle axle direction of a point on each road approximate curve, for each tracked trail, based on a relative position $Y_{trk}$ in the vehicle running direction of a vehicle ahead corresponding to the tracked trail. The point is a distance $Y_{trk}$ from the vehicle in the vehicle running direction. When the road approximate curve selected by the selection unit 173 is a curve indicated by Equation (1), for example, the correction unit 174 computes the position X, using the following expression:

$$X = \alpha Y_{trk}^2 + b \qquad \text{[Expression 36]}$$

where a and b are coefficients of each road approximate curve selected by the approximate curve selection unit 170.

Assume that the correction unit 174 determines that the approximate curve of the left edge of a road and the approximate curve of the right edge of the road cross each other, for example. Then, for each tracked trail, the correction unit 174 computes the position X (hereinafter referred to as "$X_{cuvL,i}$", and i indicating the number for the tracked trail) for the approximate curve of the left edge of the road, and computes the position X (hereinafter referred to as "$X_{cuvR,i}$") for the approximate curve of the right edge of the road.

The correction unit 174 determines whether or not each tracked trail satisfies the following relational expression, for example:

[Expression 37]

$$X_{trk,i} \leq X_{cuvL,i} \qquad (21)$$

where $X_{trk,i}$ denotes the position of the vehicle ahead corresponding to the tracked trail with the number i, in the vehicle axle direction.

When the relational expression above is satisfied, the correction unit 174 determines that the relationship between the vehicle ahead and the approximate curve of the left edge of the road is not normal, and that the approximate curve of the left edge of the road is erroneous.

The correction unit 174 further determines whether or not each tracked trail satisfies the following relational expression, for example:

[Expression 38]

$$X_{trk,i} \geq X_{cuvR,i} \quad (22)$$

where $X_{trk,i}$ denotes the position of the vehicle ahead corresponding to the tracked trail with the number i, in the vehicle axle direction.

When the relational expression above is satisfied, the correction unit 174 determines that the relationship between the vehicle ahead and the approximate curve of the right edge of the road is not normal, and that the approximate curve of the right edge of the road is erroneous.

When there are three or more road approximate curves selected by the approximate curve selection unit 170, the correction unit 174 determines in which one of a plurality of sub-regions the vehicle ahead is located, for each tracked trail, for example. The sub-regions are obtained by dividing a region in front of the vehicle by the road approximate curves. The correction unit 174 determines the sub-region in which the vehicle ahead is located, and stores a determination result, irrespective of whether there are the road approximate curves which cross each other.

When the correction unit 174 determines that there are the road approximate curves which cross each other, the correction unit 174 compares the determination result about the sub-region in which the vehicle ahead is located with an immediately preceding determination result, and determines whether or not the vehicle ahead has moved across one of the crossing road approximate curves. When the correction unit 174 determines that the vehicle ahead has moved across a crossing road approximate curve, the correction unit 174 determines that the road approximate curve moved across by the vehicle ahead is erroneous.

Instead of determining whether or not road approximate curves are erroneous based on all tracked trails output by the ahead vehicle tracking unit 135, the correction unit 174 may determine whether or not a road approximate curve is erroneous based on a stable tracked trail alone. The correction unit 174 uses only a track that has been continuously followed during several sampling periods. With this arrangement, the influence of a false image erroneously detected by a multipath wave may be excluded.

The correction unit 174 initializes the road approximate curve that has been determined to be erroneous.

The correction unit 174 selects one of road approximate curves having a highest curve quality value computed by the curve quality computation unit 172, from among the road approximate curves selected by the selection unit 173 excluding the road approximate curve determined to be erroneous, for example. The correction unit 174 initializes coefficients of the road approximate curve determined to be erroneous, using coefficients of the selected road approximate curve. The correction unit 174 replaces the coefficient a of the road approximate curve determined to be erroneous by the coefficient a of the selected road approximate curve, for example.

Alternatively, the correction unit 174 may initialize the road approximate curve determined to be erroneous, using the tracked trail output by the ahead vehicle tracking unit 135.

Figure 52:
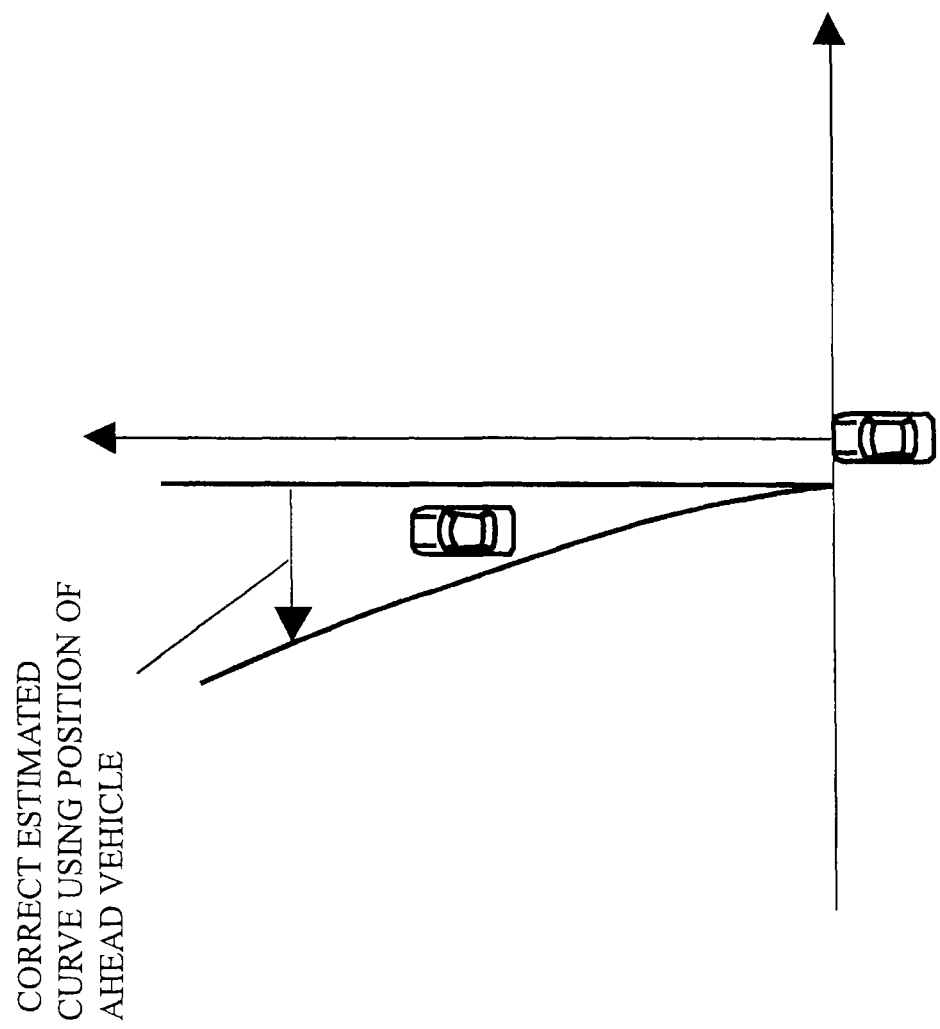
FIG. 52 is a diagram explaining an example of a system of initializing a road approximate curve.

FIG. 52 is a diagram explaining an example of a system of initializing a road approximate curve.

The correction unit 174 initializes the road approximate curve such that a positional relationship between the road approximate curve determined to be erroneous and a vehicle ahead becomes normal.

To take an example, the correction unit 174 initializes the road approximate curve determined to be erroneous so that the road approximate curve passes through a position ($X_{trk,i}$, $Y_{trk,i}$) of the ahead vehicle of which the relationship with the road approximate curve has been determined not to be normal. When the road approximate curve determined to be erroneous is a curve expressed by Equation (1), for example, the correction unit 174 computes new coefficients of the road approximate curve using the following expressions, and initializes the coefficients of the road approximate curve by the computed new coefficients.

$$a' = \frac{X_{trk,i} - b}{Y_{trk,i}^2} \qquad \text{[Expression 39]}$$

$$b' = b$$

where b denotes the coefficient of the road approximate curve determined to be erroneous by the correction unit 174, and a' and b' denote initial values of new coefficients a and b computed by the correction unit 174.

Instead of initializing the road approximate curve such that the road approximate curve passes through the position of the vehicle ahead, the correction unit 174 may initialize the road approximate curve such that the road approximate curve passes through a point predetermined distance from the vehicle ahead in the vehicle axle direction. To take an example, when the correction unit 174 determines that a road approximate curve on the right side of the ahead vehicle is erroneous and determines that the road approximate curve on the right side of the ahead vehicle should be located on the left side of the ahead vehicle, the correction unit 174 computes new coefficients of the road approximate curve, using the following equations:

$$a' = \frac{X_{trk,i} - \Delta X - b}{Y_{trk,i}^2} \qquad \text{[Expression 40]}$$

$$b' = b$$

where $\Delta X$ is a value set in advance as a minimum distance value between the vehicle ahead and the road approximate curve. A right direction of the X-axis is assumed to be positive.

Conversely, when the correction unit 174 determines that a road approximate curve on the left side of the vehicle ahead is erroneous and should be located on the right side of the vehicle ahead, the correction unit 174 computes new coefficients of the road approximate curve, using the following equations:

$$a' = \frac{X_{trk,i} + \Delta X - b}{Y_{trk,i}^2} \qquad \text{[Expression 41]}$$

$$b' = b$$

Alternatively, the correction unit 174 may discard the road approximate curve determined to be erroneous, instead of initializing the road approximate curve determined to be erroneous.

The road configuration estimation apparatus (road configuration recognition apparatus 100) includes the approximate curve selection unit (170) and the ahead vehicle tracking unit (135).

The ahead vehicle tracking unit (135) computes a plurality of tracked trails of a vehicle ahead.

When a plurality of approximate curves cross each other with a predetermined distance, the correction unit (174) of the approximate curve selection unit (170) determines whether or not the approximate curves are correct based on a positional relationship between each approximate curve and the tracked trail. Then, the correction unit (174) initializes the approximate curve determined to be erroneous.

When initializing the approximate curve, the correction unit (174) of the approximate curve selection unit (170) sets approximate curve coefficients corrected using the position of the vehicle ahead.

As described above, according to the road configuration estimation apparatus (road configuration recognition apparatus 100) in this embodiment, an erroneous approximate curve is corrected by using the positional relationship between the vehicle ahead and the approximate curve. More accurate determination about a preceding vehicle may be therefore made.

Eighth Embodiment

An eighth embodiment will be described using FIG. 53.

Same reference numerals are assigned to components common to those in the first to seventh embodiments, thereby omitting repeated description of the components.

Figure 53:
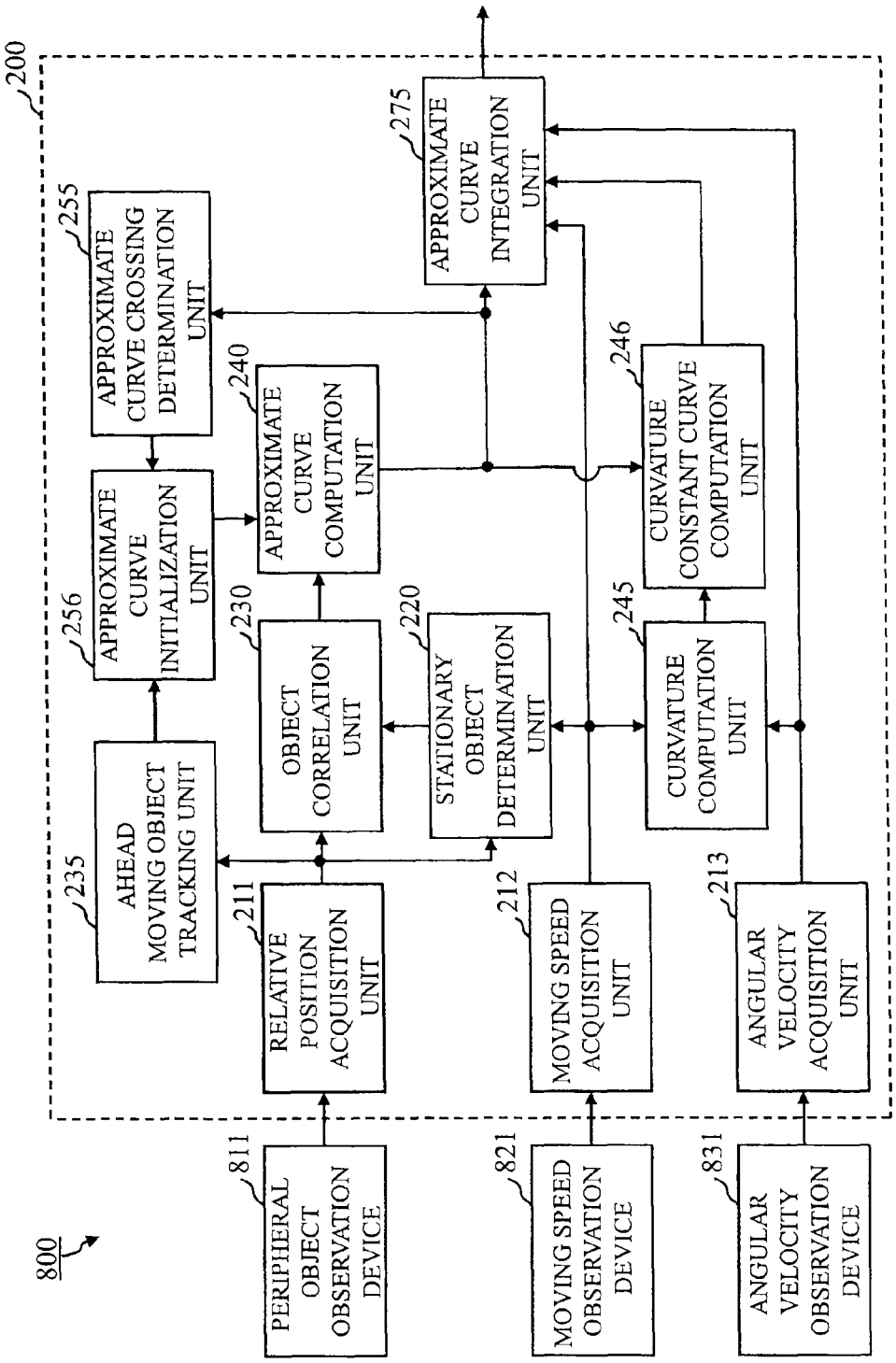
FIG. 53 is a system configuration diagram showing an example of an overall configuration of a road configuration estimation system 800 in an eighth embodiment.

FIG. 53 is a system configuration diagram showing an example of an overall configuration of a road configuration estimation system 800 in this embodiment.

The road configuration estimation system 800 is mounted on a moving object such as an automobile. The road configuration estimation system 800 includes the peripheral object observation device 811, the moving speed observation device 821, an angular velocity observation device 831, and a road configuration estimation apparatus 200.

The angular velocity observation device 831 observes the angular velocity of the moving object on which the road configuration estimation system 800 is mounted. The angular velocity observation device 831 is, for example, a gyro sensor. The angular velocity observation device 831 outputs a signal indicating an observation result such as the observed angular velocity of the moving object.

The road configuration estimation apparatus 200 includes, in addition the road configuration estimation apparatus 200 described in the fourth embodiment, an angular velocity acquisition unit 213, a curvature computation unit 245, a curvature constant curve computation unit 246, an ahead moving object tracking unit 235, an approximate curve crossing determination unit 255, an approximate curve initialization unit 256, and an approximate curve integration unit 275.

The angular velocity acquisition unit 231 receives the signal output by the angular velocity observation device 831, using the input device 902, thereby obtaining the result of the observation made by the angular velocity observation device 831. Using the processing device 911, the angular velocity acquisition unit 213 determines a time at which the angular velocity acquisition unit 231 has received the signal output by the angular velocity observation device 831 to compute a time at which the angular velocity observation device 831 has observed the angular velocity of the moving object. Using the storage device 914, the angular velocity acquisition unit 213 stores data indicating the observation time at which the angular velocity observation device 831 has observed the angular velocity of the moving object and the angular velocity of the moving object observed by the angular velocity observation device 831. The data stored by the angular velocity acquisition device 213 is referred to as "angular velocity observation data". In the "angular velocity observation data", the data indicating the observation time is referred to as "angular velocity observation time data", while the data indicating the angular velocity of the moving object is referred to as "angular velocity observation value data".

Using the processing device 911, the curvature computation unit 245 computes the curvature of the trajectory of the moving object. To take an example, using the processing device 911, the curvature computation unit 245 receives moving speed observation data stored by the moving speed acquisition unit 212 and the angular velocity observation data stored by the angular velocity acquisition unit 213. Using the processing device 911, the curvature computation unit 245 obtains moving speed observation value data indicating the moving speed of the moving object observed by the moving speed observation device 821 from the received moving speed observation data. The curvature computation unit 245 obtains the angular velocity observation value data indicating the angular velocity of the moving object observed by the angular velocity observation device 831 from the received angular velocity observation data, using the processing device 911. Using the processing device 911, the curvature computation unit 245 computes the curvature of the trajectory of the moving object, based on the moving speed of the moving object indicated by the obtained moving speed observation value data and the angular velocity of the moving object indicated by the obtained angular velocity observation value data. Using the processing device 911, the curvature computation unit 245 computes the curvature of the trajectory of the moving object by computing the quotient resulting from division of the angular velocity of the moving object by the moving speed of the moving object.

The observation time of the moving speed of the moving object may be different from the observation time of the angular velocity of the moving object. In that case, the curvature computation unit 245 may be configured to perform a timing adjustment process, and to compute the curvature of the trajectory of the moving object based on the moving speed and the angular velocity of the moving object which are processed in the timing adjustment process, using the processing device 911. Further, the curvature computation unit 245 may be configured to smooth each of the moving speed and the angular velocity of the moving object, and to compute the curvature of the trajectory of the moving object based on the smoothed moving speed and angular velocity, using the processing device 911.

Using the processing device 911, the curvature constant curve computation unit 246 computes an approximate curve that approximates the configuration of a road based on an assumption that the curvature of the road is constant (hereinafter referred to as a "curvature constant curve"). To take an example, based on an approximate curve computed by the approximate curve computation unit 240, the curvature constant curve computation unit 246 computes a distance between the moving object and the approximate curve in a lateral direction of the moving object, using the processing device 911. Then, using the processing device 911, the curvature constant curve computation unit 246 computes coordinates of the center point of the trajectory of the moving object, based on the curvature of the trajectory of the moving object computed by the curvature computation unit 245. Using the processing device 911, the curvature constant curve computation unit 246 computes coefficients of the equation of a circle. The center of the circle has the computed coordinates of the center point of the trajectory of the moving object as a center and the circle passes through the same point as that on the approximate curve computed by the approximate curve computation unit 240 in the lateral direction of the moving object. Using the processing device 911, the curvature constant curve computation unit 246 sets the equation of the circle having the computed coefficients to an equation expressing the curvature constant curve.

Using the processing device 911, the approximate curve integration unit 275 integrates the approximate curve computed by the approximate curve computation unit 240 and the curvature constant curve computed by the curvature constant curve computation unit 246 to compute an approximate curve that approximates the configuration of the road on which the moving object is located. To take an example, the approximate curve integration unit 275 computes a weight for the approximate curve computed by the approximate curve computation unit 240 and a weight for the curvature constant curve computed by the curvature constant curve computation unit 246, using the processing device 911, based on the moving speed of the moving object obtained by the moving speed acquisition unit 212 and the angular velocity of the moving object obtained by the angular velocity acquisition unit 213. When a change in the angular velocity of the moving object is small, for example, the curvature of the road on which the moving object is located is probably constant. Then, the approximate curve integration unit 275 increases the weight for the curvature constant curve. When the moving speed of the moving object is large, the moving object is probably moving along the configuration of the road. Then, the approximate curve integration unit 275 increases the weight for the curvature constant curve. The approximate curve integration unit 275 computes the right sides of the following equations, using the processing device 911, thereby computing the weights, for example:

$$\lambda_{yaw} = \frac{V}{V+V_0} \cdot \frac{\Delta\omega_0}{\Delta\omega + \Delta\omega_0}$$ [Expression 42]

$$\lambda_{fix} = 1 - \lambda_{yaw}$$

where $\lambda_{yaw}$ denotes the weight for the curvature constant curve computed by the curvature constant curve computation unit 246. $\lambda_{fix}$ denotes the weight for the approximate curve computed by the approximate curve computation unit 240. V denotes the moving speed of the moving object observed by the moving speed observation device 821 and obtained by the moving speed acquisition unit 212. $\Delta\omega$ denotes an amount of change in the angular velocity of the moving object observed by the angular velocity observation device 831 and obtained by the angular velocity acquisition unit 213 in a predetermined period of time. $V_0$ denotes a moving speed of the moving object set in advance as a reference for computing the weights. $\Delta\omega_0$ denotes a change amount of the angular velocity of the moving object set in advance as a reference for computing the weights.

Using the processing device 911, the approximate curve integration unit 275 integrates the approximate curve computed by the approximate curve computation unit 240 and the curvature constant curve computed by the curvature constant curve computation unit 246, based on the computed weights, thereby computing the approximate curve of the road on which the moving object is located.

An approximate curve selection unit may be provided in place of the approximate curve integration unit 275. Using the processing device 911, the approximate curve selection unit adopts one of the approximate curve computed by the approximate curve computation unit 240 and the curvature constant curve computed by the curvature constant curve computation unit 246 as the approximate curve that approximates the configuration of the road on which the moving object is located. Assume that the moving speed of the moving object obtained by the moving speed acquisition unit 212 is larger than a predetermined threshold, and the change amount of the angular velocity of the moving object obtained by the angular velocity acquisition unit 213 is smaller than a predetermined threshold, for example. Then, using the processing device 911, the approximate curve selection unit adopts the curvature constant curve computed by the curvature constant curve computation unit 246 as the approximate curve that approximates the configuration of the road on which the moving object is located. Otherwise, using the processing device 911, the approximate curve selection unit adopts the approximate curve computed by the approximate curve computation unit 240 as the approximate curve that approximates the configuration of the road on which the moving object is located. In that case, the curvature constant curve computation unit 246 may be configured to compute the curvature constant curve after the curvature constant curve has been determined to be adopted by the approximate curve selection unit.

Using the processing device 911, the ahead moving object tracking unit 235 tracks an object observed by the peripheral object observation device 811, which is moving ahead of the moving object in substantially a same direction as the moving object, based on the relative position and the relative speed of the object obtained by the relative position acquisition unit 211. To take an example, using the processing device 911, the ahead moving object tracking unit 235 receives peripheral object observation data stored by the relative position acquisition unit 211. Then, using the processing device 911, the ahead moving object tracking unit 235 obtains relative position observation value data and relative speed observation value data from the received peripheral object observation data. The relative position observation value data indicates the relative position of the object relative to the moving object observed by the peripheral object observation device 811. The relative speed observation value data indicates the relative speed of the object relative to the moving object observed by the peripheral object observation device 811. The ahead moving object tracking unit 235 compares the absolute value of the relative speed indicated by the obtained relative speed observation value data with a predetermined threshold. When the absolute value of the relative speed is smaller than the threshold, the ahead moving object tracking unit 235 determines that the object is moving in substantially the same direction as the moving object. The ahead moving object tracking unit 235 tracks the object determined to be moving in substantially the same direction as the moving object to obtain the trajectory of the relative position of the object relative to the moving object, based on the relative position indicated by the obtained relative position observation value data.

When there are a plurality of approximate curves computed by the approximate curve computation unit 240, the approximate curve crossing determination unit 255 determines whether or not two of the approximate curves cross each other, using the processing device 911, To take an example, using the processing device 911, the approximate curve crossing determination unit 255 selects two of the approximate curves computed by the approximate curve computation unit 240, and computes the value of a discriminant that determines whether or not the two of the approximate curves cross each other, based on coefficients of the selected approximate curves. Using the processing device 911, the approximate curve crossing determination unit 255 determines whether or not the selected two approximate curves cross each other, based on the computed value of the discriminant.

The approximate curve crossing determination unit 255 may be configured to treat two approximate curves as not crossing each other by regarding it within a margin of error, when the two approximate curves cross each other but the crossing point is far from the moving object. The following is an example of it. Assume that the two approximate curves have been determined to cross each other based on the value of the discriminant. Then, the approximate curve crossing determination unit 255 computes relative coordinates of the crossing point of the two approximate curves relative to the moving object, using the processing device 911. Using the processing device 911, the approximate curve crossing determination unit 255 computes the distance between the crossing point of the two approximate curves and the moving object, using the computed relative coordinates. The approximate curve crossing determination unit 255 compares the computed distance with a predetermined threshold, using the processing device 911. When the computed distance is smaller than the threshold, the approximate curve crossing determination unit 255 determines that the selected two approximate curves cross each other, using the processing device 911. Otherwise, the approximate curve crossing determination unit 255 determines the selected two approximate curves do not cross each other, using the processing device 911.

Using the processing device 911, the approximate curve initialization unit 256 examines whether or not each of the approximate curves determined to cross each other by the approximate curve crossing determination unit 255 is correct. To take an example, using the processing device 911, the approximate curve initialization unit 256 determines whether or not each of the approximate curves determined to cross each other by the approximate curve crossing determination unit 255 crosses the trajectory of the relative position of the object relative to the moving object that has been computed by the ahead moving object tracking unit 235. When the approximate curve initialization unit 256 determines that one of the approximate curves determined to cross each other by the approximate curve crossing determination unit 255 crosses the trajectory of the relative position of the object relative to the moving object that has been computed by the ahead moving object tracking unit 235, the approximate curve initialization unit 256 determines that the approximate curve is not correct, using the processing device 911.

The approximate curve initialization unit 256 may be configured to use another system to examine whether or not the approximate curve is correct or not. The following is an example of it. Using the processing device 911, the approximate curve initialization unit 256 computes a curvature for each of the approximate curves determined to cross each other by the approximate curve crossing determination unit 255. The approximate curve initialization unit 256 computes the curvature at a point in a just lateral direction of the moving object for each of the approximate curves. Then, the approximate curve initialization unit 256 computes the absolute value of a difference between the computed curvature and the curvature computed by the curvature computation unit 245, using the processing device 911. Using the processing device 911, the approximate curve initialization unit 256 compares the computed absolute value of the curvature difference with a predetermined threshold and determines that the approximate curve is not correct when the absolute value of the curvature difference is larger than the threshold.

When the approximate curve initialization unit 256 determines that a certain approximate curve is not correct, the approximate curve initialization unit 256 initializes coefficients of the approximate curve determined not to be correct, using the processing device 911.

To take an example, using the processing device 911, the approximate curve initialization unit 256 modifies coefficient values of the approximate curve determined not to be correct such that the approximate curve does not cross another approximate curve computed by the approximate curve computation unit 240 and the trajectory of the relative position of the object relative to the moving object computed by the ahead moving object tracking unit 235.

Alternatively, the approximate curve computation unit 240 may be configured to discard the approximate curve determined not to be correct by the approximate curve initialization unit 256.

The above-mentioned configuration described in each embodiment is an example, and may be combined with the configuration described in the different embodiment. Alternatively, a variation may be adopted in which the configuration of a component that is not essential is replaced by another configuration of an existing technology.

The above-mentioned road configuration estimation apparatus (200; road configuration recognition apparatus 100) includes the relative position acquisition unit (211: stationary object identification unit 130), the stationary object determination unit (220; stationary object identification unit 130), the object correlation unit (230; road approximate curve temporary computation unit 140), and the approximate curve computation unit (240; road approximate curve main computation unit 160).

The relative position acquisition unit (211, 130) obtains a result of the observation by a peripheral object observation device (811, radar 110). The peripheral object observation device repeatedly observes a relative position of an object relative to the moving object (801). The object is located in the vicinity of the moving object (801).

The stationary object determination unit (220; 130) determines whether or not the object the relative positions of which have been observed by the peripheral object observation device (811; 110) is still, based on the result of the observation obtained by the relative position acquisition unit (211; 130).

The object correlation unit (230; 140) determines a plurality of relative positions of an identical object observed by the peripheral object observation device (811, 110) from among a plurality of relative positions observed by the peripheral object observation device (811; 110), based on the result of the observation obtained by the relative position acquisition unit (211; 130).

The approximate curve computation unit (240; 160) computes an approximate curve that approximates a configuration of a road on which the moving object (801) is located, based on a result of the determination by the stationary object determination unit (220; 130) and a result of the determination by the object correlation unit (230; 140).

Since the approximate curve is computed based on the result of the determination by the stationary object determination unit and the result of the determination by the object correlation unit, influences of erroneous detection and erroneous determination is precluded, and reliability of the computed approximate curve may be thereby increased.

The approximate curve computation unit (240; 160) estimates a coefficient of a predetermined function representing the approximate curve, using a tracking filter. The tracking filter treats the coefficient of the function representing the approximate curve as a state quantity, and treats the relative position of the object, which is observed by the peripheral object observation device (811; 110) and is determined to be still by the stationary object determination unit (220, 130) from among the results of the observations obtained by the relative position acquisition unit (211; 130) as an amount of observation.

Since the coefficient of the function representing the approximate curve is estimated by the tracking filter, the results of the observations at different observation times may be used for computation of the approximate curve. With this arrangement, the number of the results of the observations used for computing the approximate curve is increased. Reliability of the computed approximate curve may be enhanced.

When a distance between the approximate curve and the relative position observed by the peripheral object observation device (811; 110) is shorter than a predetermined threshold, the approximate curve computation unit (240; 160) performs an updating process on the tracking filter with the relative position set to an amount of observation.

Since the relative position is correlated with the approximate curve based on the distance between the approximate curve and the relative position observed by the peripheral object observation device 811, the relative position may be used for updating the approximate curve that has been correlated with the relative position.

The road configuration estimation apparatus (200; 100) includes an initial value computation unit (250; road approximate curve temporary computation unit 140).

The initial value computation unit (250; 140) approximates a trajectory of a plurality of the relative positions determined by the object correlation unit (230; 140) to be the plurality of the relative positions of an identical object observed by the peripheral object observation device (811; 110), using the predetermined function representing the approximate curve, and computes the coefficient of the function that approximates the trajectory of the plurality of relative positions.

The approximate curve computation unit (240; 160) sets the coefficient computed by the initial value computation unit (250; 140) to an initial value of an estimation value of the state quantity for the tracking filter.

Since the trajectory of the relative positions reflects movement of the moving object, the trajectory reflects the configuration of the road when the moving object moves along the road. The initial value computed from the trajectory of the relative positions may not be the coefficient of an approximate curve that precisely approximates the configuration of the road, but has a sufficiently effective accuracy as the initial value of a tracking process. With this arrangement, the initial value necessary for the tracking process may be obtained by a small amount of computation.

Based on a plurality of relative positions of an identical object the number of which (the number of times of correlation) is larger than a predetermined threshold from among the plurality of the relative positions determined by the object correlation unit (230; 140) to be the plurality of the relative positions of the an identical object observed by the peripheral object observation device (811; 110), the initial value computation unit (250; 140) computes a coefficient of the function that approximates a trajectory of the plurality of the relative positions.

Since the initial value is computed based on the relative positions for which the number of times of correlation is larger than the threshold value, accuracy of the computed initial value is increased.

Based on a plurality of relative positions of an identical object the distance between one of which and the moving object (801) is shorter than a predetermined threshold from among the plurality of the relative positions determined by the object correlation unit (230; 140) to be the plurality of the relative positions of an identical object observed by the peripheral object observation device (811; 110), the initial value computation unit (250; 140) computes a coefficient of the function that approximates a trajectory of the plurality of the relative positions.

Since the initial value is computed based on the relative position of the object of which the distance from the moving object is smaller than the threshold value, accuracy of the computed initial value is increased.

The road configuration estimation apparatus (200; 100) includes a reliability level computation unit (260; approximate curve selection unit 170).

The reliability level computation unit (260; 170) computes the reliability level of the approximate curve computed by the approximate curve computation unit.

The approximate curve computation unit (240; 160) discards the computed approximate curve when the reliability level computed by the reliability level computation unit (260; 170) is lower than a predetermined threshold value.

By discarding the approximate curve having a low reliability level, reliability of the approximate curve may be maintained.

The road configuration estimation apparatus (200; 100) includes a reliability level computation unit (260; 170) and an approximate curve selection unit (270; 170).

The approximate curve computation unit (240; 160) computes a plurality of approximate curves.

The reliability level computation unit (240; 170) computes the reliability level of each of the plurality of approximate curves computed by the approximate curve computation unit (240; 160).

The approximate curve selection unit (270; 170) selects one of the plurality of approximate curves for adoption, from among the plurality of approximate curves computed by the approximate curve computation unit (240; 160), based on the reliability level computed by the reliability level computation unit (260; 170).

With this arrangement, the approximate curve having a high reliability level may be adopted.

The reliability level computation unit (260; 170) computes a variance of a distance between the moving object (801) and the relative position used for computation of the approximate curve by the approximate curve computation unit (240; 160). The reliability level computation unit (260; 170) increases the reliability level as the computed variance increases.

When the relative positions used for computation of the approximate curve spatially spread, a change in the approximate curve may be small, and the approximate curve may be stable. By increasing the reliability level of the stable approximate curve, reliability of the approximate curve may be increased.

The road configuration estimation apparatus (200, 100) includes a moving speed acquisition unit (212; road curvature conversion unit 126), an angular velocity acquisition unit (213; road curvature conversion unit 126), a curvature computation unit (245; road curvature conversion unit 126), a curvature constant curve computation unit (246; estimation value selection unit 190), and an approximate curve selection unit (estimation value selection unit 190).

The moving speed acquisition unit (212; 126) obtains a result of an observation by a moving speed observation device (821; vehicle speed sensor 120) that observes a moving speed of the moving object.

The angular velocity acquisition unit (213; 126) obtains a result of an observation by an angular velocity observation device (831; yaw rate sensor 125) that observes an angular velocity of the moving object.

The curvature computation unit (245; 126) computes a quotient resulting from division of the angular velocity of the moving object by the moving speed of the moving object as a curvature of a trajectory of the moving object, based on the result of the observation obtained by the moving speed acquisition unit (212; 126) and the result of the observation obtained by the angular velocity acquisition unit (213; 126).

The curvature constant curve computation unit (246; 190) computes a curvature constant curve with a constant curvature as an approximate curve that approximates the configuration of the road on which the moving object is located, based on the curvature computed by the curvature computation unit (245; 126).

The approximate curve selection unit (190) selects one of the approximate curve computed by the approximate curve computation unit (240; 160) and the curvature constant curve computed by the curvature constant curve computation unit (246; 190) and adopts the selected approximate curve as the approximate curve that approximates the configuration of the road on which the moving object is located.

Since an optimal approximate curve is selected according to the running state of the moving object, estimation accuracy of the configuration of the road is improved.

The approximate curve selection unit (vehicle running road determination unit 180, estimation value selection unit 190) determines a road configuration type of the road on which the moving object is located, from among road configuration types that are classified into at least four types of a straight road, a road before a curved road, a curved road, and a curved road exit, and selects the curvature constant curve computed by the curvature constant curve computation unit (246; 190) as the approximate curve that approximates the configuration of the road on which the moving object is located when the determined road configuration type is the curved road.

The configuration of the curved road with a constant curvature may be approximated with good accuracy by using the curvature computed from the angular velocity of the moving object. Thus, estimation accuracy of the configuration of the road is improved.

The road configuration estimation apparatus (200; 100) includes a moving speed acquisition unit (212; 126), an angular velocity acquisition unit (213; 126), a curvature computation unit (245; 126), a curvature constant curve computation unit (246; 190), and an approximate curve integration unit (275; 190).

The moving speed acquisition unit (212; 126) obtains a result of an observation by a moving speed observation device (821; 120) that observes a moving speed of the moving object.

The angular velocity acquisition unit (213; 126) obtains a result of an observation by an angular velocity observation device (831; 125) that observes an angular velocity of the moving object.

The curvature computation unit (245; 126) computes a quotient resulting from division of the angular velocity of the moving object by the moving speed of the moving object as a curvature of a trajectory of the moving object, based on the result of the observation obtained by the moving speed acquisition unit (212; 126) and the result of the observation obtained by the angular velocity acquisition unit (213; 126).

The curvature constant curve computation unit (246; 190) computes a curvature constant curve with a constant curvature as an approximate curve that approximates the configuration of the road on which the moving object is located, based on the curvature computed by the curvature computation unit (245; 126).

The approximate curve integration unit (275; 190) computes a weight of the approximate curve computed by the approximate curve computation unit (240; 160) and a weight of the curvature constant curve computed by the curvature constant curve computation unit (246; 190), and integrates the approximate curve computed by the approximate curve computation unit (240; 160) and the curvature constant curve computed by the curvature constant curve computation unit (246; 190), based on the computed weights, to compute an approximate curve that approximates the configuration of the road on which the moving object is located.

Weighting is changed according to the running state of the moving object, and two types of the curves are integrated. Accordingly, estimation accuracy of the configuration of the road is improved.

The approximate curve integration unit (275; 180, 190) determines a road configuration type of the road on which the moving object is located, from among road configuration types that are classified into at least four types of a straight road, a road before a curved road, a curved road, and a curved road exit, and increases the weight of the curvature constant curve computed by the curvature constant curve computation unit (246; 190) when the determined road configuration type is the curved road.

The configuration of the curved road with a constant curvature may be approximated with good accuracy by the curvature computed from the angular velocity of the moving object. Thus, estimation accuracy of the configuration of the road is improved.

The road configuration estimation apparatus (200; 100) includes an ahead moving object tracking unit (235; ahead vehicle tracking unit 135), an approximate curve crossing determination unit (255; correction unit 174), and an approximate curve initialization unit (256; correction unit 174).

The ahead moving object tracking unit (235; 135) tracks an object moving ahead of the moving object in substantially a same direction as the moving object, based on the result of the observation obtained by the relative position acquisition unit (211; 135).

When the approximate curve computation unit (240; 160) computes a plurality of approximate curves, the approximate curve crossing determination unit (255; 174) determines whether or not two of the plurality of approximate curves mutually cross.

When the approximate curve crossing determination unit (255; 174) determines that at least two of the approximate curves mutually cross, the approximate curve initialization unit (256; 174) determines whether or not each of the approximate curves determined to mutually cross by the approximate curve crossing determination unit (255; 174) is correct, based on a positional relationship between the object tracked by the ahead moving object tracking unit (235; 135) and each of the approximate curves, and initializes the approximate curve determined not to be correct.

When the approximate curves mutually cross, one of the crossing approximate curves is probably erroneous. The object moving ahead of the moving object in substantially the same direction as the moving object is probably moving along the configuration of the road. Thus, it may be determined which one of the approximate curves is not correct, based on the positional relationship between the object and each approximate curve. In this manner, the approximate curve that is not correct is determined and initialized. Estimation accuracy of the configuration of the road is therefore improved.

The road configuration recognition apparatus (100, 200) described above may be implemented by a computer program, by execution of which by a computer, the computer is functioned as the road configuration estimation apparatus.

The invention claimed is:

1. A road configuration estimation apparatus comprising:
   a relative position acquisition unit, configured to obtain a result of an observation by a peripheral object observation device that repeatedly observes an object, from among a plurality of objects, located in the vicinity of a moving object to measure a relative position of the object relative to the moving object;
   a stationary object determination unit, configured to determine whether or not the object observed by the peripheral object observation device is still, based on the result of the observation obtained by the relative position acquisition unit;
   an object correlation unit, configured to determine a set of relative positions measured by observing the object from among the plurality of objects by the peripheral object observation device, from among a plurality of the relative positions measured by the peripheral object observation device, based on a plurality of the results of the observations obtained by the relative position acquisition unit;
   an approximate curve computation unit, configured to compute an approximate curve that approximates a configuration of a road on which the moving object is located, based on a result of the determination by the stationary object determination unit and a result of the determination by the object correlation unit;
   a reliability level computation unit, configured to compute a reliability level of the approximate curve computed by the approximate curve computation unit; and
   the approximate curve computation unit discards the computed approximate curve when the reliability level computed by the reliability level computation unit is lower than a predetermined threshold value.

2. The road configuration estimation apparatus according to claim 1, wherein
   the approximate curve computation unit estimates a coefficient of a predetermined function representing the approximate curve, using a tracking filter that treats the coefficient of the function representing the approximate curve as a state, and treats the relative position measured by the peripheral object observation device by observing an object determined to be still by the stationary object determination unit from among the result of the observation obtained by the relative position acquisition unit as a measurement.

3. The road configuration estimation apparatus according to claim 2, wherein
   when a distance between the approximate curve and the relative position measured by the peripheral object observation device is shorter than a predetermined threshold value, the approximate curve computation unit performs an updating process of the tracking filter, using the relative position as the measurement.

4. The road configuration estimation apparatus according to claim 2, further comprising:
   an initial value computation unit, configured to approximate a trajectory of a plurality of the relative positions belonging to the set determined by the object correlation unit to be the relative positions measured by observing the object by the peripheral object observation device, using the predetermined function representing the approximate curve, and to compute the coefficient of the function that approximates the trajectory of the plurality of the relative positions; and wherein
   the approximate curve computation unit sets the coefficient computed by the initial value computation unit to an initial value of an estimation value of the state for the tracking filter.

5. The road configuration estimation apparatus according to claim 4, wherein
   the initial value computation unit computes a coefficient of the function that approximates a trajectory of a plurality of the relative positions, based on the plurality of the relative positions belonging to the set determined by the object correlation unit to be the relative positions measured by observing the object by the peripheral object observation device, the number of the relative positions belonging the set being larger than a predetermined threshold value.

6. The road configuration estimation apparatus according to claim 4, wherein
   the initial value computation unit computes a coefficient of the function that approximates a trajectory of a plurality of the relative positions, based on the plurality of the relative positions belonging to the set determined by the object correlation unit to be the relative positions measured by observing the object by the peripheral object observation device, a distance between at least one relative position belonging to the set and the moving object being shorter than a predetermined value.

7. The road configuration estimation apparatus according to claim 1, wherein
   the approximate curve computation unit computes a plurality of approximate curves; and
   the reliability level computation unit, configured to compute a reliability level of each of the plurality of approximate curves computed by the approximate curve computation unit; and
   an approximate curve selection unit, configured to select one of the plurality of approximate curves for adoption, from among the plurality of approximate curves computed by the approximate curve computation unit, based on the reliability level computed by the reliability level computation unit.

8. The road configuration estimation apparatus according to claim 1, wherein
   the reliability level computation unit computes a dispersion of distances between the moving object and each of the relative positions used for computation of the approximate curve by the approximate curve computation unit, and increases the reliability level as the computed dispersion increases.

9. The road configuration estimation apparatus according to claim 1, further comprising:
   a moving speed acquisition unit, configured to obtain a result of an observation by a moving speed observation device that observes a moving speed of the moving object;
   an angular velocity acquisition unit, configured to obtain a result of an observation by an angular velocity observation device that observes an angular velocity of the moving object;
   a curvature computation unit, configured to compute a quotient resulting from division of the angular velocity of the moving object by the moving speed of the moving object as a curvature of a trajectory of the moving object, based on the result of the observation obtained by the moving speed acquisition unit and the result of the observation obtained by the angular velocity acquisition unit;

a curvature constant curve computation unit, configured to compute a curvature constant curve with a constant curvature as an approximate curve that approximates the configuration of the road on which the moving object is located, based on the curvature computed by the curvature computation unit; and an approximate curve selection unit, configured to select one of the approximate curve computed by the approximate curve computation unit and the curvature constant curve computed by the curvature constant curve computation unit and to adopt the selected approximate curve as the approximate curve that approximates the configuration of the road on which the moving object is located.

10. The road configuration estimation apparatus according to claim 9, wherein the approximate curve selection unit determines a road configuration type of the road on which the moving object is located, from among road configuration types that are classified into at least four types of a straight road, a road before a curved road, a curved road, and a curved road exit, and selects the curvature constant curve computed by the curvature constant curve computation unit as the approximate curve that approximates the configuration of the road on which the moving object is located when the determined road configuration type is the curved road.

11. The road configuration estimation apparatus according to claim 1, further comprising:

a moving speed acquisition unit, configured to obtain a result of an observation by a moving speed observation device that observes a moving speed of the moving object;

an angular velocity acquisition unit, configured to obtain a result of an observation by an angular velocity observation device that observes an angular velocity of the moving object;

a curvature computation unit, configured to compute a quotient resulting from division of the angular velocity of the moving object by the moving speed of the moving object as a curvature of a trajectory of the moving object, based on the result of the observation obtained by the moving speed acquisition unit and the result of the observation obtained by the angular velocity acquisition unit;

a curvature constant curve computation unit, configured to compute a curvature constant curve with a constant curvature as an approximate curve that approximates the configuration of the road on which the moving object is located, based on the curvature computed by the curvature computation unit; and an approximate curve integration unit, configured to compute a weight for the approximate curve computed by the approximate curve computation unit and a weight for the curvature constant curve computed by the curvature constant curve computation unit, and to integrate the approximate curve computed by the approximate curve computation unit and the curvature constant curve computed by the curvature constant curve computation unit, based on the computed weights, to compute an approximate curve that approximates the configuration of the road on which the moving object is located.

12. The road configuration estimation apparatus according to claim 11, wherein the approximate curve integration unit determines a road configuration type of the road on which the moving object is located, from among road configuration types that are classified into at least four types of a straight road, a road before a curved road, a curved road, and a curved road exit, and increases the weight of the curvature constant curve computed by the curvature constant curve computation unit when the determined road configuration type is the curved road.

13. The road configuration estimation apparatus according to claim 1, further comprising:

an ahead moving object tracking unit, configured to track an object moving ahead of the moving object in substantially a same direction as the moving object, based on the result of the observation obtained by the relative position acquisition unit;

an approximate curve crossing determination unit, configured to determine, when the approximate curve computation unit computes a plurality of approximate curves, whether or not at least two of the plurality of approximate curves mutually cross; and an approximate curve initialization unit, configured to determine, when the approximate curve crossing determination unit determines that two of the plurality of approximate curves mutually cross, whether or not each of the approximate curves determined to mutually cross by the approximate curve crossing determination unit is correct, based on a positional relationship between the object tracked by the ahead moving object tracking unit and each of the approximate curves, and to initialize the approximate curve determined not to be correct by the approximate curve crossing determination unit.

14. A non-transitory computer readable storage medium having stored therein a computer program, for causing a computer that executes the computer program to be functioned as the road configuration estimation apparatus according to claim 1.

15. A road configuration estimation method of estimating a configuration of a road on which a moving object is located, the method comprising:

obtaining a result of an observation by a peripheral object observation device that repeatedly observes an object, from a plurality of objects, located in the vicinity of a moving object to measure a relative position of the object relative to the moving object;

determining whether or not the object observed by the peripheral object observation device is still, based on the obtained result of the observation by the peripheral object observation device;

determining a set of a plurality of relative positions measured by observing an object from among the plurality of objects by the peripheral object observation device, from among the relative positions measured by the peripheral object observation device, based on the obtained result of the observation;

computing an approximate curve that approximates a configuration of a road on which the moving object is located, based on a result of the determination of stillness of the object and a result of the determination of the set of the relative positions;

computing a reliability level of the approximate curve computed; and discarding the computed approximate curve when the reliability level is lower than a predetermined threshold value.

* * * * *